US011850497B2

(12) United States Patent
Willardson et al.

(10) Patent No.: US 11,850,497 B2
(45) Date of Patent: Dec. 26, 2023

(54) MODULAR EXERCISE DEVICE

(71) Applicant: iFIT Inc., Logan, UT (US)

(72) Inventors: Jared Willardson, Smithfield, UT (US); Matt Jensen, Nibley, UT (US); Travis Simon, Providence, UT (US); Scott Henderson, Logan, UT (US)

(73) Assignee: iFIT Inc., Logan, UT (US)

( * ) Notice: Subject to any disclaimer, the term of this patent is extended or adjusted under 35 U.S.C. 154(b) by 220 days.

(21) Appl. No.: 17/067,310

(22) Filed: Oct. 9, 2020

(65) Prior Publication Data

US 2021/0106899 A1 Apr. 15, 2021

Related U.S. Application Data

(60) Provisional application No. 62/914,007, filed on Oct. 11, 2019.

(51) Int. Cl.
*A63B 71/06* (2006.01)
*A63B 22/02* (2006.01)
*A63B 22/06* (2006.01)
*A63B 21/00* (2006.01)
*G06T 7/70* (2017.01)
*A63B 21/22* (2006.01)

(52) U.S. Cl.
CPC ........ *A63B 71/0619* (2013.01); *A63B 21/154* (2013.01); *A63B 21/225* (2013.01); *A63B 21/4034* (2015.10); *A63B 22/02* (2013.01); *A63B 22/0605* (2013.01); *G06T 7/70* (2017.01); *A63B 2071/0658* (2013.01); *A63B 2071/0675* (2013.01); *A63B 2220/05* (2013.01); *A63B 2220/13* (2013.01); *A63B 2220/806* (2013.01); *A63B 2225/093* (2013.01); *G06T 2207/30196* (2013.01)

(58) Field of Classification Search
CPC ... A63B 21/154; A63B 21/4034; A63B 21/02; A63B 71/0619; A63B 2071/0658; A63B 2071/0675; A63B 2200/05; A63B 2200/13; A63B 2200/806; A63B 2200/833; A63B 2225/093
See application file for complete search history.

(56) References Cited

U.S. PATENT DOCUMENTS 3,123,646 A 3/1964 Easton
3,579,339 A 5/1971 Chang
(Continued)

FOREIGN PATENT DOCUMENTS

CA 3086146 A1 * 1/2021 ......... A63B 22/0235
TW 201916852 5/2019
WO 2018080893 5/2018

OTHER PUBLICATIONS

U.S. Appl. No. 29/702,127, filed Sep. 16, 2019, Gordon Cutler.
(Continued)

*Primary Examiner* — Megan Anderson
(74) *Attorney, Agent, or Firm* — RAY QUINNEY & NEBEKER P.C.; Paul N. Taylor

(57) ABSTRACT

A base exercise device includes at least one modular connection. The base exercise device is operable without any modular units connected to one of the modular connections. A modular unit may be physically connected to the base exercise device. The modular unit includes at least one exercise feature that is not included in the base exercise device.

16 Claims, 24 Drawing Sheets

(56) References Cited

U.S. PATENT DOCUMENTS

| | | |
|---|---|---|
| 4,023,795 A | 5/1977 | Pauls |
| 4,300,760 A | 11/1981 | Bobroff |
| D286,311 S | 10/1986 | Martinell |
| 4,681,318 A | 7/1987 | Lay |
| 4,684,126 A | 8/1987 | Dalebout |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet |
| 4,850,585 A | 7/1989 | Dalebout |
| D304,849 S | 11/1989 | Watterson |
| 4,880,225 A | 11/1989 | Lucas |
| 4,883,272 A | 11/1989 | Lay |
| D306,468 S | 3/1990 | Watterson |
| D306,891 S | 3/1990 | Watterson |
| 4,913,396 A | 4/1990 | Dalebout |
| D307,614 S | 5/1990 | Bingham |
| D307,615 S | 5/1990 | Bingham |
| 4,921,242 A | 5/1990 | Watterson |
| 4,932,650 A | 6/1990 | Bingham |
| D309,167 S | 7/1990 | Griffin |
| D309,485 S | 7/1990 | Bingham |
| 4,938,478 A | 7/1990 | Lay |
| D310,253 S | 8/1990 | Bersonnet |
| 4,955,599 A | 9/1990 | Bersonnet |
| 4,971,316 A | 11/1990 | Dalebout |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout |
| D315,765 S | 3/1991 | Measom |
| 4,998,725 A | 3/1991 | Watterson |
| 5,000,442 A | 3/1991 | Dalebout |
| 5,000,443 A | 3/1991 | Dalebout |
| 5,000,444 A | 3/1991 | Dalebout |
| D316,124 S | 4/1991 | Dalebout |
| 5,013,033 A | 5/1991 | Watterson |
| 5,014,980 A | 5/1991 | Bersonnet |
| 5,016,871 A | 5/1991 | Dalebout |
| D318,085 S | 7/1991 | Jacobson |
| D318,086 S | 7/1991 | Bingham |
| D318,699 S | 7/1991 | Jacobson |
| 5,029,801 A | 7/1991 | Dalebout |
| 5,034,576 A | 7/1991 | Dalebout |
| 5,058,881 A | 10/1991 | Measom |
| 5,058,882 A | 10/1991 | Dalebout |
| D321,388 S | 11/1991 | Dalebout |
| 5,062,626 A | 11/1991 | Dalebout |
| 5,062,627 A | 11/1991 | Bingham |
| 5,062,632 A | 11/1991 | Dalebout |
| 5,062,633 A | 11/1991 | Engel |
| 5,067,710 A | 11/1991 | Watterson |
| 5,072,929 A | 12/1991 | Peterson |
| D323,009 S | 1/1992 | Dalebout |
| D323,198 S | 1/1992 | Dalebout |
| D323,199 S | 1/1992 | Dalebout |
| D323,863 S | 2/1992 | Watterson |
| 5,088,729 A | 2/1992 | Dalebout |
| 5,090,694 A | 2/1992 | Pauls |
| 5,102,380 A | 4/1992 | Jacobson |
| 5,104,120 A | 4/1992 | Watterson |
| 5,108,093 A | 4/1992 | Watterson |
| D326,491 S | 5/1992 | Dalebout |
| 5,122,105 A | 6/1992 | Engel |
| 5,135,216 A | 8/1992 | Bingham |
| 5,147,265 A | 9/1992 | Pauls |
| 5,149,084 A | 9/1992 | Dalebout |
| 5,149,312 A | 9/1992 | Croft et al. |
| 5,171,196 A | 12/1992 | Lynch |
| D332,347 S | 1/1993 | Raadt |
| 5,190,505 A | 3/1993 | Dalebout |
| 5,192,255 A | 3/1993 | Dalebout |
| 5,195,937 A | 3/1993 | Engel |
| 5,203,826 A | 4/1993 | Dalebout |
| D335,511 S | 5/1993 | Engel |
| D335,905 S | 5/1993 | Cutter |
| D336,498 S | 6/1993 | Engel |
| 5,217,487 A | 6/1993 | Engel |
| D337,361 S | 7/1993 | Engel |
| D337,666 S | 7/1993 | Peterson |
| D337,799 S | 7/1993 | Cutter |
| 5,226,866 A | 7/1993 | Engel |
| 5,244,446 A | 9/1993 | Engel |
| 5,247,853 A | 9/1993 | Dalebout |
| 5,259,611 A | 11/1993 | Dalebout |
| D342,106 S | 12/1993 | Campbell |
| 5,279,528 A | 1/1994 | Dalebout |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis |
| 5,302,161 A | 4/1994 | Loubert |
| D347,251 S | 5/1994 | Dreibelbis |
| 5,316,534 A | 5/1994 | Dalebout |
| D348,493 S | 7/1994 | Ashby |
| D348,494 S | 7/1994 | Ashby |
| 5,328,164 A | 7/1994 | Soga |
| D349,931 S | 8/1994 | Bostic |
| 5,336,142 A | 8/1994 | Dalebout |
| 5,344,376 A | 9/1994 | Bostic |
| D351,202 S | 10/1994 | Bingham |
| D351,435 S | 10/1994 | Peterson |
| D351,633 S | 10/1994 | Bingham |
| D352,534 S | 11/1994 | Dreibelbis |
| D353,422 S | 12/1994 | Bostic |
| 5,372,559 A | 12/1994 | Dalebout |
| 5,374,228 A | 12/1994 | Buisman |
| 5,382,221 A | 1/1995 | Hsu |
| 5,387,168 A | 2/1995 | Bostic |
| 5,393,690 A | 2/1995 | Fu |
| D356,128 S | 3/1995 | Smith |
| 5,409,435 A | 4/1995 | Daniels |
| 5,429,563 A | 7/1995 | Engel |
| 5,431,612 A | 7/1995 | Holden |
| D360,915 S | 8/1995 | Bostic |
| 5,468,205 A | 11/1995 | McFall |
| 5,489,249 A | 2/1996 | Brewer |
| 5,492,517 A | 2/1996 | Bostic |
| D367,689 S | 3/1996 | Wilkinson |
| 5,511,740 A | 4/1996 | Loubert |
| 5,512,025 A | 4/1996 | Dalebout |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout |
| 5,549,533 A | 8/1996 | Olson |
| 5,554,085 A | 9/1996 | Dalebout |
| 5,569,128 A | 10/1996 | Dalebout |
| 5,591,104 A | 1/1997 | Andrus |
| 5,591,105 A | 1/1997 | Dalebout |
| 5,591,106 A | 1/1997 | Dalebout |
| 5,595,556 A | 1/1997 | Dalebout |
| 5,607,375 A | 3/1997 | Dalebout |
| 5,611,539 A | 3/1997 | Watterson |
| 5,622,527 A | 4/1997 | Watterson |
| 5,626,538 A | 5/1997 | Dalebout |
| 5,626,542 A | 5/1997 | Dalebout |
| D380,024 S | 6/1997 | Novak |
| 5,637,059 A | 6/1997 | Dalebout |
| D380,509 S | 7/1997 | Wilkinson |
| 5,643,153 A | 7/1997 | Nylen |
| 5,645,509 A | 7/1997 | Brewer |
| D384,118 S | 9/1997 | Deblauw |
| 5,662,557 A | 9/1997 | Watterson |
| 5,669,857 A | 9/1997 | Watterson |
| 5,672,140 A | 9/1997 | Watterson |
| 5,674,156 A | 10/1997 | Watterson |
| 5,674,453 A | 10/1997 | Watterson |
| 5,676,624 A | 10/1997 | Watterson |
| 5,683,331 A | 11/1997 | Dalebout |
| 5,683,332 A | 11/1997 | Watterson |

(56) References Cited

U.S. PATENT DOCUMENTS

| | | | |
|---|---|---|---|
| D387,825 | S | 12/1997 | Fleck |
| 5,695,433 | A | 12/1997 | Buisman |
| 5,695,434 | A | 12/1997 | Dalebout |
| 5,695,435 | A | 12/1997 | Dalebout |
| 5,702,325 | A | 12/1997 | Watterson |
| 5,704,879 | A | 1/1998 | Watterson |
| 5,718,657 | A | 2/1998 | Dalebout et al. |
| 5,720,200 | A | 2/1998 | Anderson |
| 5,720,698 | A | 2/1998 | Dalebout |
| D392,006 | S | 3/1998 | Dalebout |
| 5,722,922 | A | 3/1998 | Watterson |
| 5,733,229 | A | 3/1998 | Dalebout |
| 5,743,833 | A | 4/1998 | Watterson |
| 5,762,584 | A | 6/1998 | Daniels |
| 5,762,587 | A | 6/1998 | Dalebout |
| 5,772,560 | A | 6/1998 | Watterson |
| 5,810,698 | A | 9/1998 | Hullett |
| 5,827,155 | A | 10/1998 | Jensen |
| 5,830,114 | A | 11/1998 | Halfen |
| 5,860,893 | A | 1/1999 | Watterson |
| 5,860,894 | A | 1/1999 | Dalebout |
| 5,899,834 | A | 5/1999 | Dalebout |
| D412,953 | S | 8/1999 | Armstrong |
| D413,948 | S | 9/1999 | Dalebout |
| 5,951,441 | A | 9/1999 | Dalebout |
| 5,951,448 | A | 9/1999 | Bolland |
| D416,596 | S | 11/1999 | Armstrong |
| 6,003,166 | A | 12/1999 | Hald |
| 6,019,710 | A | 2/2000 | Dalebout |
| 6,027,429 | A | 2/2000 | Daniels |
| 6,033,347 | A | 3/2000 | Dalebout et al. |
| D425,940 | S | 5/2000 | Halfen |
| 6,059,692 | A | 5/2000 | Hickman |
| D428,949 | S | 8/2000 | Simonson |
| 6,123,646 | A | 9/2000 | Colassi |
| 6,171,217 | B1 | 1/2001 | Cutler |
| 6,171,219 | B1 | 1/2001 | Simonson |
| 6,174,267 | B1 | 1/2001 | Dalebout |
| 6,193,631 | B1 | 2/2001 | Hickman |
| 6,228,003 | B1 | 5/2001 | Hald |
| 6,238,323 | B1 | 5/2001 | Simonson |
| 6,251,052 | B1 | 6/2001 | Simonson |
| 6,261,022 | B1 | 7/2001 | Dalebout et al. |
| 6,280,362 | B1 | 8/2001 | Dalebout et al. |
| 6,296,594 | B1 | 10/2001 | Simonson |
| D450,872 | S | 11/2001 | Dalebout |
| 6,312,363 | B1 | 11/2001 | Watterson |
| D452,338 | S | 12/2001 | Dalebout |
| D453,543 | S | 2/2002 | Cutler |
| D453,948 | S | 2/2002 | Cutler |
| 6,350,218 | B1 | 2/2002 | Dalebout et al. |
| 6,387,020 | B1 | 5/2002 | Simonson |
| 6,413,191 | B1 | 7/2002 | Harris |
| 6,422,980 | B1 | 7/2002 | Simonson |
| 6,447,424 | B1 | 9/2002 | Ashby et al. |
| 6,458,060 | B1 | 10/2002 | Watterson |
| 6,458,061 | B2 | 10/2002 | Simonson |
| 6,471,622 | B1 | 10/2002 | Hammer |
| 6,563,225 | B2 | 5/2003 | Soga |
| 6,601,016 | B1 | 7/2003 | Brown |
| 6,623,140 | B2 | 9/2003 | Watterson |
| 6,626,799 | B2 | 9/2003 | Watterson |
| 6,652,424 | B2 | 11/2003 | Dalebout |
| 6,685,607 | B1 | 2/2004 | Olson |
| 6,695,581 | B2 | 2/2004 | Wasson |
| 6,701,271 | B2 | 3/2004 | Willner |
| 6,702,719 | B1 | 3/2004 | Brown |
| 6,712,740 | B2 | 3/2004 | Simonson |
| 6,730,002 | B2 | 5/2004 | Hald |
| 6,743,153 | B2 | 6/2004 | Watterson |
| 6,746,371 | B1 | 6/2004 | Brown |
| 6,749,537 | B1 | 6/2004 | Hickman |
| 6,761,667 | B1 | 7/2004 | Cutler et al. |
| 6,770,015 | B2 | 8/2004 | Simonson |
| 6,786,852 | B2 | 9/2004 | Watterson |
| 6,808,472 | B1 | 10/2004 | Hickman |
| 6,821,230 | B2 | 11/2004 | Dalebout |
| 6,830,540 | B2 | 12/2004 | Watterson |
| 6,863,641 | B1 | 3/2005 | Brown |
| 6,866,613 | B1 | 3/2005 | Brown |
| 6,875,160 | B2 | 4/2005 | Watterson |
| D507,311 | S | 7/2005 | Butler |
| 6,918,858 | B2 | 7/2005 | Watterson |
| 6,921,351 | B1 | 7/2005 | Hickman |
| 6,974,404 | B1 | 12/2005 | Watterson |
| 6,997,852 | B2 | 2/2006 | Watterson |
| 7,025,713 | B2 | 4/2006 | Dalebout |
| D520,085 | S | 5/2006 | Willardson |
| 7,044,897 | B2 | 5/2006 | Myers |
| 7,052,442 | B2 | 5/2006 | Watterson |
| 7,060,006 | B1 | 6/2006 | Watterson |
| 7,060,008 | B2 | 6/2006 | Watterson et al. |
| 7,070,539 | B2 | 7/2006 | Brown |
| 7,097,588 | B2 | 8/2006 | Watterson |
| D527,776 | S | 9/2006 | Willardson |
| 7,112,168 | B2 | 9/2006 | Dalebout et al. |
| 7,128,693 | B2 | 10/2006 | Brown |
| 7,166,062 | B1 | 1/2007 | Watterson |
| 7,166,064 | B2 | 1/2007 | Watterson |
| 7,169,087 | B2 | 1/2007 | Ercanbrack |
| 7,169,093 | B2 | 1/2007 | Simonson |
| 7,192,388 | B2 | 3/2007 | Dalebout |
| 7,250,022 | B2 | 7/2007 | Dalebout |
| 7,282,016 | B2 | 10/2007 | Simonson |
| 7,285,075 | B2 | 10/2007 | Cutler |
| 7,344,481 | B2 | 3/2008 | Watterson |
| 7,377,882 | B2 | 5/2008 | Watterson |
| 7,425,188 | B2 | 9/2008 | Ercanbrack |
| 7,429,236 | B2 | 9/2008 | Dalebout |
| 7,455,622 | B2 | 11/2008 | Watterson |
| 7,482,050 | B2 | 1/2009 | Olson |
| D588,655 | S | 3/2009 | Utykanski |
| 7,510,509 | B2 | 3/2009 | Hickman |
| 7,537,546 | B2 | 5/2009 | Watterson |
| 7,537,549 | B2 | 5/2009 | Nelson |
| 7,537,552 | B2 | 5/2009 | Dalebout |
| 7,540,828 | B2 | 6/2009 | Watterson |
| 7,549,947 | B2 | 6/2009 | Hickman |
| 7,556,590 | B2 | 7/2009 | Watterson et al. |
| 7,563,203 | B2 | 7/2009 | Dalebout |
| 7,575,536 | B1 | 8/2009 | Hickman |
| 7,601,105 | B1 | 10/2009 | Gipson, III |
| 7,604,573 | B2 | 10/2009 | Dalebout |
| D604,373 | S | 11/2009 | Dalebout |
| 7,618,350 | B2 | 11/2009 | Dalebout |
| 7,618,357 | B2 | 11/2009 | Dalebout |
| 7,625,315 | B2 | 12/2009 | Hickman |
| 7,625,321 | B2 | 12/2009 | Simonson |
| 7,628,730 | B1 | 12/2009 | Watterson |
| 7,628,737 | B2 | 12/2009 | Kowallis |
| 7,637,847 | B1 | 12/2009 | Hickman |
| 7,645,212 | B2 | 1/2010 | Ashby et al. |
| 7,645,213 | B2 | 1/2010 | Watterson |
| 7,658,698 | B2 | 2/2010 | Pacheco |
| 7,674,205 | B2 | 3/2010 | Dalebout |
| 7,713,171 | B1 | 5/2010 | Hickman |
| 7,713,172 | B2 | 5/2010 | Watterson |
| 7,713,180 | B2 | 5/2010 | Wickens |
| 7,717,828 | B2 | 5/2010 | Simonson |
| 7,736,279 | B2 | 6/2010 | Dalebout |
| 7,740,563 | B2 | 6/2010 | Dalebout |
| 7,749,144 | B2 | 7/2010 | Hammer |
| 7,766,797 | B2 | 8/2010 | Dalebout |
| 7,771,329 | B2 | 8/2010 | Dalebout |
| 7,775,940 | B2 | 8/2010 | Dalebout |
| 7,789,800 | B1 | 9/2010 | Watterson |
| 7,798,946 | B2 | 9/2010 | Dalebout |
| 7,815,550 | B2 | 10/2010 | Watterson |
| 7,857,731 | B2 | 12/2010 | Hickman |
| 7,862,475 | B2 | 1/2011 | Watterson |
| 7,862,478 | B2 | 1/2011 | Watterson |
| 7,862,483 | B2 | 1/2011 | Hendrickson |
| D635,207 | S | 3/2011 | Dalebout |
| 7,901,330 | B2 | 3/2011 | Dalebout |

(56) References Cited

U.S. PATENT DOCUMENTS

| | | |
|---|---|---|
| 7,909,740 B2 | 3/2011 | Dalebout |
| 7,980,996 B2 | 7/2011 | Hickman |
| 7,981,000 B2 | 7/2011 | Watterson |
| 7,985,164 B2 | 7/2011 | Ashby |
| 8,029,415 B2 | 10/2011 | Ashby et al. |
| 8,033,960 B1 | 10/2011 | Dalebout |
| D650,451 S | 12/2011 | Olson |
| D652,877 S | 1/2012 | Dalebout |
| 8,152,702 B2 | 4/2012 | Pacheco |
| D659,775 S | 5/2012 | Olson |
| D659,777 S | 5/2012 | Watterson |
| D660,383 S | 5/2012 | Watterson |
| D664,613 S | 7/2012 | Dalebout |
| 8,251,874 B2 | 8/2012 | Ashby |
| 8,298,123 B2 | 10/2012 | Hickman |
| 8,298,125 B2 | 10/2012 | Colledge |
| D671,177 S | 11/2012 | Sip |
| D671,178 S | 11/2012 | Sip |
| D673,626 S | 1/2013 | Olson |
| 8,690,735 B2 | 4/2014 | Watterson |
| D707,763 S | 6/2014 | Cutler |
| 8,740,753 B2 | 6/2014 | Olson |
| 8,758,201 B2 | 6/2014 | Ashby |
| 8,771,153 B2 | 7/2014 | Dalebout |
| 8,784,270 B2 | 7/2014 | Watterson |
| 8,808,148 B2 | 8/2014 | Watterson |
| 8,814,762 B2 | 8/2014 | Butler |
| D712,493 S | 9/2014 | Ercanbrack |
| 8,840,075 B2 | 9/2014 | Olson |
| 8,845,493 B2 | 9/2014 | Watterson |
| 8,870,726 B2 | 10/2014 | Watterson |
| 8,876,668 B2 | 11/2014 | Hendrickson |
| 8,894,549 B2 | 11/2014 | Colledge |
| 8,894,555 B2 | 11/2014 | Olson |
| 8,911,330 B2 | 12/2014 | Watterson |
| 8,920,288 B2 | 12/2014 | Dalebout |
| 8,986,165 B2 | 3/2015 | Ashby |
| 8,992,364 B2 | 3/2015 | Law |
| 8,992,387 B2 | 3/2015 | Watterson |
| D726,476 S | 4/2015 | Ercanbrack |
| 9,028,368 B2 | 5/2015 | Ashby |
| 9,028,370 B2 | 5/2015 | Watterson |
| 9,039,578 B2 | 5/2015 | Dalebout |
| D731,011 S | 6/2015 | Buchanan |
| 9,072,930 B2 | 7/2015 | Ashby |
| 9,119,983 B2 | 9/2015 | Rhea |
| 9,123,317 B2 | 9/2015 | Watterson |
| 9,126,071 B2 | 9/2015 | Smith |
| 9,126,072 B2 | 9/2015 | Watterson |
| 9,138,615 B2 | 9/2015 | Olson |
| 9,142,139 B2 | 9/2015 | Watterson |
| 9,144,703 B2 | 9/2015 | Dalebout |
| 9,149,683 B2 | 9/2015 | Smith |
| 9,186,535 B2 | 11/2015 | Ercanbrack |
| 9,186,549 B2 | 11/2015 | Watterson |
| 9,254,409 B2 | 2/2016 | Dalebout |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson |
| 9,352,186 B2 | 5/2016 | Watterson |
| 9,375,605 B2 | 6/2016 | Tyger |
| 9,381,394 B2 | 7/2016 | Mortensen |
| 9,387,387 B2 | 7/2016 | Dalebout |
| 9,393,453 B2 | 7/2016 | Watterson |
| 9,403,047 B2 | 8/2016 | Olson |
| 9,403,051 B2 | 8/2016 | Cutler |
| 9,421,416 B2 | 8/2016 | Mortensen |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen |
| 9,498,668 B2 | 11/2016 | Smith |
| 9,517,378 B2 | 12/2016 | Ashby |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout |
| 9,586,090 B2 | 3/2017 | Watterson |
| 9,604,099 B2 | 3/2017 | Taylor |
| 9,616,276 B2 | 4/2017 | Dalebout |
| 9,616,278 B2 | 4/2017 | Olson |
| 9,623,281 B2 | 4/2017 | Hendrickson |
| 9,630,060 B2 * | 4/2017 | Volkerink .......... A63B 71/0619 |
| 9,636,567 B2 | 5/2017 | Brammer |
| 9,675,839 B2 | 6/2017 | Dalebout |
| 9,682,307 B2 | 6/2017 | Dalebout |
| 9,694,234 B2 | 7/2017 | Dalebout |
| 9,694,242 B2 | 7/2017 | Ashby |
| 9,737,755 B2 | 8/2017 | Dalebout |
| 9,757,605 B2 | 9/2017 | Olson |
| 9,764,186 B2 | 9/2017 | Dalebout |
| 9,767,785 B2 | 9/2017 | Ashby |
| 9,795,822 B2 | 10/2017 | Smith |
| 9,808,672 B2 | 11/2017 | Dalebout |
| 9,814,929 B2 * | 11/2017 | Moser ................ A63B 22/0023 |
| 9,849,326 B2 | 12/2017 | Smith |
| 9,878,210 B2 | 1/2018 | Watterson |
| 9,889,334 B2 | 2/2018 | Ashby |
| 9,889,339 B2 | 2/2018 | Douglass |
| 9,937,376 B2 | 4/2018 | McInelly |
| 9,937,377 B2 | 4/2018 | McInelly |
| 9,937,378 B2 | 4/2018 | Dalebout |
| 9,937,379 B2 | 4/2018 | Mortensen |
| 9,943,719 B2 | 4/2018 | Smith |
| 9,943,722 B2 | 4/2018 | Dalebout |
| 9,948,037 B2 | 4/2018 | Ashby |
| 9,968,816 B2 | 5/2018 | Olson |
| 9,968,821 B2 | 5/2018 | Finlayson |
| 9,968,823 B2 | 5/2018 | Cutler |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith |
| 10,071,285 B2 | 9/2018 | Smith |
| 10,085,586 B2 | 10/2018 | Smith |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout |
| 10,293,211 B2 | 5/2019 | Watterson |
| D852,292 S | 6/2019 | Cutler |
| 10,343,017 B2 | 7/2019 | Jackson |
| 10,376,736 B2 | 8/2019 | Powell |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |

(56) References Cited

U.S. PATENT DOCUMENTS

| Patent/Publication No. | Date | Name |
|---|---|---|
| 10,441,840 B2 | 10/2019 | Dalebout |
| 10,441,844 B2 | 10/2019 | Powell |
| 10,449,416 B2 | 10/2019 | Dalebout |
| 10,471,299 B2 | 11/2019 | Powell |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 10,561,877 B2 | 2/2020 | Workman |
| 10,561,893 B2 * | 2/2020 | Chatterton ......... A63B 22/0235 |
| 10,561,894 B2 | 2/2020 | Dalebout |
| 10,569,121 B2 | 2/2020 | Watterson |
| 10,569,123 B2 | 2/2020 | Hochstrasser |
| 10,625,114 B2 | 4/2020 | Ercanbrack |
| 10,625,137 B2 | 4/2020 | Dalebout |
| 10,661,114 B2 | 5/2020 | Watterson et al. |
| 10,668,320 B2 | 6/2020 | Watterson |
| 10,671,705 B2 | 6/2020 | Capell et al. |
| 10,688,346 B2 | 6/2020 | Brammer |
| 10,702,736 B2 | 7/2020 | Weston et al. |
| 10,709,925 B2 | 7/2020 | Dalebout et al. |
| 10,726,730 B2 | 7/2020 | Watterson |
| 10,729,965 B2 | 8/2020 | Powell |
| 10,758,767 B2 | 8/2020 | Olson |
| 10,786,706 B2 | 9/2020 | Smith |
| 10,864,407 B2 | 12/2020 | Watterson |
| 10,918,905 B2 | 2/2021 | Powell et al. |
| 10,932,517 B2 | 3/2021 | Ashby et al. |
| 10,940,360 B2 | 3/2021 | Dalebout et al. |
| 10,953,268 B1 | 3/2021 | Dalebout et al. |
| 10,953,305 B2 | 3/2021 | Dalebout et al. |
| 10,967,214 B1 | 4/2021 | Olson |
| 10,994,173 B2 | 5/2021 | Watterson |
| 11,000,730 B2 | 5/2021 | Dalebout et al. |
| 11,013,960 B2 | 5/2021 | Watterson |
| 11,033,777 B1 | 6/2021 | Watterson et al. |
| 11,058,913 B2 | 7/2021 | Dalebout et al. |
| 11,058,914 B2 | 7/2021 | Powell |
| 11,187,285 B2 | 11/2021 | Wrobel |
| 11,310,997 B2 * | 4/2022 | Yoo ..................... A63B 24/0087 |
| 11,412,709 B2 * | 8/2022 | Yoo ..................... A61M 21/02 |
| 2002/0016235 A1 | 2/2002 | Ashby |
| 2002/0077221 A1 | 6/2002 | Dalebout |
| 2002/0159253 A1 | 10/2002 | Dalebout |
| 2003/0045406 A1 | 3/2003 | Stone |
| 2004/0091307 A1 | 5/2004 | James |
| 2004/0171464 A1 | 9/2004 | Ashby |
| 2004/0171465 A1 | 9/2004 | Hald |
| 2005/0049123 A1 | 3/2005 | Dalebout |
| 2005/0077805 A1 | 4/2005 | Dalebout |
| 2005/0107229 A1 | 5/2005 | Wickens |
| 2005/0164839 A1 | 7/2005 | Watterson |
| 2005/0272577 A1 | 12/2005 | Olson |
| 2007/0117683 A1 | 5/2007 | Ercanbrack |
| 2007/0254778 A1 | 11/2007 | Ashby |
| 2008/0051256 A1 | 2/2008 | Ashby |
| 2008/0242520 A1 | 10/2008 | Hubbard |
| 2008/0300110 A1 | 12/2008 | Smith |
| 2009/0105052 A1 | 4/2009 | Dalebout |
| 2010/0242246 A1 | 9/2010 | Dalebout |
| 2012/0237911 A1 | 9/2012 | Watterson |
| 2012/0295774 A1 | 11/2012 | Dalebout |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson |
| 2013/0196822 A1 | 8/2013 | Watterson |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson |
| 2013/0281241 A1 | 10/2013 | Watterson |
| 2014/0024499 A1 | 1/2014 | Watterson |
| 2014/0073970 A1 | 3/2014 | Ashby |
| 2014/0121071 A1 | 5/2014 | Strom |
| 2014/0135173 A1 | 5/2014 | Watterson |
| 2014/0274574 A1 | 9/2014 | Shorten |
| 2014/0274578 A1 * | 9/2014 | Kennedy ............... A63B 23/047 482/54 |
| 2014/0274579 A1 | 9/2014 | Olson |
| 2014/0287884 A1 | 9/2014 | Buchanan |
| 2014/0309085 A1 | 10/2014 | Watterson |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253735 A1 | 9/2015 | Watterson |
| 2015/0253736 A1 | 9/2015 | Watterson |
| 2015/0258560 A1 | 9/2015 | Ashby |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0346595 A1 | 12/2016 | Dalebout |
| 2017/0036053 A1 | 2/2017 | Smith |
| 2017/0056711 A1 | 3/2017 | Dalebout |
| 2017/0056715 A1 | 3/2017 | Dalebout |
| 2017/0124912 A1 | 5/2017 | Ashby |
| 2017/0193578 A1 | 7/2017 | Watterson |
| 2017/0197113 A1 | 7/2017 | Robinson |
| 2017/0266489 A1 | 9/2017 | Douglass |
| 2017/0266533 A1 | 9/2017 | Dalebout |
| 2017/0270820 A1 | 9/2017 | Ashby |
| 2018/0001135 A1 | 1/2018 | Powell |
| 2018/0036585 A1 | 2/2018 | Powell |
| 2018/0085630 A1 | 3/2018 | Capell |
| 2018/0089396 A1 | 3/2018 | Capell |
| 2018/0099116 A1 | 4/2018 | Ashby |
| 2018/0099180 A1 | 4/2018 | Wilkinson |
| 2018/0111034 A1 | 4/2018 | Watterson |
| 2018/0117385 A1 | 5/2018 | Watterson |
| 2018/0117393 A1 | 5/2018 | Ercanbrack |
| 2018/0154209 A1 | 6/2018 | Watterson |
| 2018/0200566 A1 | 7/2018 | Weston |
| 2018/0221707 A1 * | 8/2018 | Weaver ................ A63B 22/02 |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout |
| 2019/0269971 A1 | 9/2019 | Capell |
| 2019/0275366 A1 | 9/2019 | Powell |
| 2019/0282852 A1 | 9/2019 | Dalebout |
| 2019/0328079 A1 | 10/2019 | Ashby |
| 2019/0329091 A1 | 10/2019 | Powell |
| 2019/0376585 A1 | 12/2019 | Buchanan |
| 2020/0009417 A1 | 1/2020 | Dalebout |
| 2020/0016459 A1 | 1/2020 | Smith |
| 2020/0222751 A1 | 7/2020 | Dalebout et al. |
| 2020/0238130 A1 | 7/2020 | Silcock |
| 2020/0254295 A1 | 8/2020 | Watterson |
| 2020/0254309 A1 | 8/2020 | Watterson |
| 2020/0254311 A1 | 8/2020 | Watterson |
| 2020/0391069 A1 | 8/2020 | Olson et al. |
| 2020/0338389 A1 | 10/2020 | Dalebout et al. |

(56) References Cited

U.S. PATENT DOCUMENTS

| | | | |
|---|---|---|---|
| 2020/0368575 A1 | 11/2020 | Hays et al. | |
| 2021/0046351 A1 | 2/2021 | Ercanbrack et al. | |
| 2021/0046353 A1 | 2/2021 | Dalebout et al. | |
| 2021/0086018 A1 | 3/2021 | Dalebout | |
| 2021/0086032 A1 | 3/2021 | Watterson | |
| 2021/0106899 A1 | 4/2021 | Willardson et al. | |
| 2021/0110910 A1 | 4/2021 | Ostler et al. | |
| 2021/0138332 A1 | 5/2021 | Dalebout et al. | |
| 2021/0146191 A1 | 5/2021 | Dalebout et al. | |
| 2021/0146221 A1 | 5/2021 | Dalebout et al. | |
| 2021/0161245 A1 | 6/2021 | Ashby et al. | |
| 2021/0213331 A1 | 7/2021 | Watterson | |
| 2021/0213332 A1 | 7/2021 | Watterson et al. | |
| 2021/0220698 A1 | 7/2021 | Dalebout et al. | |
| 2021/0268336 A1 | 9/2021 | Watterson et al. | |
| 2021/0291013 A1 | 9/2021 | Nascimento | |
| 2021/0299518 A1 | 9/2021 | Brammer et al. | |
| 2021/0299542 A1 | 9/2021 | Brammer et al. | |
| 2021/0339079 A1 | 11/2021 | Dalebout et al. | |
| 2022/0023702 A1 | 1/2022 | Watterson | |
| 2022/0062685 A1 | 3/2022 | Ashby et al. | |
| 2022/0074454 A1 | 3/2022 | Wrobel | |
| 2022/0074455 A1 | 3/2022 | Wrobel | |
| 2022/0339504 A1* | 10/2022 | Intonato | A63B 24/0075 |

OTHER PUBLICATIONS

U.S. Appl. No. 13/088,007, filed Apr. 15, 2011, Scott R. Watterson.
U.S. Appl. No. 15/973,176, filed May 7, 2018, Melanie Douglass.
U.S. Appl. No. 16/879,376, filed May 20, 2020, David Hays.
U.S. Appl. No. 16/992,870, filed Aug. 13, 2020, Gaylen Ercanbrack.
U.S. Appl. No. 16/992,886, filed Aug. 13, 2020, William T. Dalebout.
U.S. Appl. No. 62/897,113, filed Sep. 9, 2019, Megan Jane Ostler.
U.S. Appl. No. 62/934,291, filed Nov. 12, 2019, William T. Dalebout.
U.S. Appl. No. 62/934,297, filed Nov. 12, 2019, William T. Dalebout.
U.S. Appl. No. 62/991,378, filed Mar. 18, 2020, Chris Nascimento.
U.S. Appl. No. 62/994,204, filed Mar. 24, 2020, Chase Brammer.
U.S. Appl. No. 63/073,081, filed Sep. 1, 2020, Darren C. Ashby.
U.S. Appl. No. 63/079,697, filed Sep. 17, 2020, Jared Willardson.
U.S. Appl. No. 63/086,793, filed Oct. 2, 2020, Darren C. Ashby.
U.S. Appl. No. 29/702,127, filed Sep. 16, 2019, Cutler et al.
U.S. Appl. No. 63/079,697, filed Sep. 7, 2020, Willardson et al.
U.S. Appl. No. 17/066,485, filed Oct. 9, 2020, Weston et al.
U.S. Appl. No. 63/086,793, filed Oct. 20, 2020, Ashby.
U.S. Appl. No. 63/134,036, filed Jan. 5, 2021, Ercanbrack et al.
U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.
U.S. Appl. No. 63/200,903, filed Apr. 2, 2021, Watterson et al.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 17/462,687, filed Aug. 31, 2021, Ashby et al.
U.S. Appl. No. 63/073,081, filed Sep. 1, 2021, Ashby et al.
U.S. Appl. No. 17/476,899, filed Sep. 16, 2021, Willardson et al.
U.S. Appl. No. 17/492,104, filed Oct. 1, 2021, Ashby.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 17/568,882, filed Jan. 5, 2022, Ercanbrack et al.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 17/589,027, filed Jan. 31, 2022, Dalebout et al.
U.S. Appl. No. 17/589,075, filed Jan. 31, 2022, Ashby.
U.S. Appl. No. 17/066,485, filed Oct. 9, 2020, Jared Weston.
U.S. Appl. No. 17/141,880, filed Jan. 5, 2021, Wade A. Powell.
U.S. Appl. No. 17/149,299, filed Jan. 14, 2021, William T. Dalebout.
U.S. Appl. No. 17/159,814, filed Jan. 27, 2021, William T. Dalebout.
U.S. Appl. No. 17/172,880, filed Feb. 10, 2021, Darren C. Ashby.
U.S. Appl. No. 17/178,173, filed Feb. 17, 2021, Evan Charles Tinney.
U.S. Appl. No. 17/217,938, filed Apr. 8, 2021, Eric S. Watterson.
U.S. Appl. No. 62/912,451, filed Sep. 9, 2019, Megan Jane Ostler.
U.S. Appl. No. 63/134,036, filed Jan. 5, 2021, Gaylen Ercanbrack.
U.S. Appl. No. 63/150,066, filed Feb. 16, 2021, Kent M. Smith.
U.S. Appl. No. 63/156,801, filed Mar. 4, 2021, Eric S. Watterson.
U.S. Appl. No. 63/165,498, filed Mar. 24, 2021, Mark Archer.
U.S. Appl. No. 63/200,903, filed Apr. 2, 2021, Eric S. Watterson.
International Search Report and Written Opinion issued in PCT Application No. PCT/US2020/055109 dated Jan. 14, 2021.
Office Action for Taiwanese Patent Application No. 109134942, dated Oct. 4, 2021, 9 pages.

* cited by examiner

MODULAR EXERCISE DEVICE

CROSS-REFERENCE TO RELATED APPLICATIONS

N/A.

BACKGROUND

Background and Relevant Art

Physical exercise is beneficial to physical and mental health. Some people choose to exercise indoors on an exercise device, such as a treadmill, a stationary bicycle, an elliptical machine, a rower, and combinations thereof. Many commercial gyms operate multiple exercise devices, and a user may travel to a commercial gym to use an exercise device. Some users may use an exercise device at home, work, a community center, or other location.

Exercise devices have different features for use. Conventionally, an exercise device may have multiple models, with each model including a suite of features. The features are fixed for each model, even if a user has no need of, interest in, or capability to use the feature.

BRIEF SUMMARY

In some embodiments, a kit for an exercise device includes a base unit. The base unit has a modular connection. A modular unit is configured to be physically connected to the base unit at the modular connection. The modular unit includes at least one exercise feature not included in the base unit.

In some embodiments, the base unit is a treadmill, and the modular units include a console, a incline mechanism, a modular motor, a sensor package, or other modular units. In some embodiments, the base unit is a stationary bicycle, and the modular units include a console, a flywheel, a flywheel resistance mechanism, pedals, and other modular units. In some embodiments, the base unit is an elliptical machine, and the modular units include a console, a flywheel, a flywheel resistance mechanism, pedals, and other modular units. In some embodiments, the base unit is a rower, and the modular units include console, a flywheel, a flywheel resistance mechanism, pedals, and other modular units.

In some embodiments, the base unit is a flywheel, and the modular units include exercise frames. The exercise frame may be a stationary bicycle frame, an elliptical machine frame, or a rower frame. The flywheel may include modular units, including strength training units and resistance mechanisms.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a representation of a base modular treadmill, according to at least one embodiment of the present disclosure;

FIG. 3-2 through FIG. 3-6 are representations of the modular treadmill of FIG. 3-1 including modular units, according to at least one embodiment of the present disclosure;

FIG. 4 is a schematic representation of a modular stationary bicycle, according to at least one embodiment of the present disclosure;

FIG. 5-1 is a representation of a base modular stationary bicycle, according to at least one embodiment of the present disclosure;

FIG. 5-2 through FIG. 5-4 are representations of the modular stationary bicycle of FIG. 5-1 including modular units, according to at least one embodiment of the present disclosure;

FIG. 6 is a schematic representation of a modular elliptical machine, according to at least one embodiment of the present disclosure;

FIG. 7-1 is a representation of a base modular elliptical machine, according to at least one embodiment of the present disclosure;

FIG. 7-2 and FIG. 7-3 are representations of the modular elliptical machine of FIG. 7-1 including modular units, according to at least one embodiment of the present disclosure;

FIG. 7-1 is a representation of a base modular rower, according to at least one embodiment of the present disclosure;

FIG. 7-2 is a representation of the modular rower of FIG. 7-1 including modular units, according to at least one embodiment of the present disclosure;

FIG. 11-1 and FIG. 11-2 are representations of a modular exercise program, according to at least one embodiment of the present disclosure.

DETAILED DESCRIPTION

This disclosure generally relates to devices, systems, kits, and methods for modular exercise devices. Modular exercise devices may include a base unit that includes one or more modular connections connectable to a modular unit. In this manner, the base unit may be upgraded to include exercise features from the modular unit that are not included in the base unit. This may allow a user to purchase an exercise device and customize it, either at the time of purchase or over time as the user's needs and/or finances allow. This may improve the exercise experience for the user by allowing the user to select which features he or she would like to use, without the frustration of paying for undesired features or elements in an exercise device.

Figure 1:
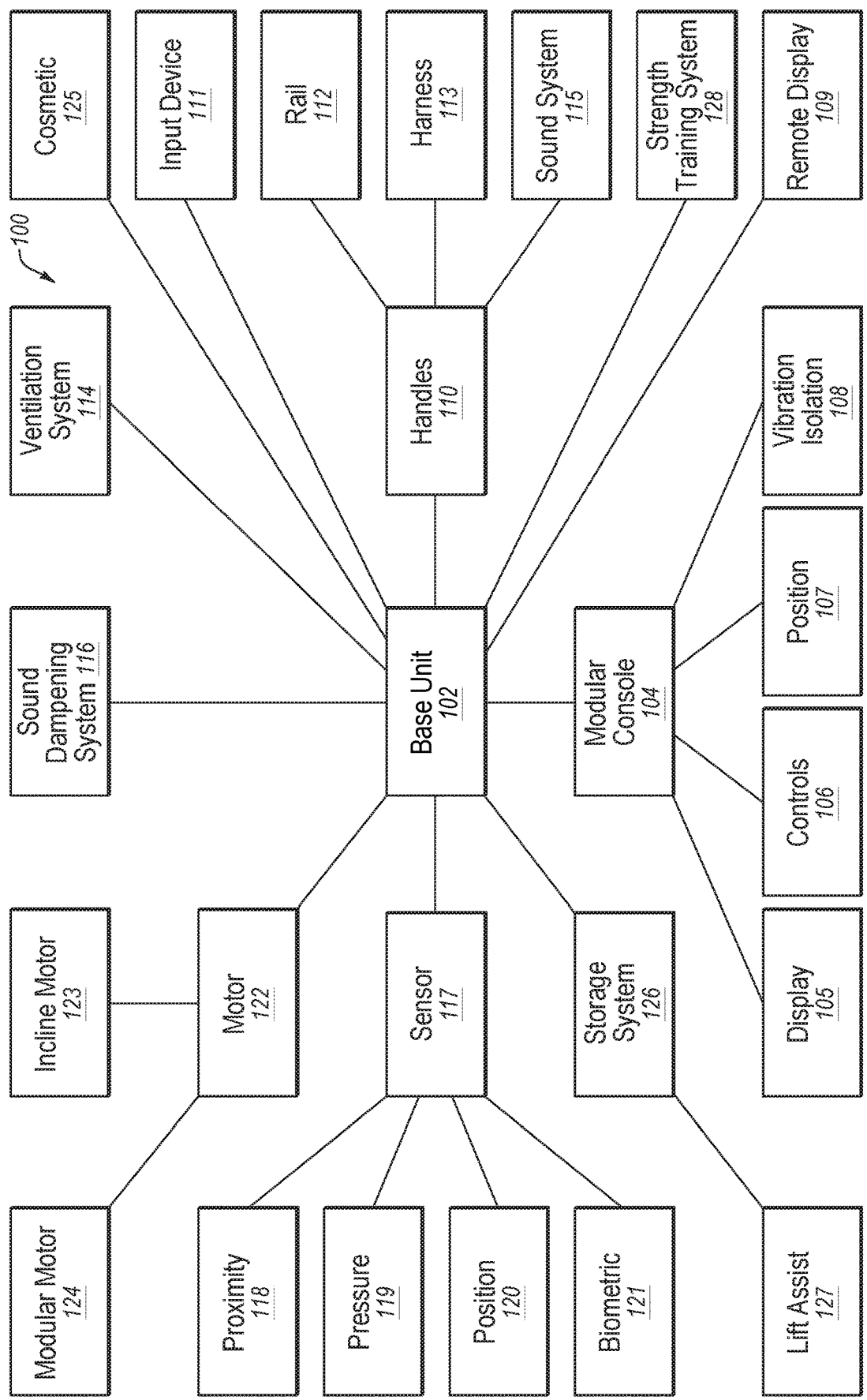
FIG. 1 is a schematic representation of a modular exercise device, according to at least one embodiment of the present disclosure.

FIG. 1 is a schematic representation of a modular exercise device 100, according to at least one embodiment of the present disclosure. The modular exercise device 100 includes a base unit 102. The base unit 102 may be the base of any exercise device, such as the deck of a treadmill, the frame of a stationary bicycle, the frame of an elliptical machine, or the frame of a rower. In some embodiments, the base unit 102 may be a functioning exercise device. In other words, the base unit 102 may operate without any attached modular device. Thus, a user may purchase the base unit 102 and exercise on the base unit 102 without the use of any modular unit connected to a modular connection. This means that the base unit 102 may operate as a cohesive whole. Thus, the modular unit is not necessary to operate the base unit 102.

For example, a treadmill base unit 102 may include a deck, a front pulley, a back pulley, and a tread belt wrapped around the deck from the front pulley to the back pulley. The tread belt may be configured to be rotated such that a user may walk or run on the treadmill base unit 102. In other examples, a stationary bicycle base unit 102 or an elliptical base unit 102 may include a frame, a flywheel, and pedals. A user may transfer a torque to the flywheel by rotating the pedals. In still other examples, a rower base unit 102 may include a cable and a handle connected to a flywheel, and a seat slidingly connected to a frame such that the user may slide along the frame, holding the handle, which may rotate the flywheel.

The base unit 102 may only include basic exercise features. In other words, the base unit 102 may include exercise features sufficient for a user to complete the underlying exercise, but with few or no ornamentations, variations, or extra features. Exercise features may include additional information about the exercise, display of information about the exercise, display of virtual environments, synchronization of elements of the exercise to other elements, motivational support from virtual trainers, control over parameters such as speed, resistance, incline, and combinations of the foregoing.

For example, a treadmill base unit 102 may be limited to a low speed, have a set incline angle, not include a console or handles, not be motorized, not include any other upgrade or feature, or combinations of the foregoing. In other examples, a stationary bicycle may include a fixed incline angle, manual resistance adjustment, no console, platform pedals, a hard seat, may not include any other upgrade or feature, or combinations of the foregoing. In still other examples, a stationary elliptical may include a fixed incline angle, manual resistance adjustment, no console, no handles, may not include any other upgrade or feature, or combinations of the foregoing. In yet other examples, a rower may include a fixed incline angle, manual resistance adjustment, no console, a hard seat, may not include any other upgrade or feature, or combinations of the foregoing.

In some embodiments, a base unit 102 may include different functionality to accommodate features not included in the base unit 102. For example, the base unit 102 may not have an incline mechanism. To accommodate exercise plans that call for a change in the incline, the base unit 102 may change the resistance of the resistance mechanism (e.g., the flywheel), and/or the speed of a movable element in lieu of changing the incline. When a modular unit including the omitted exercise feature is installed on the base unit 102, then the base unit 102 may change functionality to utilize the new exercise feature. For example, if an incline mechanism is installed on the base unit 102, then the base unit 102 may change the incline at the appropriate location in a workout, rather than the resistance of the resistance mechanism and/or the speed of the movable element. This may improve the exercise experience by allowing the user to exercise different muscles and increase the variety of a workout on the modular exercise device 100.

The base unit 102 may include one or more modular connections. A modular unit may be configured to be connected to the base unit 102 through a modular connection. In this manner, the base unit 102 may be upgraded with a feature not included in the base unit 102. The modular connection may include any type of connection. For example, the modular connection may be a physical connection. In other words, the modular connection may physically receive a modular unit. In some embodiments, the modular connection may structurally support the modular unit. In some embodiments, the modular unit may not perform as intended until physically connected to the modular connection. In some embodiments, the modular connection may be a rigid connection. For example, the modular connection may rigidly support the modular unit such that the modular unit may not move relative to the base unit 102. In some embodiments, the modular connection may be a movable connection, such as a rotatable or extendable connection. Thus, the modular unit may be physically connected to the base unit 102 at the modular connection.

In some embodiments, the modular connection may be an electronic connection. For example, the modular connection may be a data connection, such that data from the modular unit may be transferred to the base unit 102 through the modular connection, or data from the base unit 102 may be transferred to the modular unit through the modular connection. In other examples, the modular connection may be a power connection, such that power may be transferred to the base unit 102 from the modular unit through the modular connection, or power may be transferred to the modular unit from the base unit 102 through the modular connection. In some embodiments, the modular connection may include both data and power transfer through the modular connection.

In some embodiments, the modular connection may be both a physical and an electronic connection. For example, a console may be inserted into the modular connection such that the console is physically supported by the modular connection at the base unit 102. The console may also be electronically connected to the base unit 102 through the modular connection such that the console may receive one or both of power and data, and transmit one or both of power and data, to the base unit 102. In other embodiments, the modular connection may be a wireless electronic connection, including both wireless power and data communication. In other embodiments, the modular unit may include a virtual reality headset and docking station, with the docking station plugged into and supported by the modular connection.

In some embodiments, the modular connection may be interchangeable. In other words, the modular unit that is inserted into the modular connection may be removed and replaced with another modular unit. The other modular unit may be an upgraded modular unit of the same type as the original, or a different modular unit that includes a different exercise feature than included in the original modular unit.

The modular unit connected to the modular connection may include a plurality of different modular units. For example, the base unit 102 may not include a console, and a modular unit may include a modular console 104. The modular console 104 may connect to the base unit 102 at a modular connection on the base unit. For example, the base unit 102 may include a slot into which a connection end of the modular console 104 may be inserted. The modular connection and the modular console 104 may include an electrical connection that connects the modular console 104 to the base unit 102. This may allow the modular console 104 to communicate with the base unit 102. For example, the base unit 102 may send workout information to the modular console 104. In other examples, the modular console 104 may send instructions or other information to the base unit 102. In this manner, the base unit 102 may be upgraded with a modular console 104 to provide the user with additional information about and/or control over his or her workout. A user purchasing the base unit 102 may not have interest in or need of exercise information at the time of purchase. However, as the user uses the base unit 102, he or she may become interested in, or develop a need for, the exercise information that may be provided via the modular console 104. Therefore, by acquiring and installing the modular console 104, the user may improve his or her exercise experience without having to purchase an entirely new exercise device.

In some embodiments, the modular console 104 may be modularly modifiable or upgradeable. For example, the modular console 104 may be a base modular console and may include a base display. The base display may have a base resolution, size, or functionality. The base display may be removed from the modular console 104 and replaced with an upgraded display 105. For example, the upgraded display 105 may have a higher resolution, a greater size, or added functionality, such as touch-screen functionality. In some embodiments, the base display may be upgraded two or more times. For example, the base display may be upgraded to an upgraded display 105 including a larger size. The upgraded display 105 may then be further upgraded to include a higher resolution. The upgraded display 105 may then be still further upgraded to include a touch-screen. In this manner, the modular exercise device 100 may be upgraded to include a modular console 104, and may be further upgraded to include an upgraded console. This may allow the user to purchase and install the display that matches his or her interests and needs, which may improve the user's exercise experience by allowing him or her to match the cost of the exercise device to his or her interests, needs, and budget.

The base modular console 104 may include a console body having a display mount. In some embodiments, the display mount may be sized to fit the base display and at least one upgraded display 105. Thus, the base modular console 104 may be upgraded without replacing the console body. In other embodiments, the display mount may not be sized for at least one upgraded display 105. If the upgraded display 105 does not fit the display mount, the console body may have to be replaced to a console body including an upgraded display mount. In this manner, the base modular console 104 may be changed and rearranged to include a display that matches a user's desires and needs.

The base modular console 104 may not include any controls, or may include a set of base controls. In some embodiments, the base modular console 104 may be upgraded to include upgraded controls 106. In other words, the base controls may be replaceable with the upgraded controls 106. For example, the base unit 102 may include a manually adjustable flywheel resistance. The base modular console 104 may not include any controls directed to changing the flywheel resistance. Upgraded controls 106 may be directed to electronically changing the flywheel resistance. In other examples, the base modular console 104 may include base electronic controls to change the flywheel resistance. Upgraded controls 106 may automatically change the flywheel resistance in response to a pre-programmed exercise program. In still other examples, the base modular console 104 may include analog controls, and upgraded controls 106 may include digital controls. In yet other examples, the base modular console 104 may include base controls in the form of physical buttons, and upgraded controls 106 may include touch-screen controls. Upgradable controls 106 may improve the user's exercise experience by allowing the user to select controls that match his or her interests, needs, and/or budget.

In some embodiments, the upgraded display 105 may include the upgraded controls 106. For example, the upgraded display 105 may be a touch-screen display, and the user may be able to change exercise features on the touch-screen display. This may render the base controls on the base modular console 104 redundant. In some embodiments, the base controls may be located on the console in a location that may be covered by the upgraded display 105.

In some embodiments, the base console 104 may have a fixed position. For example, the base console 104 may have a position that has a fixed height, proximity to the user, angular orientation, or other fixed position. The base console 104 may be upgradeable to an upgraded console that may have a changeable position 107. In some embodiments, the position of the upgraded console may be manually changeable, such as by rotating a friction hinge. In other embodiments, the upgraded console may electronically change the position of the console using a motor or a piston. This may improve the user's exercise experience by allowing him or her to select a console that matches his or her interests, needs, and budget.

In some embodiments, the upgraded console may be further upgraded to include a motor that automatically changes the position of the console based on a position of the user. For example, the upgraded console may be upgraded to include a position sensor. The position sensor may determine a position of the user. Based on the sensed position of the user, the position of the console, including one or more of the orientation, the height, or the lateral position of the console may be changed to keep the console in an optimal position with respect to the user. For example, the sensor may include a camera. The console may analyze an image from the camera to determine a position of the user. Based on the image from the camera, the console may automatically change the position of the console.

In some embodiments, the console 104 may vibrate or otherwise move in response to the user exercising, such as by changes in the position of the user, footfalls, pedaling, rotation of a flywheel, or induced vibrations. This may make information displayed on the console 104 difficult to read and/or interpret. The console 104 may be upgraded to include a vibration isolation upgrade 108. The vibration isolation upgrade 108 may be installed to reduce or eliminate vibrations on the console 104. This may make it easier for a user to view and interact the console during a workout.

In some embodiments, the console 104 may be upgraded to include a desk. A user may place a computer, a monitor, books, paper, or any other thing on the desk, and the user may use the desk while being active. For example, the base unit 102 may be a treadmill, and the upgraded console may be a desk. The user may walk while working at the desk. This may improve the user's health by keeping him active during what may otherwise be a sedentary time.

In some embodiments, the console 104 may be upgradeable with one or more of upgraded display, upgraded controls, positioning upgrade, and vibration isolation upgrade. In this manner, a user may select which features of an exercise device are important to her, and only purchase those features. This may help the user to not spend money on features that she will not use.

In some embodiments, the user may not wish to interact with a console 104. The base unit 102 may include a remote display upgrade 109. The remote display upgrade 109 may plug in to the base unit 102 and communicate workout information to a remote display separate from the exercise device, such as a television, a computer monitor, a tablet, a mobile phone, or other remote screen. For example, the remote display upgrade 109 may communicate any information that may be displayed on a console display (such as the upgraded display 105 on the console 104) on a television. This may allow a user to operate the modular exercise device 100 without a console, which may save space, have improved aesthetics to a user, or decrease cost to the user who may already have one or more displays in his home.

In some embodiments, the remote display may be a "smart" display, or in other words, the remote display may be connectable to the internet. For example, the remote display may be a smart TV, or may be a TV that connects to the internet. An application may be installed on the smart TV, through which the TV may communicate with the remote display upgrade 109 to display workout information on the TV. In some embodiments, the application installed on the TV may display an exercise program that is coordinated with the modular exercise device 100. In the same or other embodiments, the television may communicate with a plurality of modular exercise devices 100, and may display information from each modular exercise device 100 on the screen. In this manner, multiple users may interact while exercising in conjunction with the same exercise program.

In some embodiments, the remote display upgrade 109 may connect to a remote screen with a wired connection. For example, the remote display upgrade 109 may connected to a remote screen with a HDMI connection, a component video connection, an A/V connection, an S-video connection, a VGA connection, an ethernet connection, a USB connection, or any other wired connection. In other embodiments, the remote display upgrade 109 may connect to the remote display with a wireless connection, such as via WiFi, Bluetooth, Zigbee protocol, or other wireless connection.

In some embodiments, the remote display upgrade 109 may be interactive. For example, the remote display upgrade 109 may be capable of receiving input from a user through a user input device, such as a touch-screen, a remote, a controller, a keyboard, a mouse, or other user input device. In this manner, the remote display upgrade 109 may turn the remote display into a remote console. In some embodiments, the remote display upgrade 109 may include a projector. The projector may project the display onto a screen or other surface. In some embodiments, the remote display upgrade 109 may transmit the display to the remote display, and the remote display may be controlled by a mobile device through an application.

In some embodiments, the remote display upgrade 109 may transmit the display to a remote display, and the remote display may display information about the exercise in addition to other information. For example, the remote display may show the exercise information in a portion of the screen, while other information, such as a television program or a movie, is displayed in another portion or the remainder of the screen. In other examples, in the remote display the exercise information is overlaid over the television program, such as with a transparent overlay. In this manner, a user may both watch a television program or a movie while working out, without having to change her view between devices.

Because the modular exercise device 100 may not include a console, in some embodiments, the base unit 102 may include a processor and a memory. The memory may include stored instructions, which, when accessed by the processor, cause the processor to perform tasks. These tasks may include any task performed by the modular exercise device, including tracking of exercise information, processing exercise information, taking of measurements with sensors, processing information from the sensors, communicating with the internet, and other tasks.

In some embodiments, the base unit 102 may not include any handles. For example, the base unit 102 may be a treadmill that does not include any handles. In other embodiments, the base unit 102 may include a set of base handles. The base unit 102 may be upgraded to include upgraded handles 110. The upgraded handles 110 may be handles attached to the base unit 102. In some embodiments, the upgraded handles 110 may include one or more exercise features. For example, the upgraded handles 110 may be strong enough to support a user's weight while doing a body-weight exercise, such as a pushup, a dip, a pull-up, or other body weight exercise.

In some embodiments, the upgraded handles 110 may include or be modified or upgraded to include one or more input devices 111. For example, the upgraded handles 110 may include controls that may control one or more exercise features of the base unit 102, such as speed, incline, resistance, and so forth. In other examples, the upgraded handles 110 may include volume controls for the display, television controls (play/pause, channel, etc.), and other input devices. As the user uses the base unit 102, the user may wish to adjust exercise inputs conveniently while exercising. Modifying the base unit 102 to include upgraded handles 110 with input devices 111 may allow the user to easily and conveniently adjust exercise inputs during a workout, which may improve the exercise experience by allowing the user to maintain a form while exercising.

In some embodiments, the base unit 102 may be a treadmill, and the upgraded handles 110 may include a rail 112 that extends along a length of the base unit 102. The rail 112 may be used to support a user, such as during physical therapy. In some embodiments, the upgraded handles 110 may include a harness 113 which may be used to support at least a portion of the user's weight. This may help to reduce the impact of higher impact exercises, such as running.

The modular unit may include a ventilation system 114. The base unit 102 may include one or more modular connections into which one or more fans from the ventilation system 114 may be inserted. The base unit 102 may include a plurality of modular connections located at different locations on the base unit 102. A fan may be placed in each of these locations to provide the user with airflow across different parts of her body. For example, the base unit 102 may have modular connections located at the bottom, middle, and top of an upright structure. A fan may be placed in one, some, or all of these modular connections and directed to blow air over one or more of the legs, torso, and head of the user. In this manner, the user may customize which portion of her body to have cooled during a workout. In some embodiments, the base unit 102 may include multiple modular connections at the same height above the ground. This may allow for multiple fans to be connected at the same height, to provide multiple flows of air from different angles directed at the user. In some embodiments, multiple fans may be plugged into the same modular connection. In this manner, the user may desire to add the ventilation system 114 to cool herself during an exercise. This may improve the exercise experience by allowing the user to cool herself during the exercise.

In some embodiments, the one or more fans may be controlled by the user. For example, the user may selectively determine the fan and the fan speed for that fan, thereby customizing the location and the amount of air directed over the user. In the same or other embodiments, the one or more fans may be synchronized with an exercise program. For example, the fans may be configured to blow harder during more intense portions of a workout, and softer during recovery periods of a workout. In other examples, the fans may be configured to blow on different portions of the user depending the intensity and/or type of exercise being performed.

In some embodiments, the one or more fans may be configured to blow on the user synchronized with weather conditions in an exercise program. For example, the exercise program may include a simulated bicycle ride. The simulated bicycle ride may include simulated wind, such as head wind, tail wind, or cross winds. When the wind in the exercise program blows, the exercise program may direct the fans to blow in the same or a similar direction and the same or a similar intensity. In some examples, the exercise program may be based on real events, such as the Tour de France or the Boston Marathon. The exercise program may simulate the weather experienced by the athletes performing the event. By adding a module that recreates weather patterns of a performance, the user may feel a closer connection to the athletes, and/or the exercise experience may be heightened.

The modular unit may include a sound system 115. In some embodiments, the base unit 102 may not include any speakers. In other embodiments, the base unit 102 may include a set of base speakers. The base unit 102 may include one or more modular connections into which one or more speakers may be inserted. The one or more speakers may be an upgradeable sound system 115. In some embodiments, an exercise program may include audio, such as instructions, music, and other audio. The exercise program may play the audio through the sound system 115. In some embodiments, an upgraded sound system 115 may play upgraded audio. For example, the exercise program may include exercise audio, such as exercise instructions. When the upgraded sound system 115 is installed, the exercise program may play a second, or upgraded audio file, such as exercise instructions and music. In this manner, when the user needs or desires audio connected to the base unit 102, the user may modify or upgrade the base unit 102 to include the sound system 115.

In some embodiments, the user may connect user audio to the sound system 115. In some embodiments, the exercise program may pause the user audio to play the exercise audio. In other embodiments, the exercise program may play the exercise audio over the user audio. In still other embodiments, the exercise program may reduce the volume of the user audio to play the exercise audio. In yet other embodiments, a first set of speakers, such as the base speakers, may play the exercise audio, and a second set of speakers, such as the upgraded sound system 115, may play the user audio. In further embodiments, any combination of pausing, muting, and audio overlay may be used during an exercise program.

In some embodiments, the modular unit may include a sound-dampening system 116. The sound-dampening system 116 may connect to a modular connection on the base unit 102 or any other portion of the modular exercise device 100. In some embodiments, the sound-dampening system 116 may include one or more noise-canceling speakers configured to play an opposite waveform of perceived sounds. In this manner, the sound-dampening system 116 may reduce the noise of a part or a whole of the modular exercise device 100. For example, the noise-canceling speaker may be placed in a motor housing to reduce the noise of the motor. In other examples, the one or more noise-canceling speakers may be placed in a flywheel housing to reduce the noise of the flywheel. This may improve the exercise experience for the user by reducing the ambient noise. This may allow the user to focus on her workout without distractions. Furthermore, this may help to prevent hearing loss in users who regularly are exposed to high levels of noise from exercise devices.

The modular units may include one or more sensors 117. The sensors 117 may collect information about the user, the environment, the base unit 102, or other information. The base unit 102 may not include any sensors, or may include a base set of sensors. The one or more sensors 117 may connect to modular connections on the base unit 102. The one or more sensors 117 may include one or more of a proximity sensor 118, a pressure sensor 119, and a position sensor 120.

A proximity sensor 118 may sense the proximity of items located near the modular exercise device 100. For example, the proximity sensor 118 may detect the presence of people, children, pets, or other living creatures located near the modular exercise device. In other examples, the proximity sensor 118 may detect the presence of other items, such as balls, clothing, children's toys, paper, or other objects which may interfere with the operation of the modular exercise device 100. The proximity sensor 118 may detect the distance of these items from the modular exercise device 100. A processor may process the sensed item and the distance from any moving parts of the modular exercise device 100. If the item is within an unsafe distance of the modular exercise device 100, then the processor may produce a warning, or even shut down the modular exercise device 100. As a user uses the modular exercise device 100, he may notice that the modular exercise device 100 may be harmed by an item, or that the item may be harmed by a moving part of the modular exercise device 100. By adding the proximity sensor 118, the user may increase the safety of operating the modular exercise device 100.

In some embodiments, the modular exercise device 100 may include multiple proximity sensors 118. The multiple proximity sensors 118 may be placed at locations around the body of the modular exercise device 100 to detect the location of items from any angle or from any position relative to the moving parts of the modular exercise device 100.

A pressure sensor 119 may detect the presence of a user and the force with which she interacts with the modular exercise device 100. For example, the deck of a treadmill may include one or more pressure sensors 119. The pressure sensors 119 may be used to determine the weight of the user. As the user uses the modular exercise device 100, the user may determine that she wants or needs to understand her weight or weight distribution while operating the modular exercise device 100. By adding the pressure sensors 119, the exercise experience may be improved by allowing the user to understand her weight and/or weight distribution on the modular exercise device 100.

In some embodiments, the pressure sensors 119 may be distributed to determine a weight distribution of the user. For example, a pressure sensor 119 may be located on a left and a right side of the deck of the treadmill, and the pressure sensors may determine how much weight is supported by each of the user's left and right foot. In the same or other embodiments, a plurality of pressure sensors 119 may be placed on the deck on a grid or some other pattern. The pressure sensors 119 may be placed so that differences in weight application by a user's foot may be measured. A processor may then analyze the differences in pressure to determine an extent of pronation of the user.

The pressure sensors 119 may be located in any portion of the modular exercise device 100. For example, the pressure sensors 119 may be located in a handle of the modular exercise device 100. The handle may be used for a body weight exercise. The pressure sensors 119 may be used to determine the number of repetitions of a body weight exercise performed by the user. In other examples, a pressure sensor 119 may be located in the seat of a stationary bicycle. This may help a user determine how much weight is supported by the seat. Furthermore, the pressure sensor 119 may be used to help encourage a user to pedal in a standing position, or to "come out of the saddle," while exercising with a stationary bicycle.

In still other examples, a pressure sensor 119 may be located on the handle of a rower. The pressure sensor 119 may help to determine with how much force a user is pulling the handle of the rower. In yet other examples, a pressure sensor 119 may be located in the footrest of a rower to help determine how hard a user is pushing on the pedals during rowing.

In further examples, a pressure sensor 119 may be located on or in the handle of an elliptical machine. This may help to determine how much of the force to rotate the flywheel is being provided by the arms. In still further examples, the pressure sensor 119 may be located in the pedals of an elliptical machine. This may help to determine weight balance and force applied to the pedals while exercising on the elliptical machine.

In some embodiments, a position sensor 120 may sense a position of the user. For example, the position sensor 120 may sense a position of the user while the user is performing an exercise. A processor on the modular exercise device 100 may determine, based on the position of the user, an exercise being performed by the user. For example, as discussed above, a pressure sensor 119 may be placed on or in a handle. The pressure sensor 119 may sense the weight of the user, and the processor, based on the measurements of the pressure sensor 119, may determine the position of the user. This may help the processor to perform a repetition count.

In other examples, the position sensor 120 may be a camera. The camera may capture images of the user performing an exercise. Based on pixel variations in different frames captured by the camera, a processor may determine the position of the user. By analyzing the position of the user, the processor may help the user to perform an exercise with the proper form, count the number of repetitions of an exercise, and perform any other analysis of a user's position.

In some embodiments, a biometric sensor 121 may sense at least one piece of biometric information. For example, a biometric sensor 121 may be a heart rate monitor installed on a handle. The handle may be a base handle, and the biometric sensor 121 may be a modular unit installed on the handle to upgrade the handle. In this manner, a user may track his heartrate during a workout. In other examples, the biometric sensor 121 may be an oxygen sensor, which may help to sense the oxygen uptake of the user during an exercise. In still other examples, the biometric sensor 121 may be any biometric sensor used in exercise devices or used to track the health or exercise parameters of a user.

In some embodiments, the modular unit may be a motor 122. The base unit 102 may include a modular connection, and the motor 122 may include a gear that connects to the modular connection. For example, the motor 122 may be an incline motor 123. The incline motor 123 may include an incline jack, such as a piston or a mechanical jack (e.g., a worm gear or other jack). The incline jack may be placed under the deck of an exercise device, such as a treadmill, and the incline motor 123 may operate the incline jack to increase and/or decrease the incline of the deck. As the user uses the modular exercise device, he may initially not have a need for a motor 122, such as an incline motor 123. As he continues to exercise, he may determine that he wants or needs a motor, such as an incline motor 123, to increase the intensity of an exercise. This may improve the exercise experience for the user by allowing the user to select his level of intensity.

In some embodiments, the base unit 102 may not include any incline adjustment mechanism, and the incline motor 123 and the incline jack may be installed at the modular connection to allow the incline of the base unit 102 to be changed. This may allow for a greater range of workout intensities to be performed. In other embodiments, the base unit 102 may have a manually adjustable incline adjustment mechanism. For example, a hand crank may operate a work gear that may increase or decrease the incline of the exercise device. To install the motor 122, the hand crank may be removed from a geared connection of the incline adjustment mechanism, and a gear connection of the incline motor 123 may be installed in the geared connection (i.e., the modular connection). In this manner, the incline of the deck may be more easily and quickly changed, which may make it more convenient to change the workout intensity during a workout.

In some embodiments, the motor 122 may be a modular motor 124. The modular motor 124 may be used to increase the speed of a base motor on the base unit 102. For example, the base unit 102 may be a treadmill having a base motor. The base motor may have a base maximum speed. A user may not desire to exercise at a speed that is greater than the base maximum speed. As the fitness of the user improves, the user may desire to walk or run faster. To facilitate this desire, the user may install a modular motor 124. The modular motor 124 may mesh with the gears of the base motor at a gear mesh (i.e., a modular connection). This may allow the modular motor to increase the speed of the tread belt.

In some embodiments, the base unit 102 may have a base cosmetic look. A user may wish to change the cosmetic look by installing a cosmetic upgrade 125. A cosmetic upgrade 125 may be a change in a housing of the base unit 102, a sticker, a change in tread of a tread belt or an elliptical foot pad, the addition of lights to moving parts, the addition of lights to stationary parts, other cosmetic upgrades, or combinations of the foregoing. Many users may be more motivated to use the modular exercise device 100 if it has a cosmetic finish that is attractive to the user. Thus, the cosmetic finish may be upgraded to suit the needs of the user.

In some embodiments, the modular unit may be a storage system 126. The base unit 102 may have a fixed frame. In other words, the frame of the base unit 102 may not be movable, foldable, bendable, or otherwise changed from an operating position to a storage position. A storage system 126 may be installed on the base unit 102 to allow the base unit 102 to be changed from an operating position to the storage position. For example, the storage system 126 may include a set of wheels attached to a bottom of the frame. The wheels may allow a user to move the modular exercise device 100 back and forth from storage to an operating location. In some embodiments, the wheels may be located on a front or a back of the modular exercise device 100, and the user may lift the opposite side of the modular exercise device 100 to move the modular exercise device 100. In other embodiments, the wheels may be located underneath the modular exercise device 100 such that the user may simply push, without lifting, the modular exercise device 100 to move it. As the user operates the modular exercise device 100, the user may desire to move the modular exercise device 100 to allow space for other exercise devices. By installing a storage system 126, it may be more convenient for the user to own a modular exercise device 100 because it will take up less room in the user's living space.

In some embodiments, the storage system 126 may include a hinge. The modular exercise device 100 may then be rotated about the hinge into a storage position. In this manner, the user may be able to reduce the footprint of the exercise device in his home. In some embodiments, the storage system 126 including a hinge may include or be further upgraded to include a lift assist 127. The lift assist 127 may be a system that reduces at least a portion of the force required to move the modular exercise device 100 from the operating position to the storage position. For example, the lift assist 127 may be a spring tensioned to pull the frame to the storage position. In other examples, the lift assist 127 may be a pneumatic piston installed with a pressure in the cylinder. When the frame of the modular exercise device 100 is in the operating position, a negative pressure in the piston may urge the piston to close, which may reduce the force required to move the modular exercise device 100 from the operating to the storage position. This may make it easy and convenient for the user to change the modular exercise device 100 from the operating to the storage position, and vice versa. A user with limited space may install the lift assist 127 and be encouraged to use the modular exercise device 100 more regularly because setup and takedown are less intimidating or onerous.

In some embodiments, the modular unit may include a strength training system 128. The strength training system 128 may be connected to the base unit 102 at the modular connection on the frame of the base unit 102. In this manner, the user may not have to change locations when performing a strength training exercise. Some users may develop a desire to perform strength training exercises and install a strength training system 128 to help perform the strength training exercises. This may be desirable, for example, in high intensity interval training (HIIT) workouts, in which rest periods, or periods in which the user is not performing any exercise, are limited or eliminated.

In some embodiments, the strength training system 128 may include the handles 110 used in a body weight exercise. In other examples, the strength training system 128 may include a free weight frame that supports a set of free weights or resistance bands (e.g., flexible elastic bands) attached to the frame of the base unit 102. The free weights or resistance bands may be located to be easily accessible by the user while using the modular exercise device 100. In still other embodiments, the strength training system 128 may be connected to the primary resistance mechanism of the modular exercise device 100. For example, the strength training system 128 may include a cable that is connected to the flywheel of the modular exercise device. The strength training system 128 may utilize the resistance of the flywheel to provide resistance for the strength training exercises.

Figure 2:
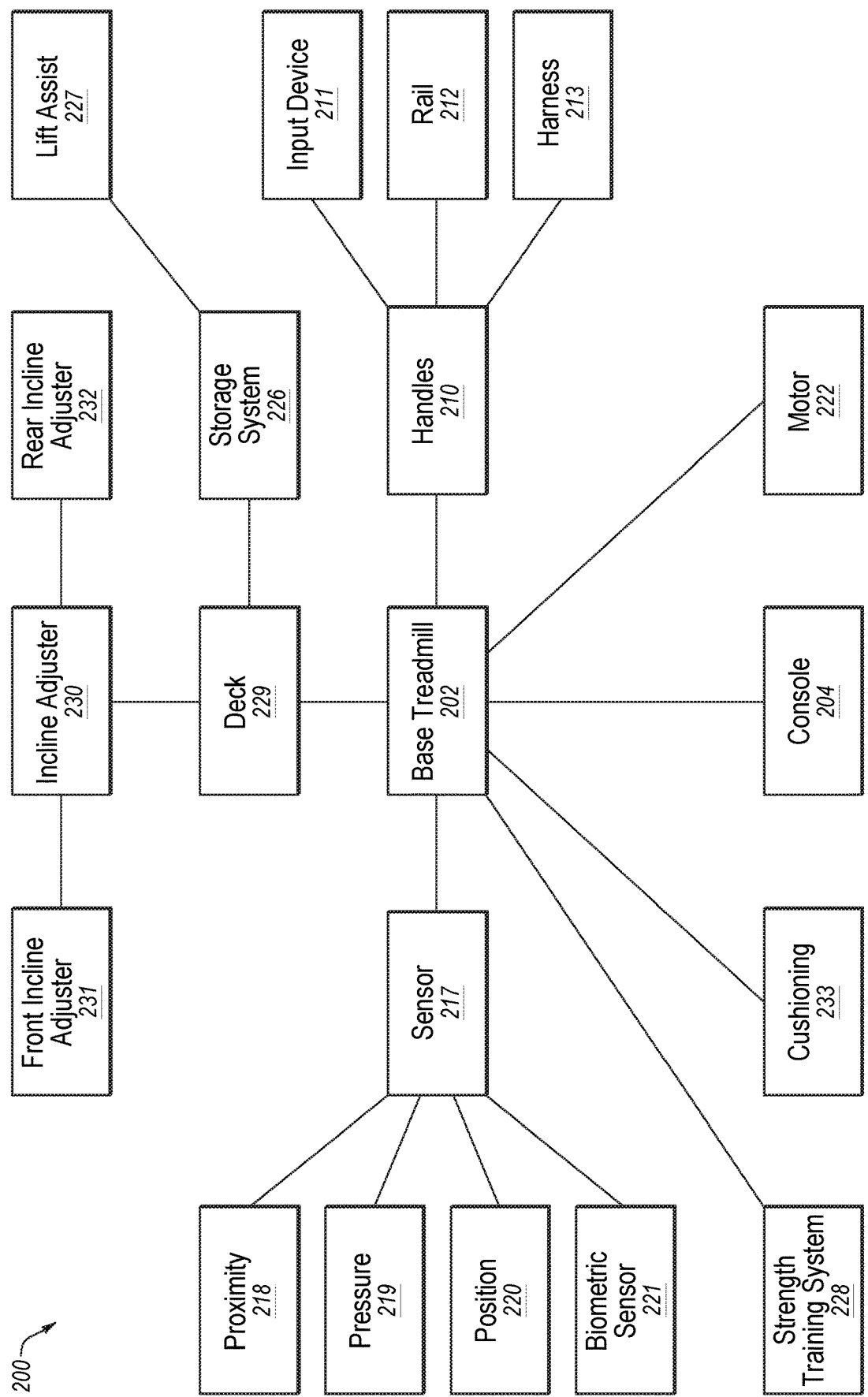
FIG. 2 is a schematic representation of a modular treadmill, according to at least one embodiment of the present disclosure.

FIG. 2 is a schematic representation of a modular treadmill 200, according to at least one embodiment of the present disclosure. The modular treadmill 200 may include a base treadmill 202. The base treadmill 202 may include the basic features used to exercise on a treadmill, including a deck, a front pulley, a back pulley, and a tread belt. A plurality of modular units may be physically connectable to the base treadmill 202 to selectively upgrade the base treadmill 202 to include features not included on the base treadmill 202. Selectively upgrading the base treadmill 202 may allow the user to customize or personalize the exercise experience based on his or her needs or desires.

The base treadmill 202 may include a base deck 229. The base deck may be upgraded with a modular unit that includes an incline adjuster 230. The incline adjuster 230 may be a gear (e.g., a worm gear), a piston, a ratcheting crank, or another incline adjuster. The incline adjuster 230 may be front incline adjuster 231. In this manner, the front incline of the base treadmill 202 may be changed, thereby simulating running uphill. In the same or other embodiments, the incline adjuster 230 may be a rear incline adjuster 232. In this manner, the rear incline of the base treadmill 202 may be changed. In some embodiments, the incline adjuster 230 may include both a front incline adjuster 231 and a rear incline adjuster 232. In this manner, both the front incline and the rear incline may be adjusted. As the user operates the base treadmill 202, she may wish to change the orientation of the base deck 229, and may install the incline adjuster 230. This may allow the user to exercise different muscles and/or change the intensity of the exercise.

In some embodiments, the incline adjuster 230 may include a set of spacers that may be placed under a rear portion of the base deck 229. A front incline adjuster 231 may be installed at a rear portion of the base deck 229. The front incline adjuster 231 may have a fully retracted setting that reduces the incline of the base deck to a negative incline, which may simulate walking or running downhill.

In some embodiments, the base deck 229 may be further upgraded to include a storage system 226. The base deck 229 may have a fixed frame. In other words, the frame of the base deck 229 may not be movable, foldable, bendable, or otherwise changed from an operating position to a storage position. As the user operates the base treadmill 202, the user may desire to move the base treadmill 202 from an operating position to a storage position to free up space in his living area. The storage system 226 may be installed on the base deck 229 to allow the base deck 229 to be changed from an operating position to the storage position. For example, the storage system 226 may include a set of wheels attached to a bottom of the base deck 229. The wheels may allow a user to move the modular treadmill 200 back and forth from storage to an operating location. In some embodiments, the wheels may be located on a front or a back of the base deck 229, and the user may lift the opposite side of the base deck 229 to move the base deck 229. In other embodiments, the wheels may be located underneath the modular treadmill 200 such that the user may simply push, without lifting, the modular treadmill 200 to move it.

In some embodiments, the storage system 226 may include a hinge. The base deck 229 may then be rotated about the hinge into a storage position. In this manner, the user may be able to reduce the footprint of the exercise device in his home. In some embodiments, the storage system 226 including a hinge may include or be further upgraded to include a lift assist 227. The lift assist 227 may be a system that reduces at least a portion of the force required to move the base deck 229 from the operating position to the storage position. For example, the lift assist 227 may be a spring tensioned to pull the frame to the storage position. In other examples, the lift assist 227 may be a pneumatic piston installed with a pressure in the cylinder. When the base deck 229 is in the operating position, a negative pressure in the piston may urge the piston to close, which may reduce the force required to move the base deck 229 from the operating to the storage position. This may make it easy and convenient for the user to change the base deck 229 from the operating to the storage position, and vice versa. This may encourage the user to use the modular treadmill 200 more regularly because setup and takedown are less intimidating or onerous.

In some embodiments, the base treadmill 202 may not include any handles. In other words, the base treadmill 202 may include only the base deck 229 with the front pulley, the back pulley, and the tread belt. In other embodiments, the base treadmill 202 may include a set of base handles. As the user uses the base treadmill 202, the user may desire to perform exercises that include the use of handles. The base treadmill 202 may be upgraded to include upgraded handles 210. The upgraded handles 210 may be attached to the base deck 229. In some embodiments, the upgraded handles 210 may include one or more exercise features. For example, the upgraded handles 210 may be strong enough to support a user's weight while doing a body-weight exercise, such as a pushup, a dip, a pull-up, or other body weight exercise. This may improve the exercise experience for the user by allowing the user to increase the number of exercises performed on the base treadmill 202.

In some embodiments, the upgraded handles 210 may include one or more input devices 211. For example, the upgraded handles 210 may include controls that may control one or more exercise features of the base treadmill 202, such as speed, incline, resistance, and so forth. In other examples, the upgraded handles 210 may include volume controls for the display, television controls (play/pause, channel, etc.), and other input devices 211.

In some embodiments, the upgraded handles 210 may include a rail 212 that extends along a length of the base deck 229. The rail 212 may be used to support a user, such as during physical therapy. In some embodiments, the upgraded handles 210 may include a harness 213 which may be used to support at least a portion of the user's weight. As the user uses the base treadmill 202, the user may feel joint pain, or may have a need to perform some physical therapy. Installing a rail 212 and/or a harness 213 may help to reduce the impact of higher impact exercises, and may allow the user to perform low-impact physical therapy.

The modular units may include one or more sensors 217. The sensors 217 may collect information about the user, the environment, the base treadmill 202, or other information. The base treadmill 202 may not include any sensors, or may include a base set of sensors. The one or more sensors 217 may connect to modular connections on the base treadmill 202. The one or more sensors 217 may include one or more of a proximity sensor 218, a pressure sensor 219, and a position sensor 220.

A proximity sensor 218 may sense the proximity of items located near the modular treadmill 200. For example, the proximity sensor 218 may detect the presence of people, children, pets, or other living creatures located near the modular exercise device. In other examples, the proximity sensor 218 may detect the presence of other items, such as balls, clothing, children's toys, paper, or other objects which may interfere with the operation of the modular treadmill 200. The proximity sensor 218 may detect the distance of these items from the modular treadmill 200. A processor may process the sensed item and the distance from any moving parts of the modular treadmill 200, such as the tread belt, the front pulley, the back pulley, and so forth. If the item is within an unsafe distance of the modular treadmill 200, then the processor may produce a warning, or even shut down the modular treadmill 200. As a user uses the modular treadmill 200, he may notice that the modular treadmill 200 may be harmed by an item, or that the item may be harmed by a moving part of the modular treadmill 200. By adding the proximity sensor 218, the user may increase the safety of operating the modular treadmill 200.

In some embodiments, the modular treadmill 200 may include multiple proximity sensors 218. The multiple proximity sensors 218 may be placed at locations around the base deck 229, and other places of the modular treadmill 200, including the handles 210, the console, or other locations on the modular treadmill 200. The multiple proximity sensors 218 may detect the location of items from any angle or from any position relative to the moving parts of the modular treadmill 200.

A pressure sensor 219 may detect the presence of a user on the modular treadmill 200 and the force with which she interacts with the modular treadmill 200. For example, the base deck 229 may be upgraded to include one or more pressure sensors 219. The one or more pressure sensors 219 may be located under the tread belt on the base deck 229. The pressure sensors 219 may be used to determine the weight of the user. As the user uses the modular treadmill 200, the user may determine that she wants or needs to understand her weight or weight distribution while operating the modular treadmill 200. By adding the pressure sensors 219, the exercise experience may be improved by allowing the user to understand her weight and/or weight distribution on the modular treadmill 200.

In some embodiments, the pressure sensors 219 may be distributed to determine a weight distribution of the user. For example, a pressure sensor 219 may be placed on a left and a right side of the base deck 229, and the pressure sensors may determine how much weight is supported by each of the user's left and right foot. In the same or other embodiments, a plurality of pressure sensors 219 may be placed on the base deck 229 on a grid. The pressure sensors 219 may be placed so that differences in weight application by a user's foot may be measured. A processor may then analyze the differences in pressure to determine exercise features of the user, such as a weight distribution and an extent of pronation of the user.

The pressure sensors 219 may be located in any portion of the modular treadmill. For example, the pressure sensors 219 may be located in an upgraded handle 210. The upgraded handle 210 may be used for a body weight exercise. The pressure sensors 219 may be used to determine the number of repetitions of a body weight exercise performed by the user.

In some embodiments, a position sensor 220 may sense a position of the user. For example, the position sensor 220 may sense a position of the user while the user is performing an exercise. A processor on the modular treadmill 200 may determine, based on the position of the user, an exercise being performed by the user. For example, as discussed above, a pressure sensor 219 may be placed on or in an upgraded handle 210. The pressure sensor 219 may sense the weight of the user, and the processor, based on the measurements of the pressure sensor 219, may determine the position of the user. This may help the processor to perform a repetition count.

In other examples, the position sensor 220 may be a camera. The camera may capture images of the user performing an exercise. Based on pixel variations in different frames captured by the camera, a processor may determine the position of the user. By analyzing the position of the user, the processor may help the user to perform an exercise with the proper form, count the number of repetitions of an exercise (e.g., cadence and/or body weight exercises), and perform any other analysis of a user's position.

In some embodiments, a biometric sensor 221 may sense at least one piece of biometric information. For example, a biometric sensor 221 may be a heart rate monitor installed on an upgraded handle 210. In this manner, a user may track his heartrate during a workout. In other examples, the biometric sensor 221 may be an oxygen sensor, which may help to sense the oxygen uptake of the user during an exercise. In still other examples, the biometric sensor 221 may be any biometric sensor used in exercise devices or used to track the health or exercise parameters of a user.

In some embodiments, the modular unit may include a motor 222, such as an incline motor used to operate the incline adjuster 230. In some embodiments, the motor 222 may be used to increase the speed of a base motor on the base treadmill 202. For example, the base treadmill 202 may have a base motor. The base motor may have a base maximum speed (e.g., 6 miles per hour (MPH)). A user may not desire to exercise at a speed that is greater than the base maximum speed. As the fitness of the user improves, the user may desire to walk or run faster. To facilitate this desire, the user may install a modular motor 124. The modular motor 124 may mesh with the gears of the base motor at a gear mesh (i.e., a modular connection). This may allow the modular motor to increase the speed of the tread belt (e.g., to 10 MPH or faster).

In some embodiments, the modular unit may include upgraded cushioning 233. For example, the base deck 229 may include a set of base deck supports located on an underside of the base deck. The base deck supports may be replaced with upgraded cushioning 233, or deck supports that are resilient, or provide some give in response to the user running on the supports. In some embodiments, the upgraded cushioning 233 may include a resilient material, such as a rubber or an elastomer. In other embodiments, the upgraded cushioning 233 may include a resilient member, such as a coil spring, a Belleville washer, a leaf spring, or other spring or resilient member. In yet other embodiments, the upgraded cushioning 233 may include a piston, such as a pneumatic or hydraulic piston. In this manner, a user may mitigate the impact caused by running or walking on the base treadmill 202, thereby reducing the impact on the user's joints.

In some embodiments, the base treadmill 202 may not include a console. In other words, the base treadmill 202 may only include the base deck 229, a front pulley, a back pulley, and a tread belt. The base deck 229 may include a modular connection into which a modular console 204 may be inserted. As the user uses the base treadmill 202, he may develop a need or desire to see exercise information, to modify exercise parameters, or to otherwise use a console. The modular console 204 may include a display, controls to operate the base treadmill 202, and other console features. In other embodiments, the base treadmill 202 may include a base console. The base console and/or the modular console 204 may be upgraded to include several modular features, including an upgraded display, upgraded controls, speakers, fans, or other modular features, including those console features discussed with respect to the modular console 104 of FIG. 1.

In some embodiments, the user may desire to perform strength training, and the base treadmill 202 may be modularly upgraded with a modular strength training system 228. The modular strength training system 228 may include the modular handles 210 so that the user may perform body weight exercises. Additionally or alternatively, the modular strength training system 228 may include a free weight frame that supports a set of free weights or resistance bands (e.g., flexible elastic bands) attached to the frame of the base treadmill 202. The free weights or resistance bands may be located to be easily accessible by the user while using the modular treadmill 200. In this manner, the user may be able to perform interval workouts, including HIIT workouts and standalone strength training workouts. This may improve the exercise experience for the user and/or may reduce the space and cost of purchasing a separate strength training system.

Figures 1, 3:
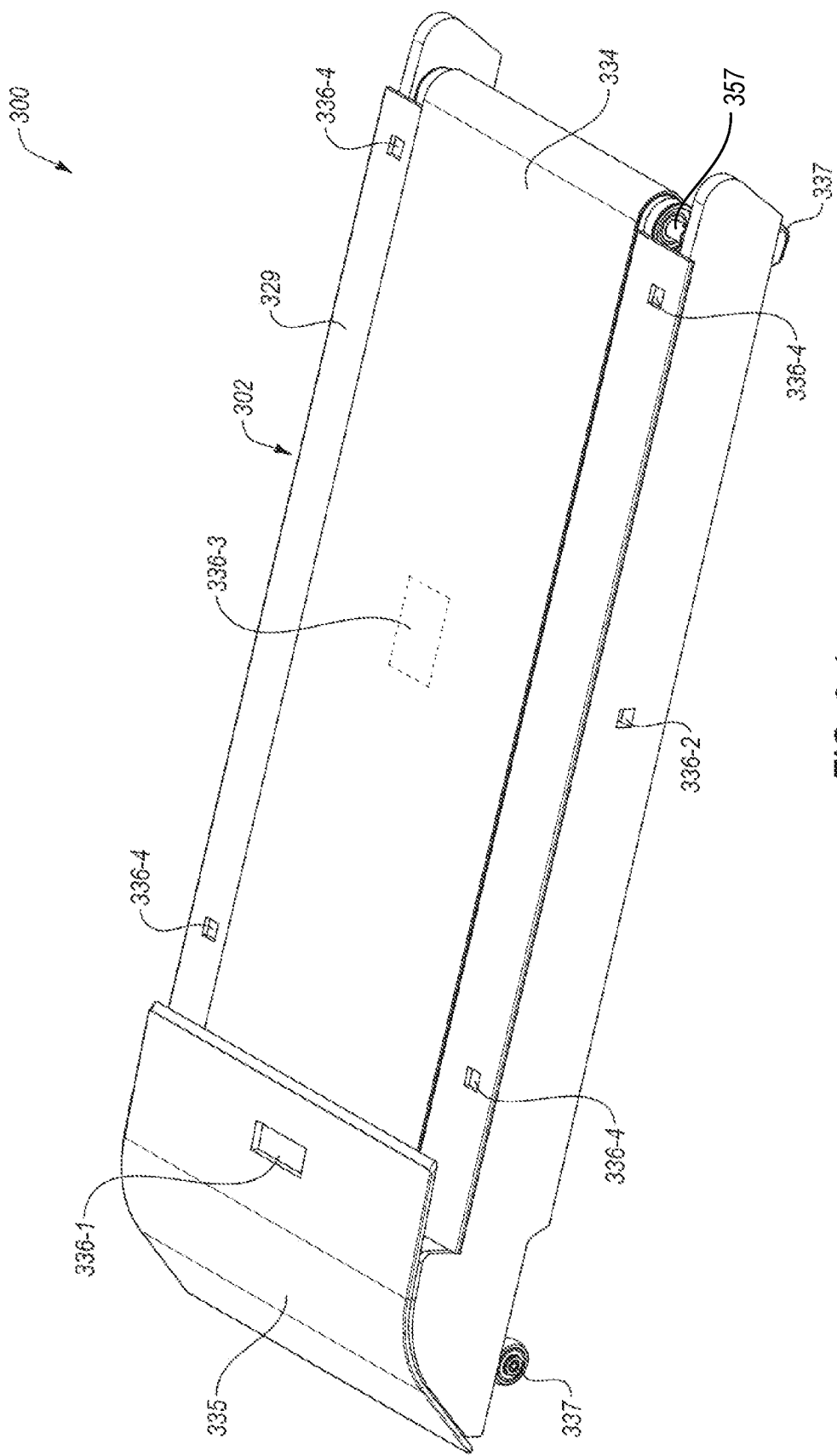
Figures 2, 3:
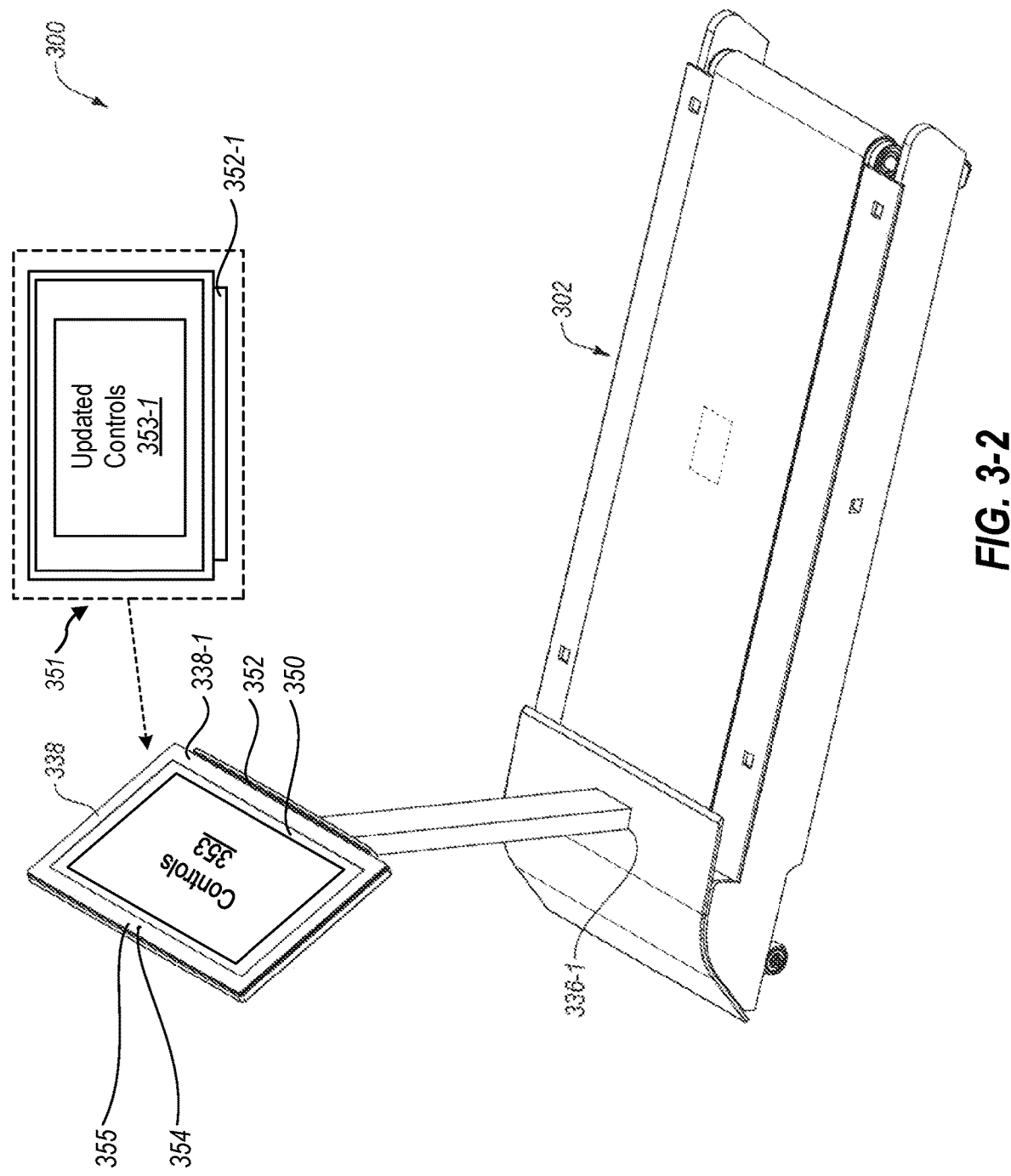
Figure 3:
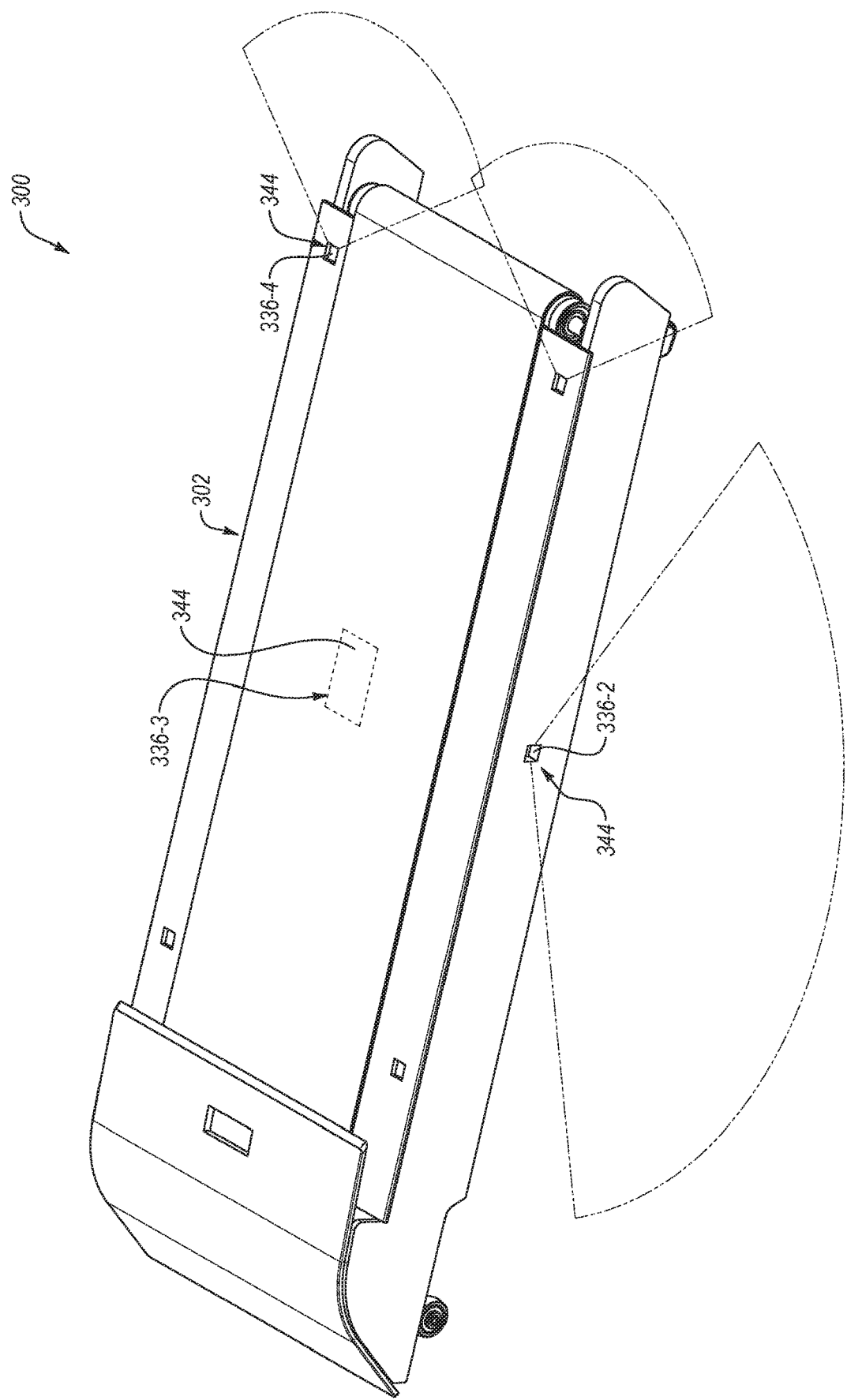

FIG. 3-1 is a perspective view of a modular treadmill 300, according to at least one embodiment of the present disclosure. The modular treadmill 300 may include a base treadmill 302. The base treadmill 302 may include a base deck 329, a front pulley (not shown), a rear pulley 357, and a tread belt 334 wrapped around the base deck 329 from the front pulley to the rear pulley. In some embodiments, one or both of the front pulley and the rear pulley may be rotated by a motor, which may cause the tread belt 334 to rotate. In other embodiments, the tread belt 334 may be rotated by force from a user's foot. The motor may be located in a motor housing 335. In the embodiment shown, the motor housing 335 is located at the front of the base treadmill 302, however, one having skill in the art would understand that the motor housing 335 may be located at the rear of the treadmill, underneath the treadmill, or in any other location. The base treadmill 302 may be supported on the ground using one or more base deck supports 337. The features and elements of the modular treadmill 300 are meant to be exemplary, and it should be understood that different embodiments and configurations of treadmills may be used in accordance with the embodiments of the present disclosure.

The base treadmill 302 may include a plurality of modular connections (collectively referred to as modular connections 336). Each modular connection 336 may be configured to physically connect to one or more modular units (not shown in FIG. 3-1). The modular connections 336 may be different sizes and located at different locations around the base treadmill 302, depending on the modular unit or units that will connect to it. The modular connections 336 may include physical, electrical, or both physical and electrical connections to the base treadmill 302. For example, a modular unit, such as a handle, may be physically connected to the base treadmill 302 but may not electrically communicate with any electronic components of the base treadmill 302. In other examples, a sensor may plug into a modular connection 336, but may be physically removed from the base treadmill 302 with a wired or a wireless connection. In yet other examples, a modular connection 336 may physically support a console and electrically connect the console to electronic components of the base treadmill. In some examples, a modular unit may include a virtual reality connection, including a headset, a garment (i.e., a glove, a shoe, a shirt, pants, a bodysuit), or other virtual reality connection that may physically plug into the base treadmill 302 or other base exercise device.

The modular connections 336 may be connected to different portions of the base treadmill 302. The modular connections 336 may be placed in a location to facilitate the connection of a modular unit placed in that location. For example, a console modular connection 336-1 may be located at a front portion of the base treadmill 302, where a modular console may be located. A side sensor modular connection 336-2 may be located on a side rail of the base treadmill 302, where, for example, a proximity sensor may be located. A deck sensor modular connection 336-3 may be located underneath the tread belt 334 on the base deck 329 of the base treadmill 302, where, for example, a pressure sensor may be located. One or more deck support modular connections 336-4 may be connected to side rails of the base deck 329 of the treadmill, where, for example, modular handles may be located. In this manner, a user may upgrade the base treadmill 302 with modules or upgrades at the modular connections 336 to include exercise features not included in the base treadmill 302.

One or more of the modular connections 336 may be electronically connected to a processor located in the motor housing 335. The processor may include a memory, the memory including stored instructions which, when accessed by the processor, cause the processor to perform actions. When a modular unit is plugged into a modular connection 336 that is connected to the processor, the modular unit may cause the processor to access and execute instructions stored in the memory. For example, the console connection 336-1 may be connected to the processor, and a console plugged into the console connection 336-1 may cause the processor to execute instructions, such as changing the belt speed. Similarly, a sensor may be plugged into one or more of the side sensor modular connection 336-2 and the deck sensor modular connection 336-3. A handle connected to one of the deck support modular connections 336-4 may include a sensor that is in communication with the processor in the motor housing.

By locating the processor in the motor housing, the modular treadmill 300 may include a single processor, and each of the modular elements connected to the modular treadmill 300 may be operated from the single processor. The memory may include instructions that are dormant until a modular unit is plugged into the modular treadmill. When a modular unit is plugged in, the processor may be instructed to access the previously dormant instructions, and the processor may begin to communicate with, receive instructions from, control, or any combination of the foregoing, the modular unit.

In some embodiments, the base treadmill 302 may be designed to include modular connections specific to a modular unit. For example, the console modular connection 336-1 may be designed to structurally support and electronically connect to a modular console. In other embodiments, a modular connection 336 may be a generic modular connection. For example, the deck support modular connection 336-4 may be generic to a plurality of different modular units. In other examples, a modular unit may include an electronic connection that matches modular connection 336, but may physically attach to the base treadmill 302 at a different location. For example, a modular sensor may include a camera. The camera may have a connection that plugs into the side sensor modular connection 336-2, and the camera may be mounted at any location on the base deck 322.

In some embodiments, a plurality of modular units may connect to the same modular connection 336. For example, the modular unit may include a plurality of fans, and the plurality of fans may connect to the side sensor modular connection 336-2. The fans may all be controlled through the side sensor modular connection 336-2 but mounted at different locations on the base treadmill 302.

FIG. 3-2 is a representation of the modular treadmill 300 of FIG. 3-1 that has a modular console 338 plugged into the console modular connection 336-1. The modular console 338 may have a console body 338-1 having a display mount 352. The modular console 338 may include a display, such as a base display 350. The modular console 338 may include controls 353 for controlling an operation of the treadmill 300. The modular console 338 may be physically inserted into the console modular connection 336-1. The modular console 338 may further include an electronic connection to the base treadmill 302. The modular console 338 may be installed on the base treadmill 302 by itself or in combination with any other modular upgrade. In some embodiments, a position of the modular console 338 may be changeable by positioning a hinge (not shown) such as a friction hinge.

As discussed above, the modular console 338 may itself be configured to be upgraded with modular upgrades. For example, the modular console 338 may include a upgraded display 351 (e.g., to replace the base display 350). The display mount 352 may be replaceable with an upgraded display mount 352-1 to accommodate the upgraded display 351. The modular console 338 may include or may be upgradable with upgraded controls 353-1, a camera 354, a sensor 355, speakers, fans, orientation controls, and any other modular upgrade.

FIG. 3-3 is a representation of the modular treadmill 300 of FIG. 3-1 that has a modular sensor 334 installed in the side sensor modular connection 336-2. The modular sensor 344 may be a position sensor that senses the presence of an item, a person, an animal, or combinations of the foregoing. When the modular sensor 344 senses that something has approached too closely to the base treadmill 302, or any moving parts of the base treadmill 302, then the modular sensor 344 may instruct the base treadmill 302 to perform an action. The action may be an alarm, slowing down of the tread belt, or other action. In this manner, the modular sensor 344 may be part of a proximity detection system. In other words, the base treadmill 302 may be upgraded to include a proximity detection system.

In some embodiments, a plurality of modular sensors 338 may be connected to a plurality of modular connections 336 on the base treadmill 302. For example, modular sensors 338 may be placed in the deck support modular connection 336-4. In this manner, the range of the proximity detection system may be customized to fit the user's surroundings. For example, if a user's treadmill is placed against a wall, then he may need fewer modular sensors 338 for his proximity detection system than if the treadmill were placed in a center of the room. In this manner, the user may purchase and install an exercise system optimized to his needs. This may allow the user to only pay for what he uses, thereby saving the user money and allowing the user to optimize his experience.

In some embodiments, a modular sensor 344 may be placed in the deck sensor modular connection 336-3. In some embodiments, the modular sensor 344 may be a pressure sensor. For example, the modular sensor 344 may be a capacitor, a strain gauge, a piezoelectric element, or other pressure sensor. In other embodiments, the modular sensor 344 may be an accelerometer, a speed detector to detect a speed of the tread belt, a temperature sensor, or any other type of sensor. In some embodiments, the deck sensor modular connection 336-3 may include a plurality of modular sensors 338. For example, a plurality of pressure sensors may create a pressure sensor grid. This may allow the user to track weight distribution between feet, or between different areas of a foot. The sensors may take measurements periodically, allowing a change in pressure to be analyzed over time. This may allow the user to analyze her form, gait, pronation, balance, or other weight distribution characteristics.

Figures 3, 4:
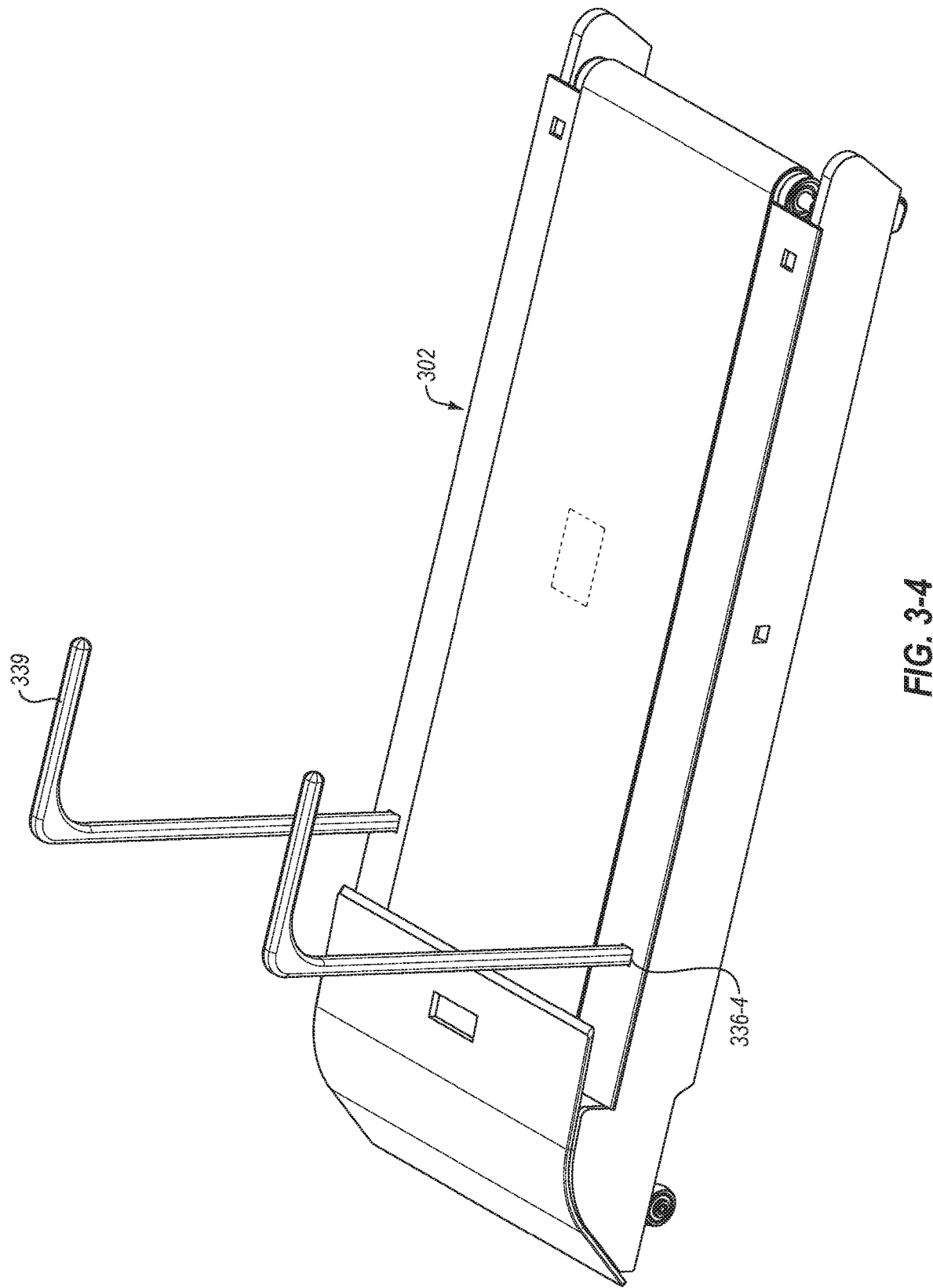

FIG. 3-4 is a representation of the modular treadmill 300 of FIG. 3-1 that includes modular handles 339 installed in the deck support modular connection 336-4, according to at least one embodiment of the present disclosure. The modular handles 339 may be installed at a front end of the base treadmill 302 to allow a user to support himself during a workout. In some embodiments, the modular handles 339 may be further upgradeable to include controls for the base treadmill 302. The modular handles 339 may be sized to support a user's weight. In this manner the user may be able to perform body-weight exercises with the modular handles, such a push-ups, dips, pull ups, or other body-weight exercises.

In some embodiments, the handles 339 may be rails that extend from a front of the base treadmill 302 to a rear of the base treadmill 302. The rails may be installed to support at least a portion of the user's weight during physical therapy. In some embodiments, the modular handles 339 or the rails may be configured with a harness that fits around a user's hips or torso. In this manner, the user may reduce the impact of walking and/or running, or perform physical therapy exercises.

Figures 3, 4, 5:
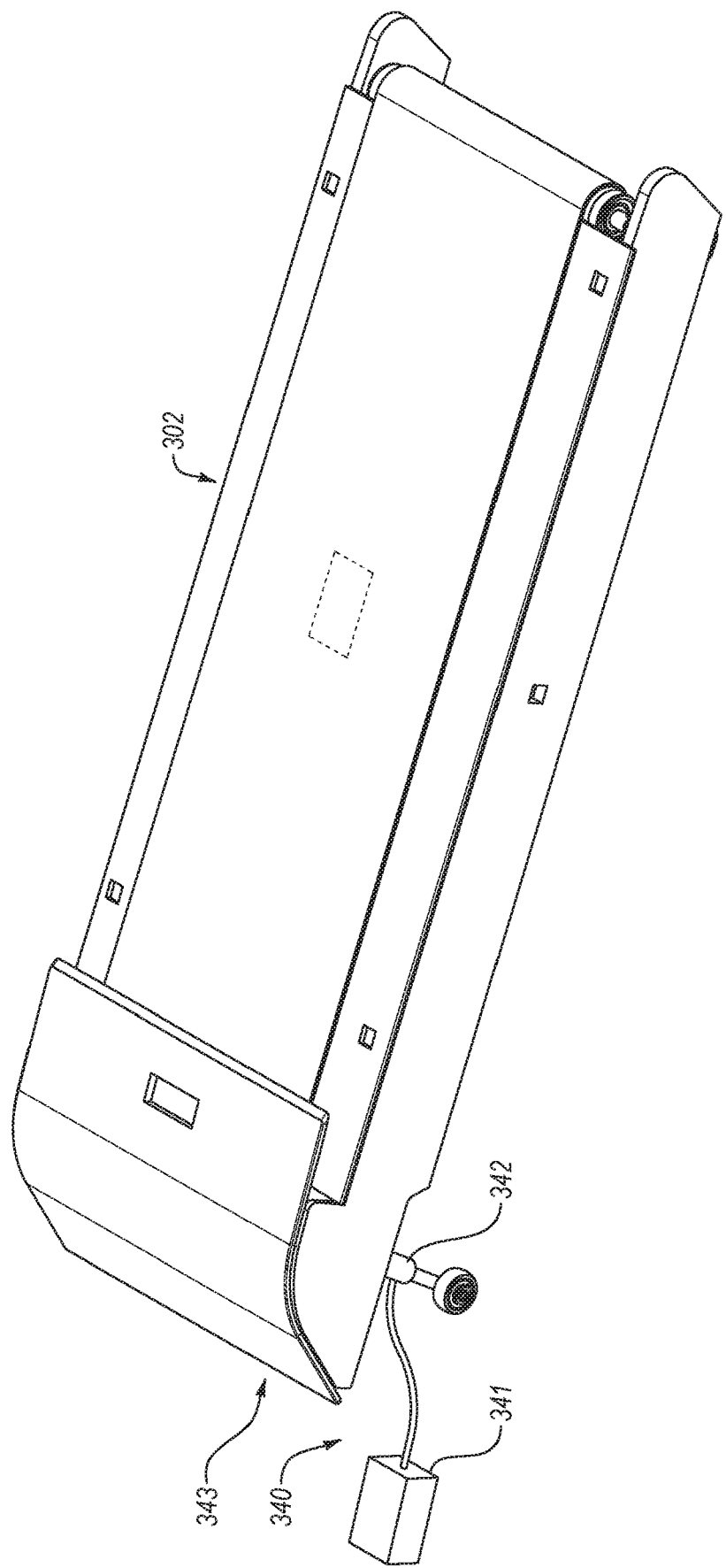

FIG. 3-5 is a representation of the modular treadmill 300 of FIG. 3-1 with a modular lift system 340, according to at least one embodiment of the present disclosure. The modular lift system 340 includes a lift motor 341 and a lift gear 342. The lift gear 342 is attached to a front end 343 of the base treadmill 302 at a lift modular connection (not shown). The lift gear 342 may be any gear, such as a worm gear, a pneumatic piston, a hydraulic piston, or other gear. The lift motor 341 may be housed in a separate housing from the tread belt motor. The lift motor may operate the lift gear 342 to change an incline of the base treadmill 302.

The modular lift system 340 may allow the user to choose when to install the ability to change the incline angle of the base treadmill 302. For example, the user may wish to operate the treadmill on a flat surface. The user may, after a time, decide that he wishes to exercise with an incline. He may then purchase and install the modular lift system to improve the exercise experience when he is ready for the exercise element and/or has the money to pay for it.

In some embodiments, the lift gear 342 may be a cable attached to the front end 343 of the base treadmill 302. The lift motor 341 may be a winch connected to the cable. The lift motor 341 may be mounted to a wall or an upright frame above the front end 343 of the base treadmill 302. When the lift motor 341 winds the cable up on the drum, the front end 343 of the base treadmill 302 may be lifted up. In some embodiments, the lift motor 341 may be mounted on the floor, and the cable routed through a pulley system to lift the front end 343.

FIG. 3-6 is a representation of the modular treadmill 300 of FIG. 3-1 including a plurality of modular connections or upgrades, according to at least one embodiment of the present disclosure. In the embodiment shown, the modular treadmill 300 includes a plurality of modular units, including the modular units described in reference to FIG. 3-1 through FIG. 3-5. For example, the base treadmill 302 includes a modular console 338, modular sensors 344, modular handles 339 as rails, and a modular lift system 340.

In some embodiments, the modular treadmill 300 may include more or less modular units than shown. For example, the modular treadmill 300 may only include a modular console 338 and modular rails 339. In other examples, the modular treadmill 300 may only include modular sensors 344 and a modular lift system. In still other examples, the modular treadmill 300 may include a modular console 338 and a modular lift system 340. In yet other examples, the modular treadmill 300 may include a modular lift system 340, modular sensors 344, and modular rails 339. In further examples, the modular treadmill 300 may include any number of modular units in any combination.

In this manner, the user may selectively upgrade and optimize the modular treadmill 300 to include the desired features, and to exclude any undesired features. Furthermore, as the user uses the modular treadmill 300, he may upgrade the treadmill with improved features in the form of the various modular units. Furthermore, some of the modular units may themselves be modularly upgradeable. This may allow the manufacturer to manufacture the base treadmill 302, and the user to select the features that he will use. This may save the user money, and streamline the manufacturing process by manufacturing modular parts that fit together, rather than many different manufacturing models. Furthermore, this may ease confusion on the consumer, as it may allow the consumer to get exactly what he is looking for, rather than being forced to purchase a confusing combination of treadmill features, many of which he may not use.

FIG. 4 is a schematic representation of a modular stationary bicycle 400, according to at least one embodiment of the present disclosure. The modular stationary bicycle 400 may include a base stationary bicycle 402. The base stationary bicycle 402 may include the basic features used to exercise on a stationary bicycle, including a frame, a seat, handles, a drivetrain supported by the frame including a resistance mechanism (such as a flywheel), and pedals configured to rotate a crank which transfers a torque to the resistance mechanism. A plurality of modular units may be physically connectable to the base stationary bicycle 402 to selectively upgrade the base stationary bicycle to include features not included on the base stationary bicycle.

The base stationary bicycle 402 may include a plurality of modular connections. The plurality of modular units may be physically connected to the plurality of modular connections. In this manner, the base stationary bicycle 402 may be modularly modifiable and/or upgradeable by physically connecting the modular units to the modular connections based on the user's needs and/or interests. The modular units include at least one exercise feature not included in the base stationary bicycle 402. Thus, a user may select a set of desired exercise features and modify and/or upgrade the base stationary bicycle 402 to include the desired exercise features, and not include any undesired exercise features.

The base stationary bicycle 402 may include a base flywheel 445. The base flywheel 445 may be the base resistance mechanism for the base stationary bicycle 402. The base flywheel 445 may include a modular connection that allows the base flywheel 445 to be replaced with a modular flywheel 446. The modular flywheel 446 may include a different rotational mass, different cosmetics, different resistance levels, or other flywheel features. This may allow the user to modify or replace the base flywheel 445 with a desired modular flywheel 446.

A locking hub 447 may be installed at the modular flywheel connection. The locking hub 447 may prevent the base flywheel 445 or the modular flywheel 446 from freewheeling. In other words, the locking hub 447 may cause the flywheel to rotate with a direct ratio to the torque applied to the flywheel. This means that the flywheel and the pedals are rotationally fixed in both a clockwise and a counterclockwise direction. A locking hub 447 on the flywheel may change the nature of exercises performed on the modular stationary bicycle 400, including adding resistance to reducing the cycling rotation rate and adding resistance to reverse pedaling. In some embodiments, the modular locking hub 447 installed on the base flywheel 445 may be further modified to include a switching mechanism to switch between freewheeling operation and locked hub operation.

The base stationary bicycle 402 may further include a pedal disconnect 448. This may include a modular connection to the pedals and crank that selectively disconnects rotation of the pedals and crank to rotation of the flywheel. In combination with the locking hub 447, the pedal disconnect 448 may allow the flywheel to be used for other purposes. For example, the flywheel may be connected to a flywheel strength training system 449. The locking hub 447 and/or the flywheel (either the base flywheel 445 or the modular flywheel 446) may be connected to and rotationally fixed to a spool. Thus, as the spool rotates, the flywheel may rotate. A cable may be wrapped around the spool, and a handle may be connected to the cable. A user may pull on the handle and unwind the cable from the spool, thereby rotating the flywheel. Thus, the flywheel strength training system 449 may use the resistance of the flywheel to perform strength training. This may reduce the number of exercise devices in a user's home, and/or reduce the cost of purchasing a separate strength training system.

The flywheel may further be modified or upgraded with a modular resistance mechanism 450. The modular resistance mechanism 450 may provide variable resistance to the flywheel, thereby allowing the user to customize the intensity of the exercise. In some embodiments, the base flywheel may include a manually operated friction based resistance mechanism. In some embodiments, the modular resistance mechanism 450 may add a motor and a gear to change the resistance applied to the flywheel. As the user operates the modular stationary bicycle 400, she may wish to stop manually increasing the resistance, and may install a modular resistance mechanism 450, which may improve the exercise experience by allowing the user to more easily change the resistance of the flywheel. In other embodiments, the modular resistance mechanism 450 may replace the mechanical friction resistance mechanism with a magnetic resistance mechanism. Furthermore, after operating the base flywheel 445, the user may wish to reduce the noise of the base flywheel 445, and may wish to upgrade or replace the base flywheel 445 with a magnetic resistance mechanism, which may make less noise while producing resistance.

In some embodiments, the base stationary bicycle 402 may be modularly upgraded with a modular strength training system 428. The modular strength training system 428 may include a free weight frame that supports a set of free weights or resistance bands (e.g., flexible elastic bands) attached to the frame of the base stationary bicycle 402. The free weights or resistance bands may be located to be easily accessible by the user while using the modular stationary bicycle 400. In this manner, the user may be able to perform interval workouts, including HIIT workouts and standalone strength training workouts. This may improve the exercise experience for the user and/or may reduce the space and cost of purchasing a separate strength training system.

The base stationary bicycle 402 may be modified or upgraded with a modular seat 451. The modular seat 451 may have a different shape, cushioning, or other feature different from a base bicycle seat. This may improve the comfort of the user while exercising. The modular seat 451 may include or be modified or upgraded to include a modular cooling system 452. The modular cooling system 452 may include a seat cushion through which an airflow flows. The airflow may cool the user, thereby improving the exercise experience. In some embodiments, the airflow may be cooled using an air conditioning system.

The base stationary bicycle 402 may be modified or upgraded with modular handles 410. The modular handles 410 may be a different shape, or have a different level of adjustability, than a set of base handles. In some embodiments, the modular handles 410 or the base handles may be further modified with modular grips 453. The modular grips 453 may have a different texture, cushioning, color, design, or any combination of the foregoing.

In some embodiments, the modular handles 410 may include or be modifiable or upgradeable to include modular input devices 411. For example, the modular handles 410 may include controls that may control one or more exercise features of the base stationary bicycle 402, such as resistance level, incline, and so forth. In other examples, the modular handles 410 may include volume controls for the display, television controls (play/pause, channel, etc.), and other input devices 411.

The base stationary bicycle 402 includes a base frame. The base frame may be modified or upgraded with a modular frame 454. The modular frame 454 may include or be modified to include a plurality of modular units. For example, the modular frame 454 may include a vibration generator 455. The vibration generator 455 may vibrate the modular frame 454 in response to an exercise program. This may allow the user to simulate real-world riding conditions. For example, the vibration generator 455 may generate vibrations to simulate riding over specific terrain, such as a smooth road, a rough road, or a dirt trail. The vibration generator 455 may simulate obstacles in a road, such as potholes, curbs, or other obstacles. In this manner, a user who desires to more fully simulate real-world riding conditions may improve her exercise experience by installing a modular frame 454.

The modular frame 454 may further include an incline adjuster 430. The incline adjuster may be configured to adjust the incline of the modular stationary bicycle 400. This may simulate riding a bicycle uphill or downhill, and may change the effort required to exercise on the modular stationary bicycle. This may further improve the experience for the user by more closely simulating an outdoor bicycle ride.

The modular frame 454 may further include laterally flexible connections 456. The laterally flexible connections 456 may allow the modular frame 454 to tilt from side to side as the user pedals. For example, when riding a mobile bicycle, when a user stands up to pedal, the force of the pedaling may cause the bicycle to tilt from side to side. Installing laterally flexible connections 456 may simulate this experience, thereby more closely simulating riding on a mobile bicycle.

In some embodiments, the base stationary bicycle 402 may not include a console. The modular frame 454 may include a modular connection into which a modular console 404 may be inserted. The modular console 404 may include a display, controls to operate the base stationary bicycle 402, and other console features. In other embodiments, the base stationary bicycle 402 may include a base console. The base console and/or the modular console 204 may be upgraded to include several modular features, including an upgraded display, upgraded controls, speakers, fans, or other modular features, including those console features discussed with respect to the modular console 104 of FIG. 1.

Any of the modular units discussed in relation to the modular stationary bicycle 400 may be combined with any other modular unit to create a customized modular stationary bicycle 400. In this manner, the user may select which exercise features he would like to use, and only purchase those features. Or, a user may wish to initially exercise with a base model. As the user's expertise, interests, or needs grow, or as the user desires to spend more money, the user may wish to add exercise features, and may select which features to add without needing to purchase an entirely new exercise device. In this manner, the user may tailor the exercise experience to his or her wants, needs, and budget.

FIG. 5-1 is a representation of a modular stationary bicycle 500, according to at least one embodiment of the present disclosure. In the embodiment shown, the modular stationary bicycle 500 is a base stationary bicycle, without any installed modular units. The modular stationary bicycle 500 includes a plurality of modular connections (collectively 536). Modular units may be physically connected to one or more of the modular connections 536.

The modular stationary bicycle includes a frame 554. The frame 554 is connected to a seat 551 and handles 510. A drivetrain 557 includes pedals and crank 558 and a flywheel 545. The pedals and crank 558 are rotationally connected to the flywheel 545. Thus, as the user rotates the pedals and crank 558, the flywheel 545 may rotate. The features and elements of the modular stationary bicycle 500 are meant to be exemplary, and it should be understood that different embodiments and configurations of stationary bicycles may be used in accordance with the embodiments of the present disclosure.

The modular connections 536 may include a plurality of different modular connections. For example, the frame 554 may include a seat modular connection 536-1. The seat modular connection 536-1 may be configured to replace the seat 551 with a modular seat. As discussed above in reference to FIG. 4, the modular seat may include additional cushioning, a different shape, or a cooling system.

The modular connections 536 may further include a handle modular connection 536-2. The handle modular connection may be configured to replace the handle 510 with a modular handle. The modular handle may include a different shape or grip, or may include input controls.

The modular connections 536 may further include a modular flywheel connection 536-3. The modular flywheel connection 536-3 may be configured to allow the flywheel 545 or a flywheel hub to be easily replaced. This may allow for a different flywheel having different properties to be installed, or for a locking hub, or a selectively locking hub, to be installed. The modular flywheel connection 536-3 may allow the pedals and crank 558 to be disconnected from the flywheel 545.

The frame 554 may further include frame modular connections 536-4. Several different modular connections may be connected to the frame modular connections 536-4. For example, a console may be connected to the frame modular connections 536-4. In other examples, a weight system may be connected to the frame modular connections 536-4. In still other examples, a vibration generator may be connected to the frame modular connections 536-4. In yet other examples, a laterally flexible connection may be installed in the frame modular connections 536-4, which may allow the frame 554 to tilt from side to side as the user pedals while standing.

In some embodiments, one or more sensors may be installed in any of the modular connections 536 or at any other location. Sensors used in conjunction with the modular stationary bicycle may include force sensors, position monitoring sensors, temperature sensors, heart rate sensors, other biometric sensors, or combinations of the foregoing. In this manner, the user may collect data about her exercise to analyze and interpret her performance.

FIG. 5-2 is a representation of the modular stationary bicycle 500 of FIG. 5-1. The modular stationary bicycle 500 has been modified to include a modular console 538 physically connected to the frame 554 at the handle modular connection 536-2. The modular console may be placed so that the user may easily view it while exercising.

The handle modular connection 536-2 may include an electric connection to a plurality of systems in the modular stationary bicycle 500. Thus, when the modular console 538 is installed, the modular console 538 may control different portions of the modular stationary bicycle 500. For example, the modular console 538 may include user input for resistance controls, and a resistance applied to the flywheel 545 may be changed based on input from the user into the modular console 538. In other examples, the modular console 538 may include a plurality of exercise programs. The modular console 538 may change the resistance applied to the flywheel 545 automatically, such as to synchronize with the exercise program. Thus, the exercise experience may be improved because the user may not have to do anything to change the resistance applied to the flywheel 545.

As discussed above, the modular console 538 may be modularly modifiable or upgradeable. For example, the modular console 538 may be upgradeable to include a bigger screen, a higher resolution screen, a touch screen, one or more speakers, one or more fans, or any other feature. This may further improve the exercise experience for the user.

FIG. 5-3 is a representation of the modular stationary bicycle 500 of FIG. 5-1, according to at least one embodiment of the present disclosure. The modular stationary bicycle may include a flywheel strength training system 549 connected to the flywheel 545. The flywheel 545 may have a locking hub 547 installed at the modular flywheel connection 536-3. The locking hub 547 may include a pedal disconnect that selectively disconnects the pedals and crank 558 from the flywheel 545. Thus, the flywheel 545 may rotate independently of the pedals and crank 558.

The flywheel strength training system 549 may include a spool 559 connected to the locking hub 547. The spool 559 may be rotationally connected to the flywheel 545 such that the spool 559 rotates with the flywheel 545. In other words, a torque applied to the spool 559 may rotate the flywheel 545. A cable 560 may be wrapped around the spool 559. When a user pulls on a handle 561 connected to the cable 560, the spool 559 may rotate, causing the flywheel 545 to rotate. The resistance of the flywheel 545 may allow the user to perform strength training exercises by pulling on the handle 561 and thereby rotating the flywheel 545. This may allow a user to purchase a strength training system 549 without a separate frame, weights, or other equipment.

FIG. 5-4 is a representation of the modular stationary bicycle 500 of FIG. 5-1, according to at least one embodiment of the present disclosure. In some embodiments, the frame 554 may be modularly upgraded with a modular strength training system 528. The modular strength training system 528 may include a free weight frame that supports a set of free weights or resistance bands (e.g., flexible elastic bands) attached to the frame 554 at the frame modular connection 536-4. The free weights or resistance bands may be located to be easily accessible by the user while using the modular stationary bicycle 500. In this manner, the user may be able to perform interval workouts, including HIIT workouts and standalone strength training workouts. This may improve the exercise experience for the user and/or may reduce the space and cost of purchasing a separate strength training system.

The modular stationary bicycle 500 described in reference to FIG. 5-1 through FIG. 5-4 may be modified or upgraded to include any of the modular units described herein, either in reference to FIG. 5-1 through FIG. 5-4, FIG. 4, or any other modular unit, such as those described in reference to FIG. 1 through FIG. 3-6. In this manner, the user may selectively upgrade and optimize the modular stationary bicycle 500 to include the desired features, and to exclude any undesired features. Furthermore, as the user uses the modular stationary bicycle 500, he may upgrade the stationary bicycle with improved features in the form of the various modular units. Furthermore, some of the modular units may themselves be modularly upgradeable. This may allow the manufacturer to manufacture the base stationary bicycle, and the user to select the features that he will use. This may save the user money, and streamline the manufacturing process by manufacturing modular parts that fit together, rather than manufacturing many different models. Furthermore, this may ease confusion on the consumer, as it may allow the consumer to get exactly what he is looking for, rather than being forced to purchase a confusing combination of bicycle features, many of which he may not use.

Figures 3, 4, 5, 6:
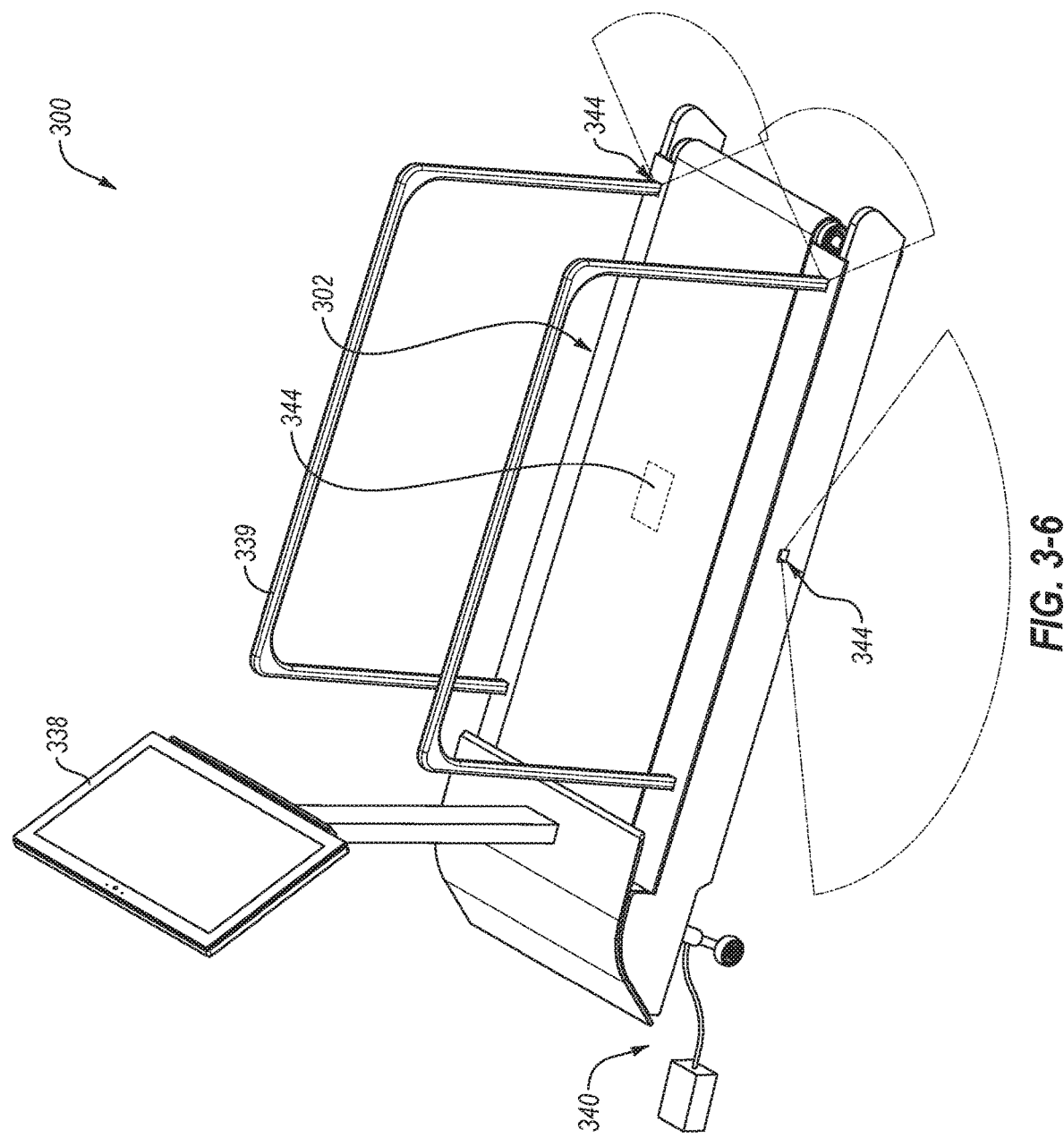
Figure 4:
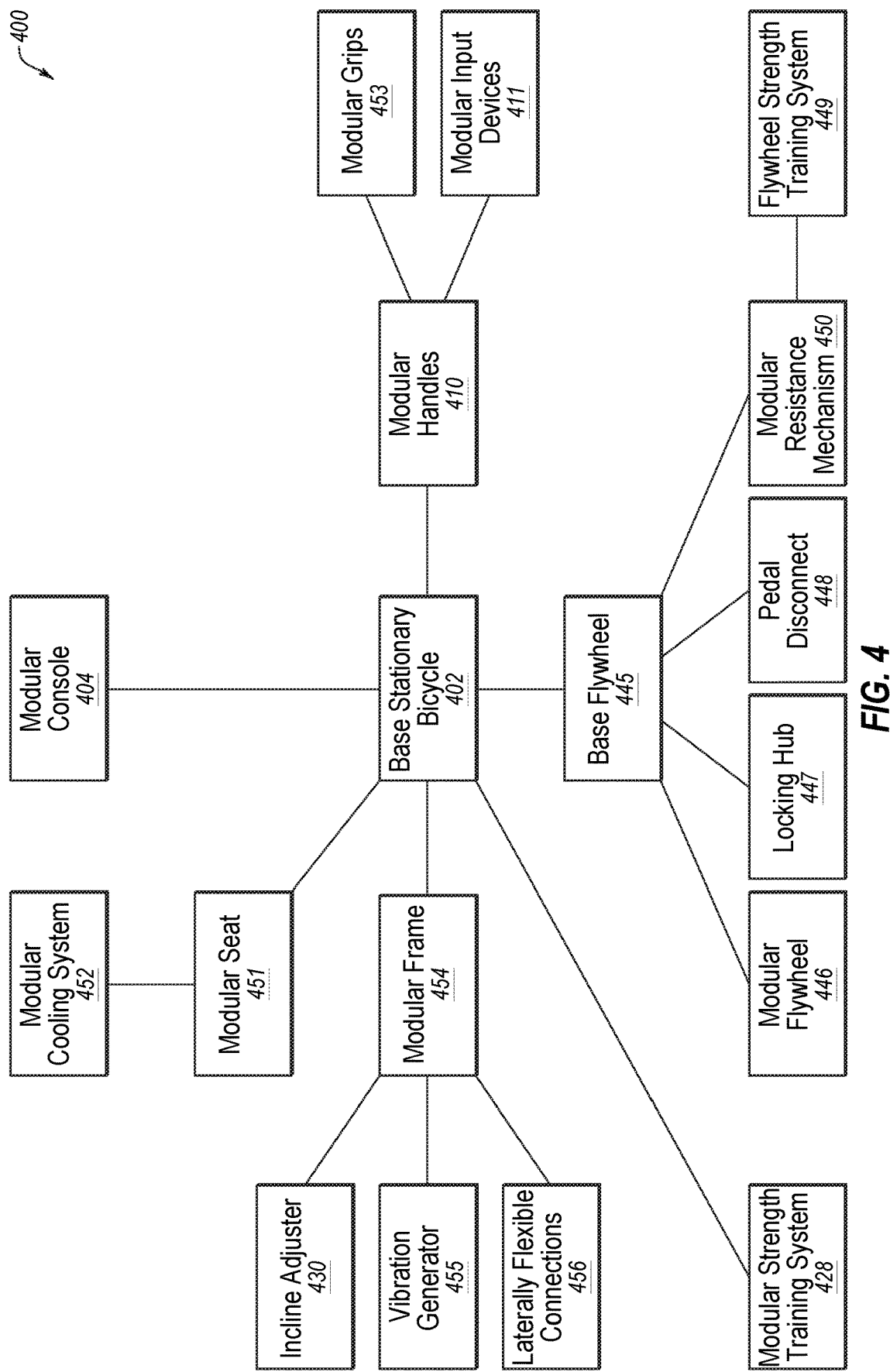
Figures 1, 5:
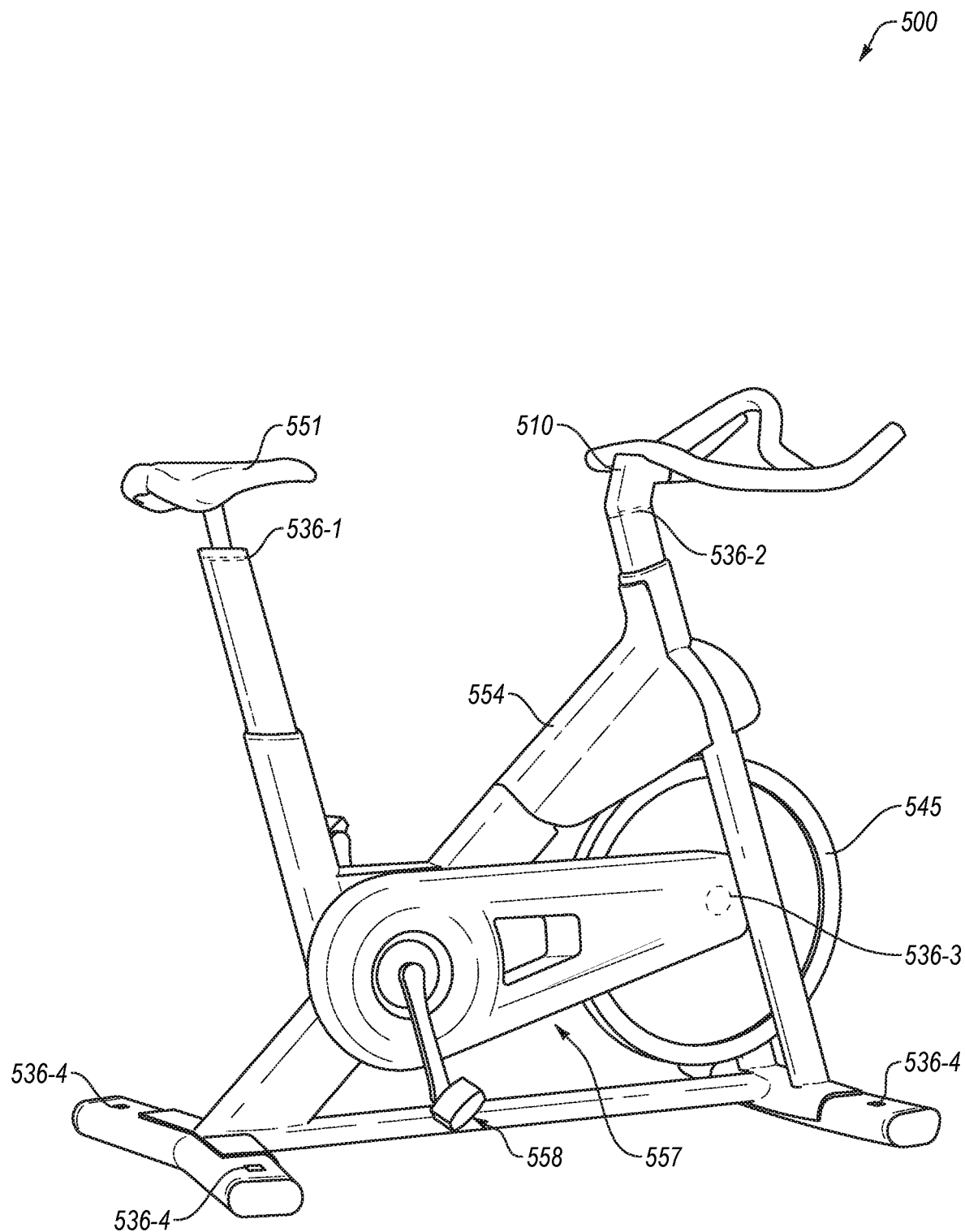
Figures 2, 5:
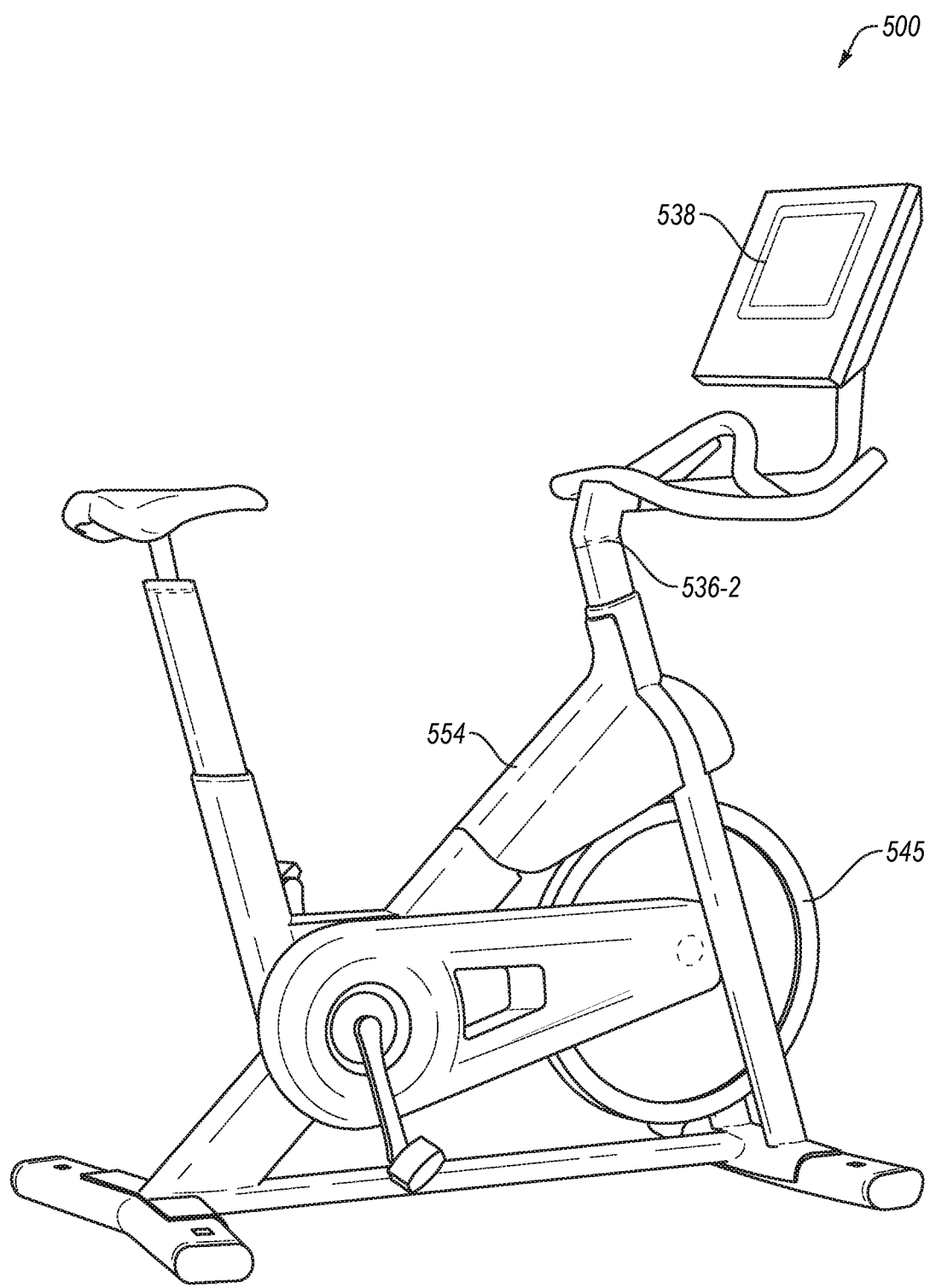
Figures 3, 5:
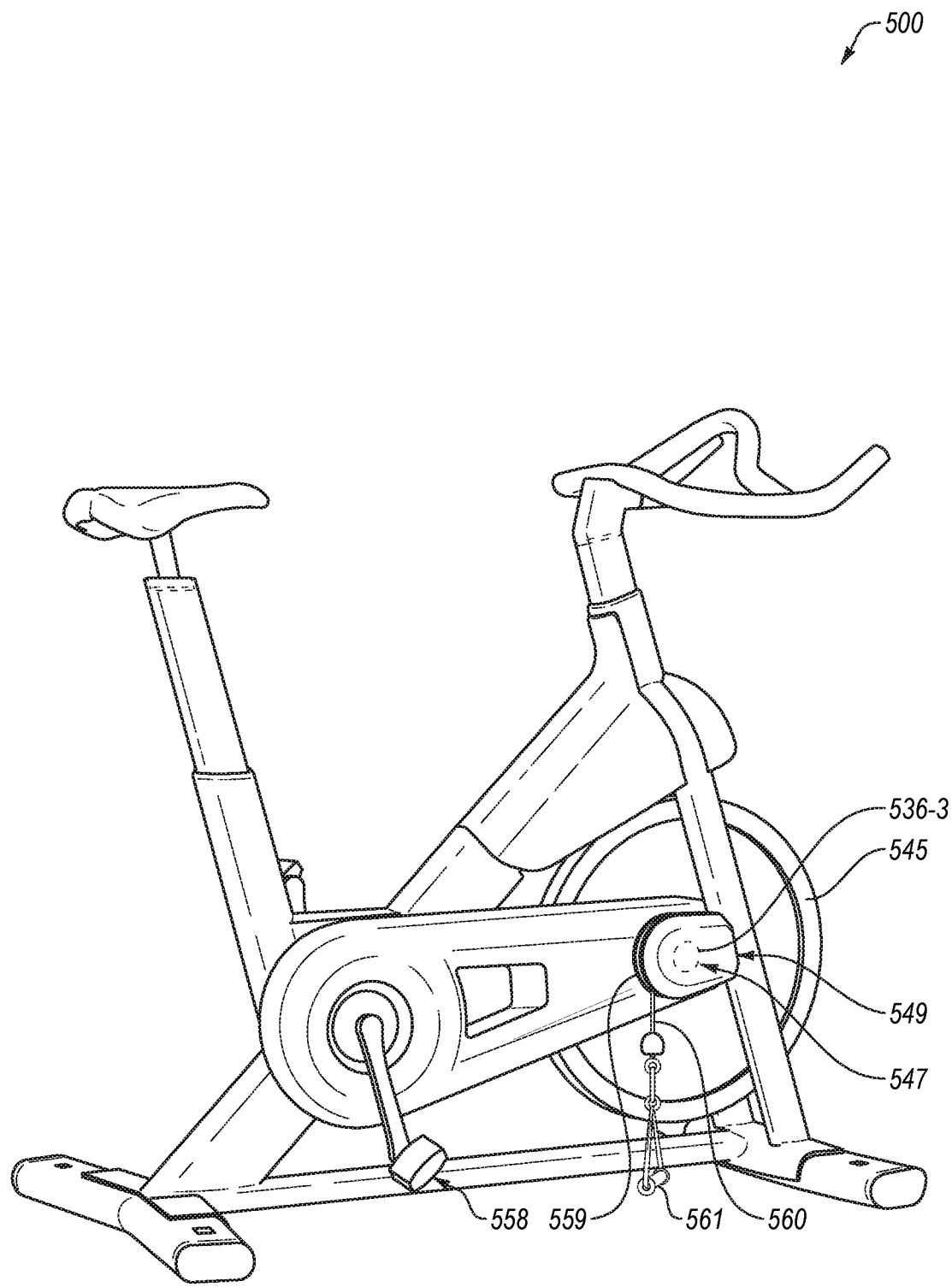
Figures 4, 5:
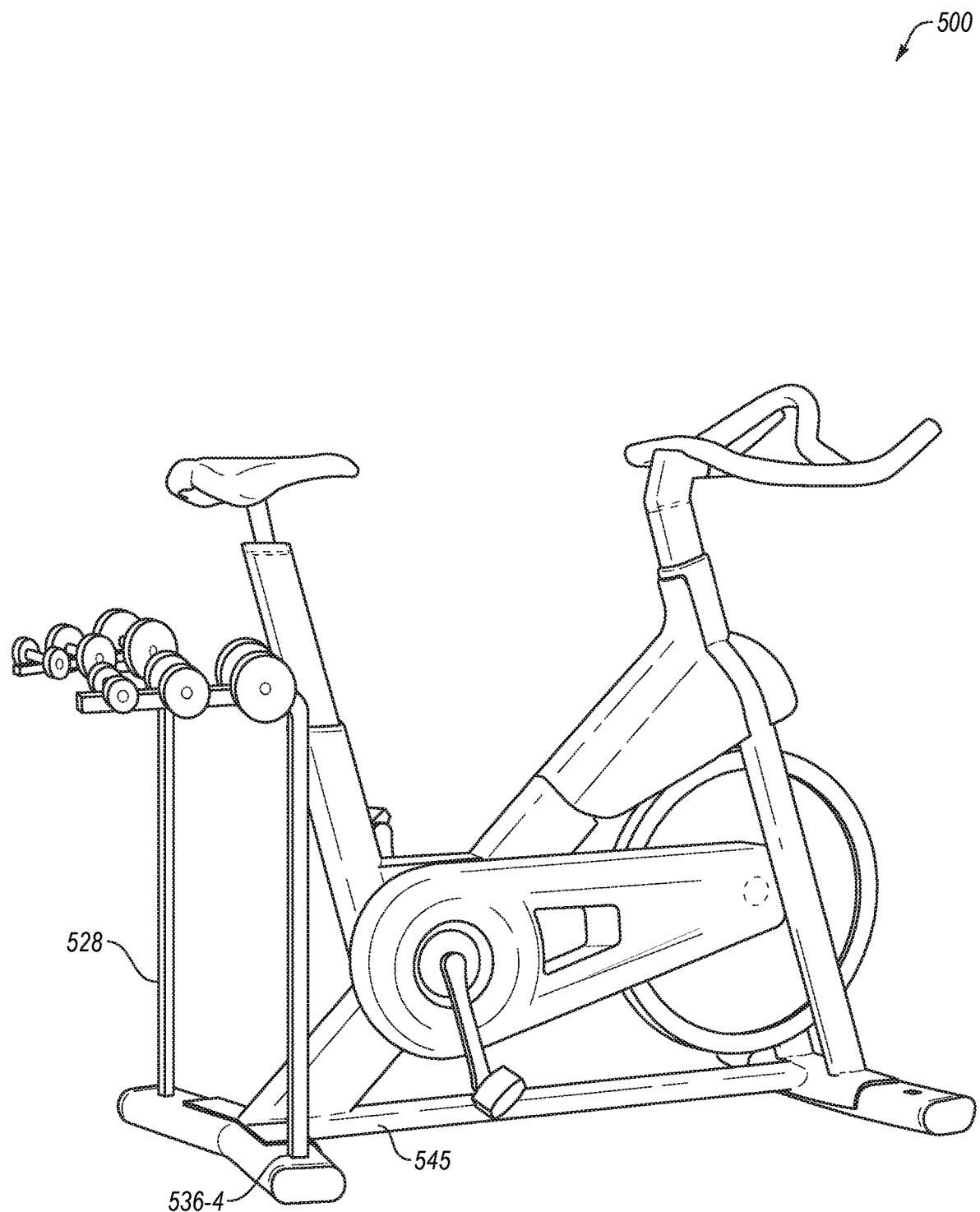
Figure 6:
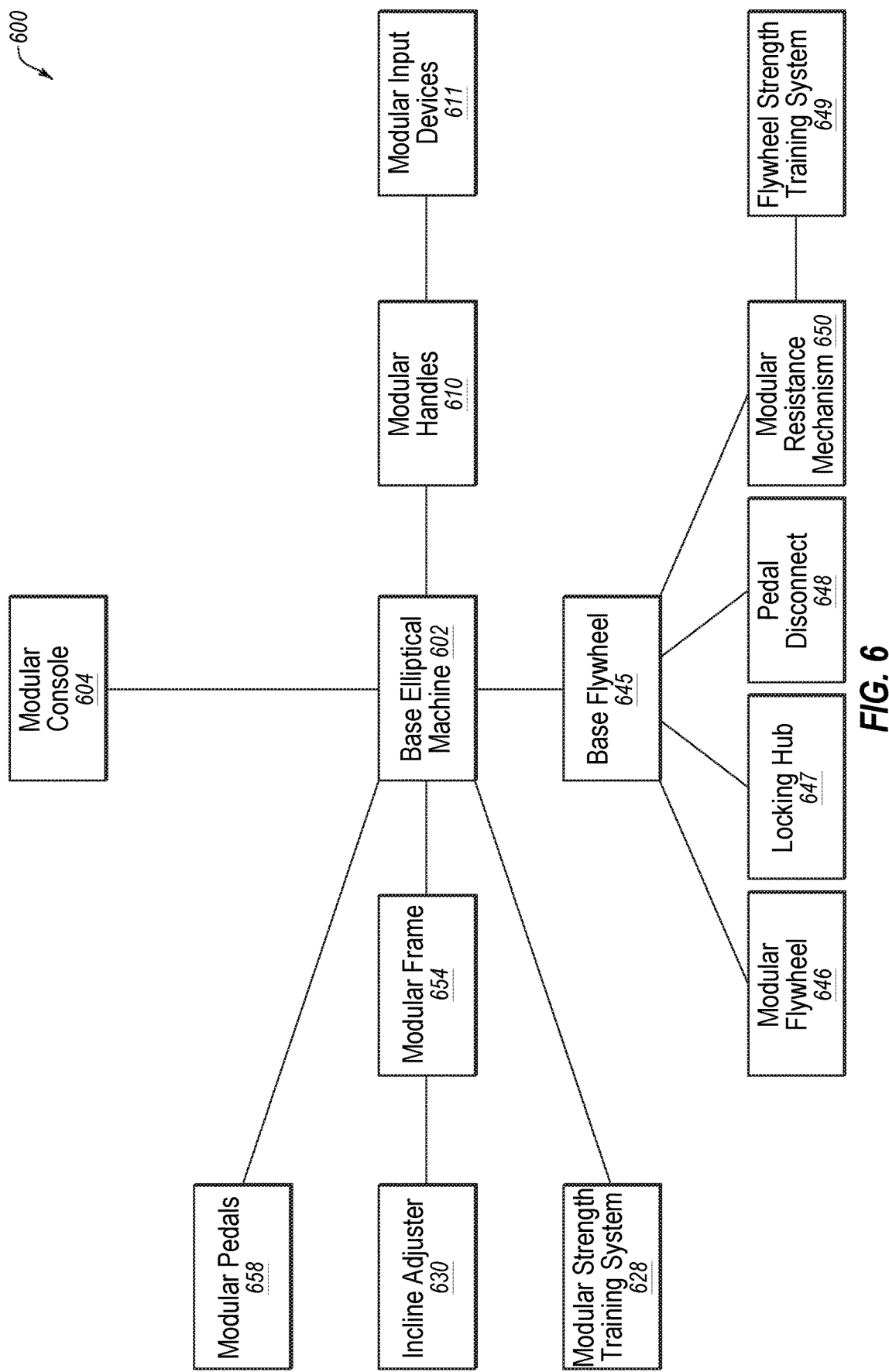

FIG. 6 is a schematic representation of a modular elliptical machine 600, according to at least one embodiment of the present disclosure. The modular elliptical machine 600 may include a base elliptical machine 602. The base elliptical machine 602 may include the basic features used to exercise on an elliptical machine, including a frame, pedals, footrests on the pedals, handles, and a resistance mechanism (such as a flywheel) rotated by the pedals and/or handles.

A plurality of modular units may be physically connectable to the base elliptical machine 602 to selectively upgrade the base stationary bicycle to include features not included on the base elliptical machine 602.

The base elliptical machine 602 may include a plurality of modular connections. The plurality of modular units may be physically connected to the plurality of modular connections. In this manner, the base elliptical machine 602 may be modularly modifiable and/or upgradeable by physically connecting the modular units to the modular connections. The modular units include at least one exercise feature not included in the base elliptical machine 602. Thus, a user may select a set of desired exercise features and modify and/or upgrade the base elliptical machine 602 to include the desired exercise features, and not include any undesired exercise features.

The base elliptical machine 602 may include a base flywheel 645. The base flywheel 645 may be the base resistance mechanism for the base elliptical machine 602. The base flywheel 645 may include a modular connection that allows the base flywheel 645 to be replaced with a modular flywheel 646. The modular flywheel 646 may include a different rotational mass, different cosmetics, different resistance levels, or other flywheel features. This may allow the user to modify or replace the base flywheel 645 with a desired modular flywheel 646.

A locking hub 647 may be installed at the modular flywheel connection. The locking hub 647 may prevent the base flywheel 645 or the modular flywheel 646 from freewheeling. In other words, the locking hub 647 may cause the flywheel to rotate with a direct ratio to the torque applied to the flywheel. This means that the flywheel and the pedals are rotationally fixed in both a clockwise and a counterclockwise direction. A locking hub 647 on the flywheel may change the nature of exercises performed on the modular elliptical machine 600, including adding resistance to reducing the cycling rotation rate and adding resistance to reverse pedaling. In some embodiments, the modular locking hub 647 installed on the base flywheel 645 may be further modified to include a switching mechanism to switch between freewheeling operation and locked hub operation.

The base elliptical machine 602 may further include a pedal disconnect 648. This may include a modular connection to the pedals and crank that selectively disconnects rotation of the pedals and crank to rotation of the flywheel. In combination with the locking hub 647, the pedal disconnect 648 may allow the flywheel to be used for other purposes. For example, the flywheel may be connected to a flywheel strength training system 649. The locking hub 647 and/or the flywheel (either the base flywheel 645 or the modular flywheel 646) may be connected to and rotationally fixed to a spool. Thus, as the spool rotates, the flywheel may rotate. A cable may be wrapped around the spool, and a handle may be connected to the cable. A user may pull on the handle and unwind the cable from the spool, thereby rotating the flywheel. Thus, the flywheel strength training system 649 may use the resistance of the flywheel to perform strength training. This may reduce the number of exercise devices in a user's home, and/or reduce the cost of purchasing a separate strength training system.

The flywheel may further be modified or upgraded with a modular resistance mechanism 650. The modular resistance mechanism 650 may provide variable resistance to the flywheel, thereby allowing the user to customize the intensity of the exercise. In some embodiments, the base flywheel may include a manually operated friction based resistance mechanism. In some embodiments, the modular resistance mechanism 650 may add a motor and a gear to change the resistance applied to the flywheel. As the user operates the modular elliptical machine 600, she may wish to stop manually increasing the resistance, and may install a modular resistance mechanism 650, which may improve the exercise experience by allowing the user to more easily change the resistance of the flywheel. In other embodiments, the modular resistance mechanism 650 may replace the mechanical friction resistance mechanism with a magnetic resistance mechanism. Furthermore, after operating the base flywheel 645, the user may wish to reduce the noise of the base flywheel 645, and may wish to upgrade or replace the base flywheel 645 with a magnetic resistance mechanism, which may make less noise while producing resistance.

In some embodiments, the base elliptical machine 602 may be modularly upgraded with a modular strength training system 628. The modular strength training system 628 may include a free weight frame that supports a set of free weights or resistance bands (e.g., flexible elastic bands) attached to the frame of the base stationary bicycle 402. The free weights or resistance bands may be located to be easily accessible by the user while using the modular elliptical machine 600. In this manner, the user may be able to perform interval workouts, including HIIT workouts and standalone strength training workouts. This may improve the exercise experience for the user and/or may reduce the space and cost of purchasing a separate strength training system.

The base elliptical machine 602 may be modified or upgraded with modular handles 610. The modular handles 610 may be a different shape, or have a different level of adjustability, than a set of base handles. In some embodiments, the modular handles 610 may include or be modifiable or upgradeable to include modular input devices 611. For example, the modular handles 610 may include controls that may control one or more exercise features of the base elliptical machine 602, such as resistance level, incline, and so forth. In other examples, the modular handles 610 may include volume controls for the display, television controls (play/pause, channel, etc.), and other modular input devices 611.

The base elliptical machine 602 includes a base frame. The base frame may be modified or upgraded with a modular frame 654. The modular frame 654 may include or be modified to include a plurality of modular units. For example, the modular frame 654 may include an incline adjuster 630. The incline adjuster may be configured to adjust the incline of the modular elliptical machine 600. This may allow the user to adjust the motion of the pedals and adjust the difficulty level of a workout. This may further improve the experience for the user.

The base elliptical machine 602 may be modified or upgraded to include modular pedals 658. The modular pedals 658 may include a different shape, angle, tread pattern, aesthetics, or other feature not included on the base elliptical machine 602. In this manner, the user may customize the base elliptical machine 602 to include pedals that have a desired shape, angle, or aesthetics. This may improve the exercise experience for the user by allowing the user to customize the aesthetics of the base elliptical machine 602, which may make exercising more appealing for the user.

In some embodiments, the base elliptical machine 602 may not include a console. The frame 654 may include a modular connection into which a modular console 604 may be inserted. The modular console 604 may include a display, controls to operate the base elliptical machine 602, and other console features. In other embodiments, the base elliptical machine 602 may include a base console. The base console and/or the modular console 604 may be upgraded to include several modular features, including an upgraded display, upgraded controls, speakers, fans, or other modular features, including those console features discussed with respect to the modular console 104 of FIG. 1.

Any of the modular units discussed in relation to the modular elliptical machine 600 may be combined with any other modular unit to create a customized elliptical machine 600. In this manner, the user may select which exercise features he would like to use, and only purchase those features. Or a user may wish to initially exercise with a base model. As the user's expertise grows, interests expand, or the user desires to spend more money, the user may wish to add exercise features, and may select which features to add without needing to purchase an entirely new exercise device. In this manner, the user may tailor the exercise experience to his or her wants, needs, and budget.

Figures 1, 7:
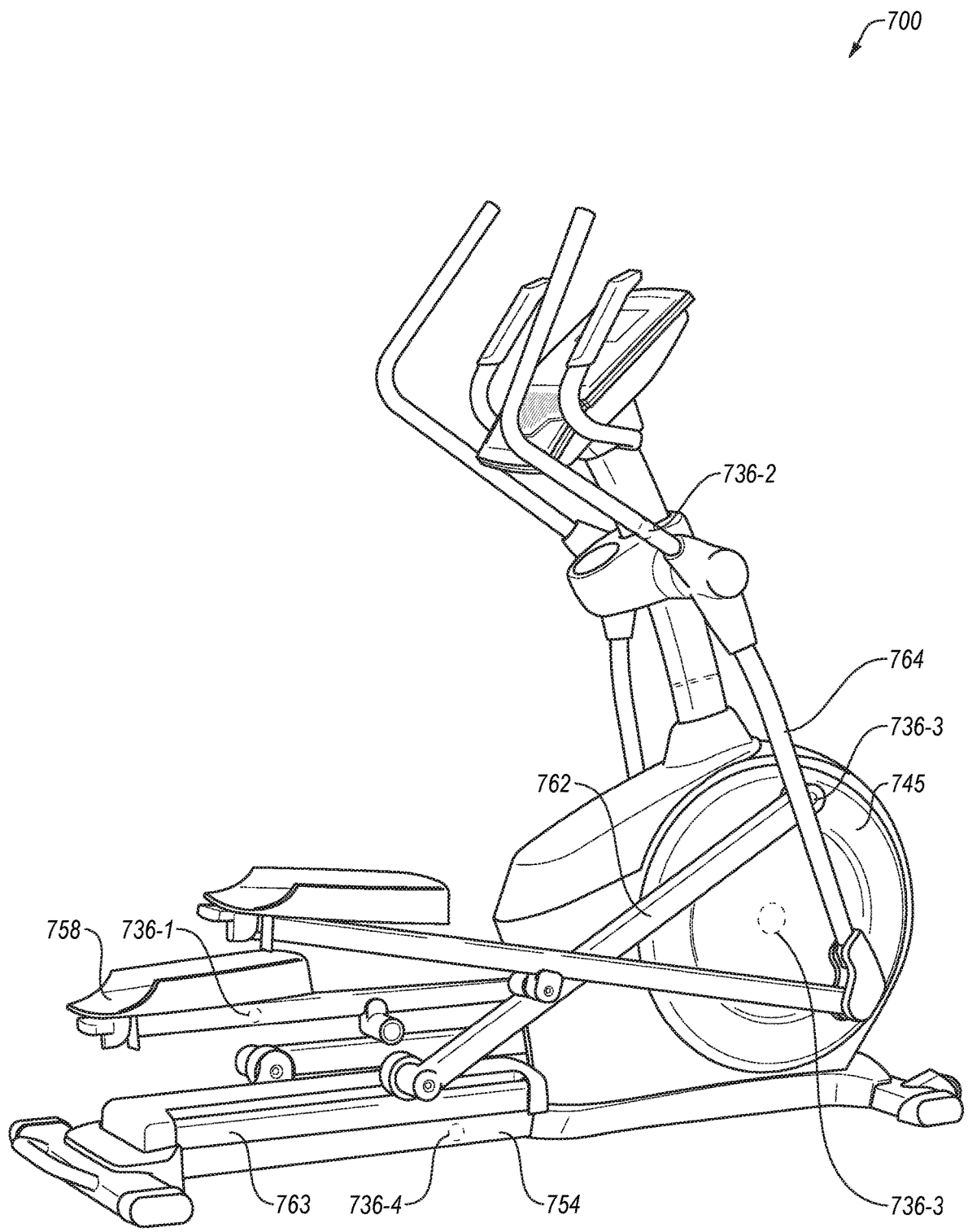
Figures 2, 7:
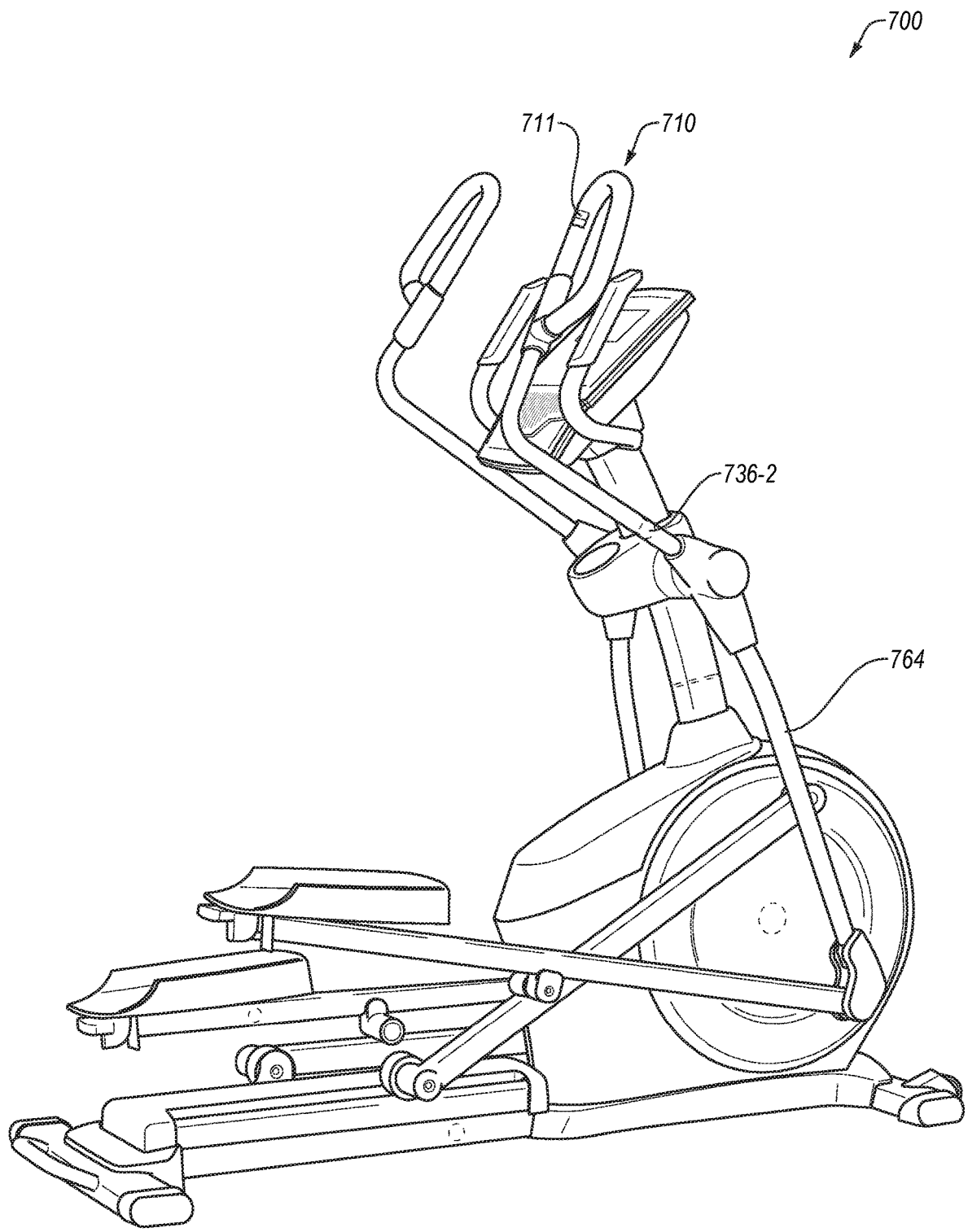
Figures 3, 7:
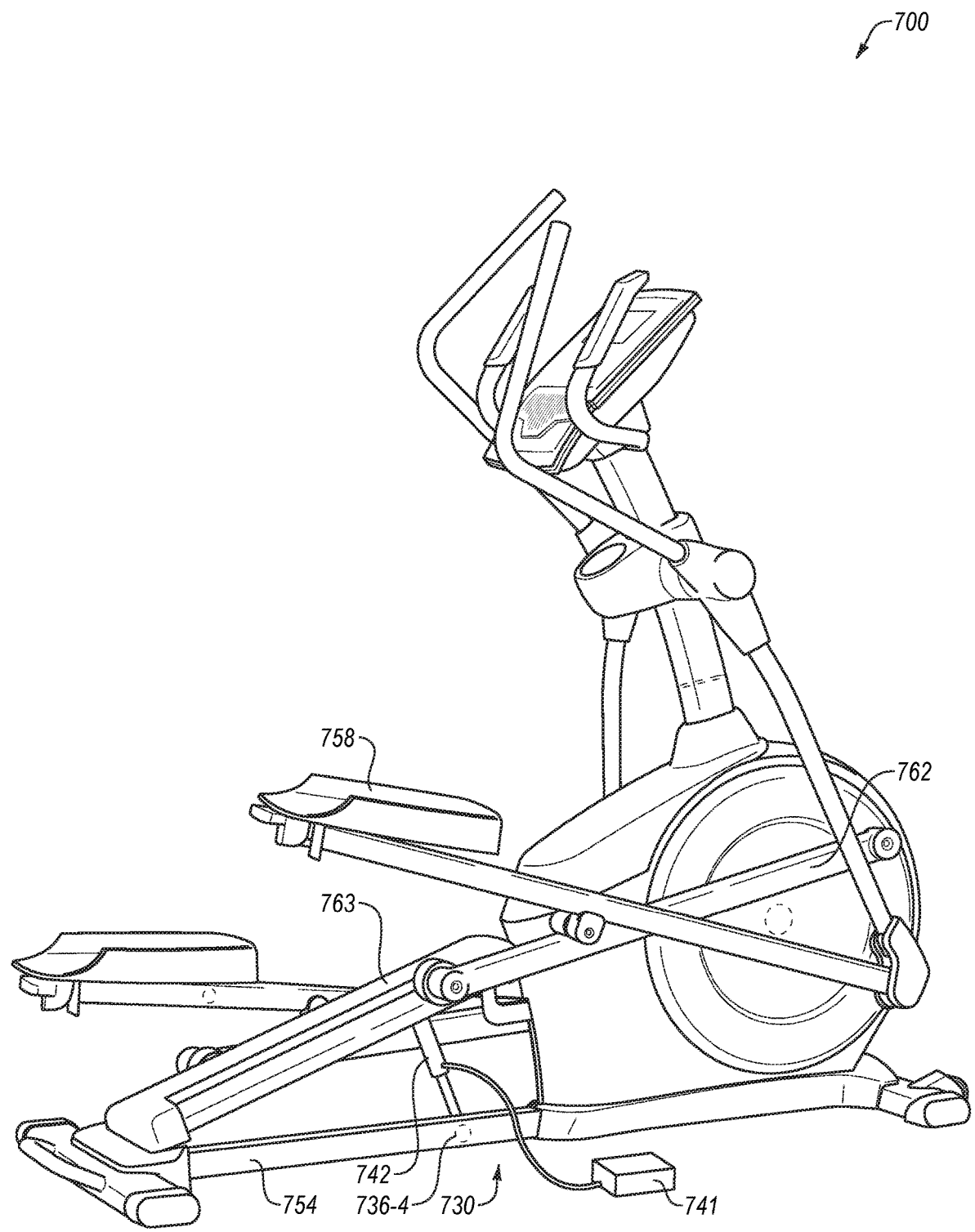

FIG. 7-1 is a representation of a modular elliptical machine 700, according to at least one embodiment of the present disclosure. In the embodiment shown, the modular elliptical machine 700 is a base elliptical machine, without any installed modular units. The modular elliptical machine 700 includes a plurality of modular connections (collectively 736). Modular units may be physically connected to one or more of the modular connections 736.

The modular elliptical machine 700 includes a frame 754. A set of pedals 758 are connected to a flywheel 745 such that as the pedals 758 are moved, the flywheel 745 is rotated. The pedals 758 may roll along one or more connection arms 762. The connection arms 762 may be radially fixed to the flywheel 745 at a first end such that forces applied to the connection arms 762 are transferred to the flywheel 745, causing the flywheel to rotate. In some embodiments, the connection arms 762 roll along a rolling deck 763 at a second end. The pedals 758 may be connected to arms 764. The arms may extend up to handles where a user may hold, push, and pull on the handles. The features and elements of the modular elliptical machine 700 are meant to be exemplary, and it should be understood that different embodiments and configurations of elliptical machines may be used in accordance with the embodiments of the present disclosure.

The modular connections 736 may include a plurality of different modular connections. For example, the pedals 758 may include a pedal modular connection 736-1. The base pedals 758 shown may be replaced with modular pedals. The modular pedals 758 may be a different size, shape, angle, or orientation, have a different tread pattern, cushioning, or cosmetic features, and combinations of the foregoing. In this manner, the user may modularly replace or upgrade the pedals 758 to match his size, body dynamics, comfort, cosmetic preferences, and combinations of the foregoing. This may improve the user's experience.

The arms 764 may include a handle modular connection 736-2. The base arms 764 shown may be replaced with a modular handles, which may include a different shape, angle, or orientation, have a different tread pattern, cushioning, or cosmetic features, and combinations of the foregoing. In this manner, the user may modularly replace or upgrade the arms 764 to match his size, body dynamics, comfort, cosmetic preferences, and combinations of the foregoing. This may improve the user's experience.

The flywheel 745 may include one or more modular flywheel connections 736-3. The modular flywheel connection 736-3 may be configured to allow the flywheel 745 or a flywheel hub to be easily replaced. This may allow for a different flywheel having different properties to be installed, or for a locking hub, or a selectively locking hub, to be installed. The modular flywheel connection 736-3 may further allow the pedals 758 and/or the connection arms 762 to be disconnected from the flywheel 545.

The frame 754 may include a modular frame connection 736-4. The modular frame connection 736-4 may be configured for a lift adjuster to be installed on the frame 754. The lift adjuster may include a motor and gears or a piston that change the incline of the rolling deck 763. Changing the incline of the rolling deck 763 may change the path of the pedals 758 and/or change the difficulty of an exercise performed on the modular elliptical machine 700.

In some embodiments, a modular strength training system may be connected to the modular frame connection 736-4. The modular strength training system may include a free weight frame that supports a set of free weights or resistance bands (e.g., flexible elastic bands) attached to the frame 754. The free weights or resistance bands may be located to be easily accessible by the user while using the modular elliptical machine 700. In this manner, the user may be able to perform interval workouts, including HIIT workouts and standalone strength training workouts. This may improve the exercise experience for the user and/or may reduce the space and cost of purchasing a separate strength training system.

The modular elliptical machine 700 may include a modular console connection 736-5. In some embodiments, the base elliptical machine may include a base console. In other embodiments, the base elliptical machine may not include a base console. A modular console may be connected to the modular elliptical machine 700 at the modular console connection 736-5. The modular console may include a display, exercise controls, a ventilation fan, speakers, and other exercise elements. This may allow the user to more easily review data about her exercise session, adjust the intensity of an exercise session, listen to music, direct a flow of air from a fan, and combinations of the foregoing.

In some embodiments, one or more sensors may be installed in any of the modular connections 736 or at any other location. Sensors used in conjunction with the modular stationary bicycle may include force sensors, position monitoring sensors, temperature sensors, heart rate sensors, other biometric sensors, or combinations of the foregoing. In this manner, the user may collect data about her exercise to analyze and interpret her performance.

FIG. 7-2 is a representation of the modular elliptical machine 700 of FIG. 7-2 including modular handles 710, according to at least one embodiment of the present disclosure. The modular handles 710 may be physically connected to the modular elliptical machine 700 at the handle modular connection 736-2. In the embodiment shown, the modular handles 710 include a different shape than the base handles connected to the arms 764. In this manner, the user may hold the modular handles 710 with a different grip, which may exercise different muscles than possible with the base handles on the arms 764.

The modular handles 710 may further include or be modified or upgraded to include modular input devices 711. The modular input devices 711 may control one or more of deck incline, flywheel resistance levels, or any other exercise feature of the modular elliptical machine 700. In this manner, the user may not have to remove her hands from the modular handles 710 to change an exercise feature, which may improve stability on the modular elliptical machine 700 and/or improve ease of use.

FIG. 7-3 is a representation of the modular elliptical machine 700 of FIG. 7-1 including an incline adjuster 730. The incline adjuster 730 may be physically connected to the frame 754 and the rolling deck 763 at the modular frame connection 736-4. The incline adjuster 730 may include a lift motor 741 and a lift gear 742. The lift gear 742 may be attached to the frame 754 and an underside of the rolling deck 763. The lift gear 742 may be any gear, such as a worm gear, a pneumatic piston, a hydraulic piston, or other gear. The lift motor 741 may be housed in a separate housing from the frame 754 or any other component of the modular elliptical machine 700. The lift motor 741 may operate the lift gear 742 to change an incline of the rolling deck 763. In this manner, the user may modify or upgrade the exercise experience by adding an incline to the motion of the pedals 758 and/or the connection arms 762. Furthermore, this may allow the user to decide whether or not to include the incline adjuster 730, based on his needs, wants, and finances.

The modular elliptical machine 700 described in reference to FIG. 7-1 through FIG. 7-3 may be modified or upgraded to include any of the modular units described herein, either in reference to FIG. 7-1 through FIG. 7-3, FIG. 6, or any other modular unit, such as those described in reference to FIG. 1 through FIG. 5-4. In this manner, the user may selectively upgrade and optimize the modular elliptical machine 700 to include the desired features, and to exclude any undesired features. Furthermore, as the user uses the modular elliptical machine 700, he may upgrade the elliptical machine with improved features in the form of the various modular units. Furthermore, some of the modular units may themselves be modularly upgradeable. This may allow the manufacturer to manufacture the base elliptical machine, and the user to select the features that he will use. This may save the user money, and streamline the manufacturing process by manufacturing modular parts that fit together, rather than manufacturing many different models. Furthermore, this may ease confusion on the consumer, as it may allow the consumer to get exactly what he is looking for, rather than being forced to purchase a confusing combination of elliptical features, many of which he may not use.

Figure 8:
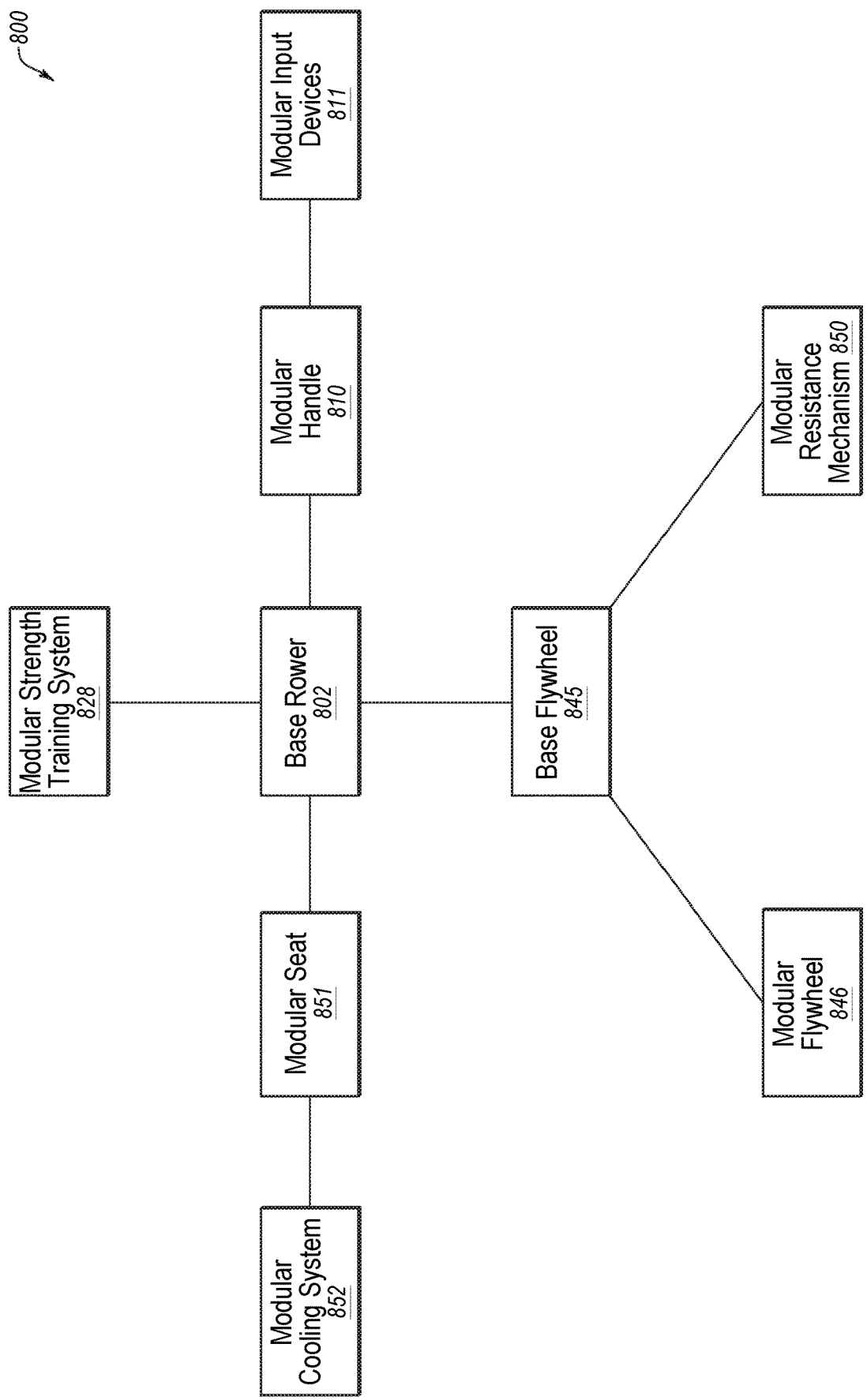
FIG. 8 is a schematic representation of a modular rower, according to at least one embodiment of the present disclosure.

FIG. 8 is a schematic representation of a modular rower 800, according to at least one embodiment of the present disclosure. The modular rower 800 may include a base rower 802. The base rower 802 may include the basic features used to exercise on a rower, including a frame, a seat that slides on the frame, pedals, a handle, and a resistance mechanism (such as a flywheel) rotated by a cable connected to the handle.

A plurality of modular units may be physically connectable to the base rower 802 to selectively upgrade the base stationary bicycle to include features not included on the base rower 802.

The base rower 802 may include a plurality of modular connections. The plurality of modular units may be physically connected to the plurality of modular connections. In this manner, the base rower 802 may be modularly modifiable and/or upgradeable by physically connecting the modular units to the modular connections. The modular units include at least one exercise feature not included in the base rower 802. Thus, a user may select a set of desired exercise features and modify and/or upgrade the base rower 802 to include the desired exercise features, and not include any undesired exercise features.

The base rower 802 may include a base flywheel 845. The base flywheel 845 may be the base resistance mechanism for the base rower 802. The base flywheel 845 may include a modular connection that allows the base flywheel 845 to be replaced with a modular flywheel 846. The modular flywheel 846 may include a different rotational mass, different cosmetics, different resistance levels, or other flywheel features. This may allow the user to modify or replace the base flywheel 845 with a desired modular flywheel 846.

The flywheel may further be modified or upgraded with a modular resistance mechanism 850. The modular resistance mechanism 850 may provide variable resistance to the flywheel, thereby allowing the user to customize the intensity of the exercise. In some embodiments, the base flywheel may include a manually operated friction based resistance mechanism. In some embodiments, the modular resistance mechanism 850 may add a motor and a gear to change the resistance applied to the flywheel. As the user operates the modular rower 800, she may wish to stop manually increasing the resistance, and may install a modular resistance mechanism 850, which may improve the exercise experience by allowing the user to more easily change the resistance of the flywheel. In other embodiments, the modular resistance mechanism 850 may replace the mechanical friction resistance mechanism with a magnetic resistance mechanism. Furthermore, after operating the base flywheel 845, the user may wish to reduce the noise of the base flywheel 845, and may wish to upgrade or replace the base flywheel 845 with a magnetic resistance mechanism, which may make less noise while producing resistance.

In some embodiments, the base rower 802 may be modularly upgraded with a modular strength training system 828. The modular strength training system 828 may include a free weight frame that supports a set of free weights or resistance bands (e.g., flexible elastic bands) attached to the frame of the base rower 802. The free weights or resistance bands may be located to be easily accessible by the user while using the modular rower 800. In this manner, the user may be able to perform interval workouts, including HIIT workouts and standalone strength training workouts. This may improve the exercise experience for the user and/or may reduce the space and cost of purchasing a separate strength training system.

The base rower 802 may be modified or upgraded with a modular handle 810. The modular handle 810 may be a different shape, or have a different level of adjustability, than a base handle. In some embodiments, the modular handle 810 may include or be modifiable or upgradeable to include modular input devices 811. For example, the modular handles 810 may include controls that may control one or more exercise features of the base rower 802, such as resistance level, incline, and so forth. In other examples, the modular handle 810 may include volume controls for the display, television controls (play/pause, channel, etc.), and other modular input devices 811. In some embodiments, the modular handle 810 may include a pair of handles. In other words, the modular handle 810 may include a handle for each hand. This may allow the user to adjust the force with which she pulls with either hand.

The base rower 802 may be modified or upgraded with a modular seat 851. The modular seat 851 may have a different shape, cushioning, bearings, or other feature different from a base rower seat. This may improve the comfort of the user while exercising. The modular seat 851 may include or be modified or upgraded to include a modular cooling system 852. The modular cooling system 852 may include a seat cushion through which an airflow flows. The airflow may cool the user, thereby improving the exercise experience. In some embodiments, the airflow may be cooled using an air conditioning system.

Figures 1, 9:
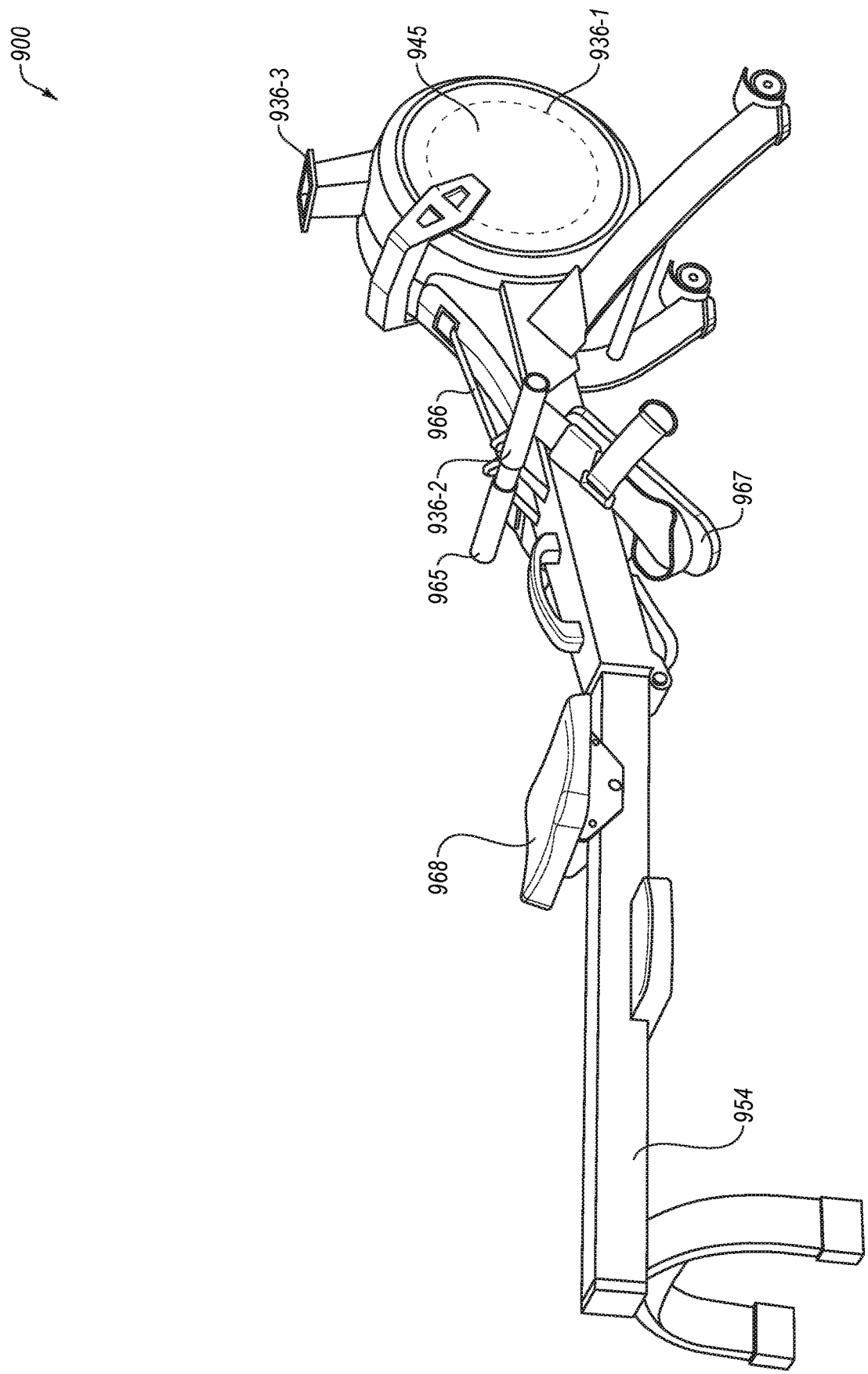
Figures 2, 9:
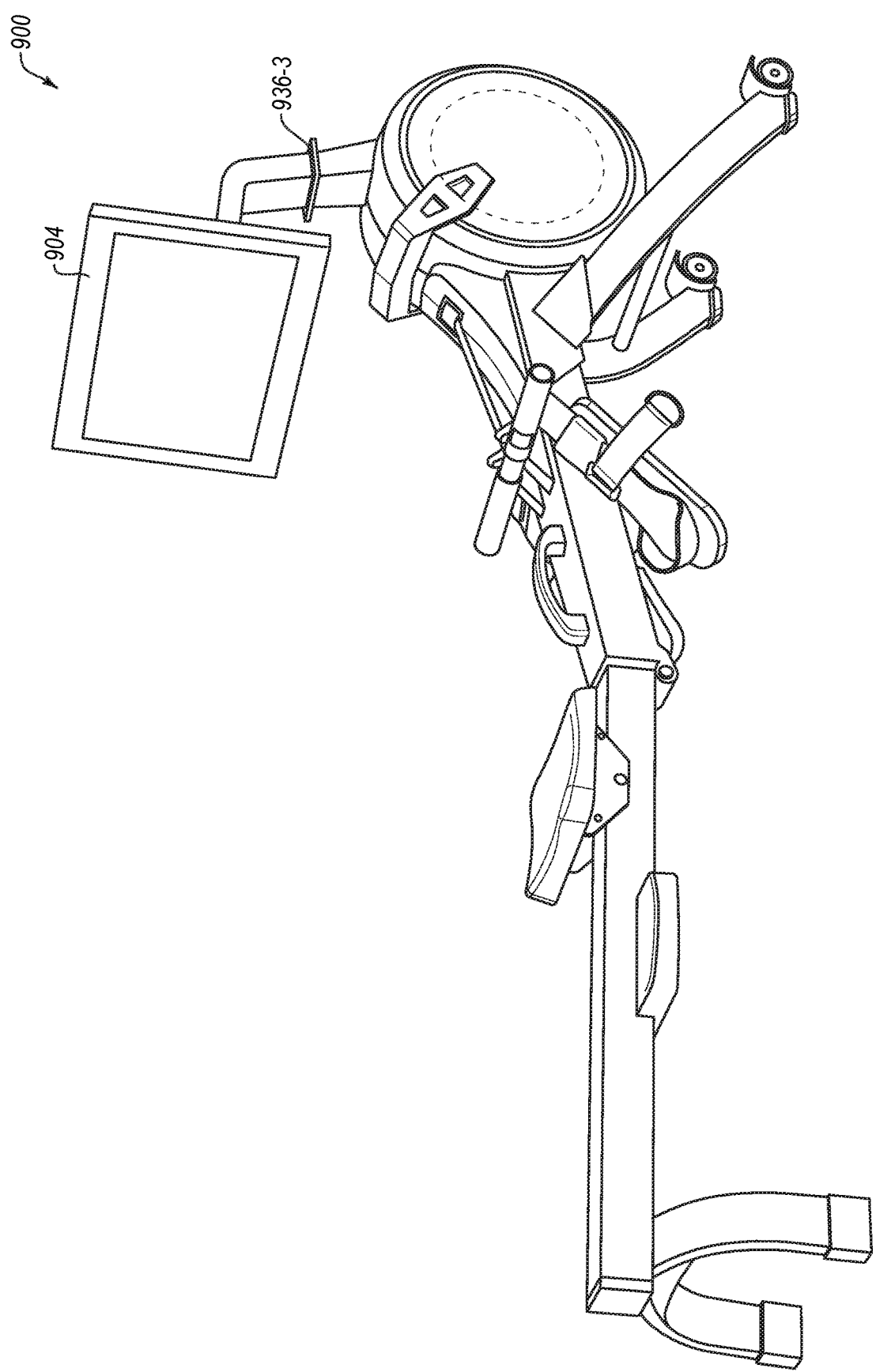

FIG. 9-1 is a representation of a modular rower 900, according to at least one embodiment of the present disclosure. In the embodiment shown, the modular rower 900 is a base modular rower, without any installed modular units. The modular rower 900 includes a plurality of modular connections (collectively 936). Modular units may be physically connected to one or more of the modular connections 936.

The modular rower 900 includes a frame 954. A handle 965 is connected to a cable 966. The cable 966 is connected to a flywheel 945. As a user pulls the handle 965, the cable 966 unwinds and rotates the flywheel 945. The modular rower 900 includes a pair of footrests 967 and a seat 968. The user sits on the seat 968 and places his feet on the footrests 967. The user then holds the handle 965 and unwinds the cable 966 from the flywheel 945 by one or both of pulling on the handle 965 and pushing with his feet. The seat 968 slides along the frame 954, thereby allowing the user to extend his legs as he pushes with his feet. The features and elements of the modular rower 900 are meant to be exemplary, and it should be understood that different embodiments and configurations of rowers may be used in accordance with the embodiments of the present disclosure.

The modular connections 936 include a plurality of different modular connections. For example, the flywheel 945 may include one or more modular flywheel connections 936-1. The modular flywheel connection 936-1 may be configured to allow the flywheel 945 or a flywheel hub to be easily replaced. This may allow for a different flywheel having different properties to be installed In other examples, the handle 965 may include a handle modular connection 936-2. The handle modular connection 936-2 may allow for a modular handle or handles to be installed. For example, the modular handle may have a different shape, grip texture, cushioning, may include two handles, or combinations of the foregoing. Furthermore, the modular handle may include one or more sensors, such as a force sensor, accelerometer, heartrate sensor, other biometric sensors, or combinations of the foregoing.

In yet other examples, the frame 954 may include a modular console connection 936-3. In some embodiments, the base rower may include a base console. In other embodiments, the base rower may not include a base console. A modular console may be connected to the modular rower 900 at the modular console connection 936-3. The modular console may include a display, exercise controls, a ventilation fan, speakers, and other exercise elements. This may allow the user to more easily review data about her exercise session, adjust the intensity of an exercise session, listen to music, direct a flow of air from a fan, and combinations of the foregoing.

In some embodiments, one or more sensors may be installed in any of the modular connections 936 or at any other location. Sensors used in conjunction with the modular stationary bicycle may include force sensors, position monitoring sensors, temperature sensors, heart rate sensors, other biometric sensors, or combinations of the foregoing. In this manner, the user may collect data about her exercise to analyze and interpret her performance.

FIG. 9-2 is a representation of the modular rower 900 that includes a modular console 904, according to at least one embodiment of the present disclosure. The modular console 904 is physically connected to the modular rower 900 at the console connection 936-3. The modular console 904 may be positioned so that the user may view the modular console 904 while operating the modular rower 900.

The console connection 936-3 may include an electrical connection connected to one or more features of the modular rower 900. When the modular console 904 is plugged into the console connection 936-3, the modular console 904 may be plugged into the electrical connection. In this manner, the modular console 904 may have be able to control one or more exercise features of the modular rower 900. Furthermore, the modular console 904 may receive information from one or more elements of the modular rower 900, such as sensors. The modular console 904 may process this information and display some or all of it on a display on the modular console 904.

The modular console 904 may be further upgradeable or modifiable. For example, the modular console 904 may be upgradeable with a modular display, modular controls, a fan, or other modular element. In this manner, the user may be able to customize the console and console features needed and/or desired to be used with the modular rower 900.

Figure 10:
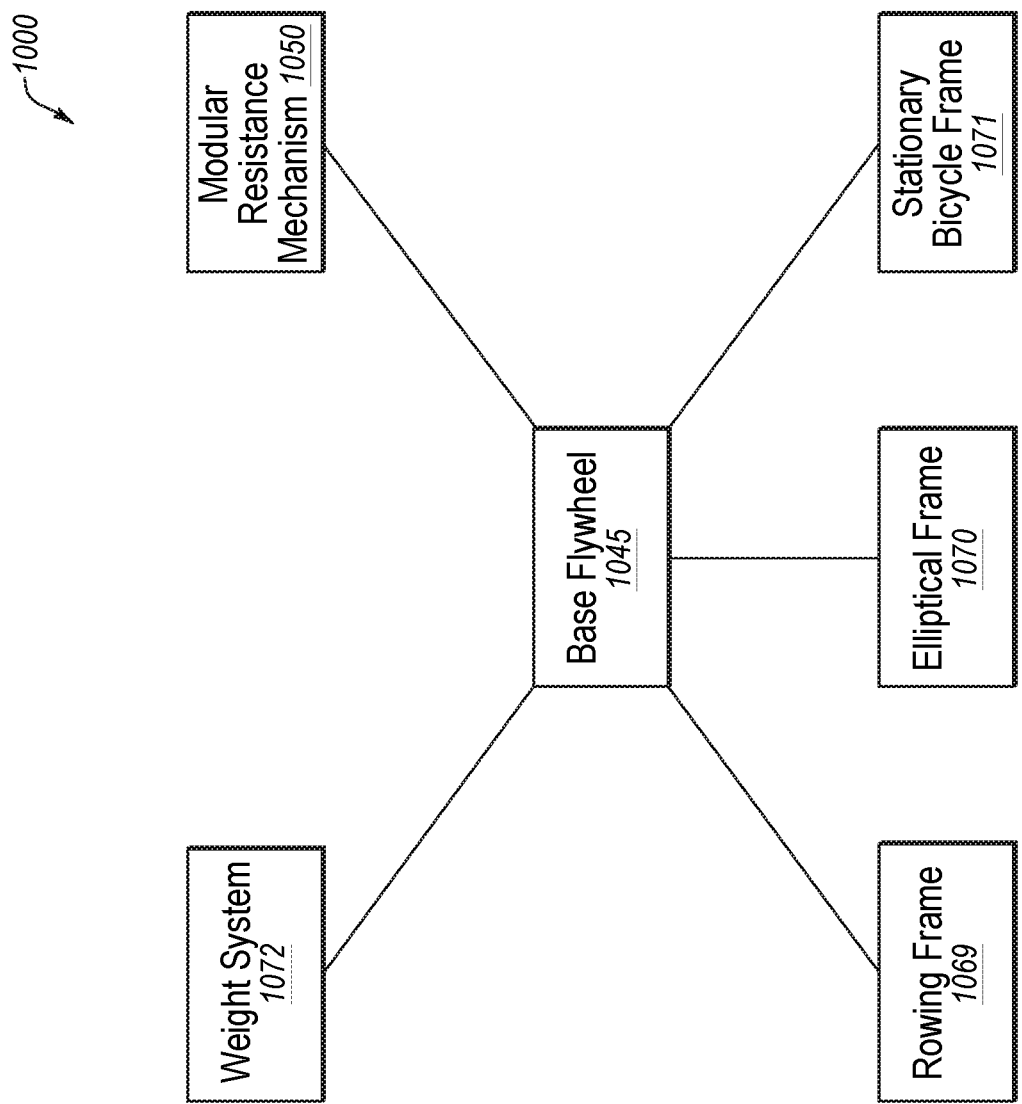
FIG. 10 is a schematic representation of a modular flywheel, according to at least one embodiment of the present disclosure.

FIG. 10 is a schematic representation of a modular exercise device 1000, according to at least one embodiment of the present disclosure. The modular exercise device 1000 includes a base flywheel 1045. The base flywheel 1045 includes a modular connection. A modular exercise frame may be physically connected to the flywheel 1045. The modular exercise frame may be configured to apply a torque to the base flywheel 1045 to rotate the base flywheel 1045. Thus, the modular exercise frame may use the resistance to rotation of the base flywheel 1045 as a resistance mechanism for an exercise.

The modular exercise frame may include any of the frames of the modular exercise devices disclosed herein. For example, a rowing frame 1069 may be modularly connectable to the base flywheel 1045. The rowing frame 1069 may be physically connectable to a base of the base flywheel 1045, and a handle and cable may be connected to the base flywheel 1045 such that the user may pull on the handle and cable while sliding on a seat of the rowing frame 1069.

An elliptical frame 1070 may be modularly connectable to the base flywheel 1045. The elliptical frame 1070 may be physically connectable to the base of the base flywheel 1045. The legs, connection arms, handles, or other part of the elliptical frame 1070 may be connected to the base flywheel 1045. Thus, as the user applies a force to pedals on the legs of the elliptical frame 1070, the force may be used to apply a torque to the base flywheel 1045, which may resist the applied torque.

A stationary bicycle frame 1071 may be modularly connectable to the base flywheel 1045. The stationary bicycle frame 1071 may be physically connectable to the base flywheel. The stationary bicycle frame 1071 includes drivetrain, including pedals connected to a crank. A chain, belt, or other force transfer device may connect the base flywheel 1045 to the drivetrain. In this manner, as the user applies a force to the pedals, the force may be transferred to apply a torque to the base flywheel 1045, which may resist the applied torque.

A weight system 1072 may be modularly connectable to the base flywheel 1045. The weight system 1072 may include a handle connected to a cable. The cable may be connected to a spool rotationally connected to the base flywheel 1045. As the user extends the cable, the cable may unspool, thereby applying a torque to the base flywheel 1045, which may resist the applied torque.

In some embodiments, other modular exercise frames may be modularly connectable to the base flywheel 1045, including a treadmill frame, a skier frame, a stair climber frame, and other modular exercise frames.

The base flywheel 1045 may further be modified or upgraded with a modular resistance mechanism 1050. The modular resistance mechanism 1050 may provide variable resistance to the base flywheel 1045, thereby allowing the user to customize the intensity of the exercise. In some embodiments, the base flywheel 1045 may include a manually operated friction based resistance mechanism. In some embodiments, the modular resistance mechanism 1050 may add a motor and a gear to change the resistance applied to the flywheel. This may improve the exercise experience for the user because she may no longer have to manually increase the resistance. In other embodiments, the modular resistance mechanism 1050 may replace the mechanical friction resistance mechanism with a magnetic resistance mechanism. A magnetic resistance mechanism may make less noise while producing resistance, which may improve the exercise experience for the user. The modular resistance mechanism 1050 may provide a modular resistance as felt by each of the modular exercise frames, including the rowing frame 1069, the elliptical frame 1070, the stationary bicycle frame 1071, the weight system 1072, and other modular exercise frames.

In some embodiments, the base flywheel 1045 may be connectable to multiple modular exercise frames simultaneously. For example, the base flywheel 1045 may be modularly connected to both the rowing frame 1069 and the elliptical frame 1070. In other examples, the base flywheel 1045 may be modularly connected to both the elliptical frame 1070 and the stationary bicycle frame 1071. In still other examples, the base flywheel 1045 may be modularly connected to the rowing frame 1069, the elliptical frame 1070, and the weight system 1072. In yet other examples, the base flywheel 1045 may be modularly connected to any combination of frames at the same time.

A base flywheel 1045 that is modularly connectable to a plurality of modular exercise frames may save the user money and/or space. For example, the user may desire to use both a rower and a stationary bicycle. In this situation, the user may purchase the base flywheel 1045, the rowing frame 1069, and the stationary bicycle frame 1071. Because the rowing frame 1069 and the stationary bicycle frame 1071 use the same flywheel 1045, the user saves money by only purchasing the modular exercise frames, but not multiple flywheels. Furthermore, in many conventional exercise devices, the flywheel takes up a large portion of the footprint of the exercise device. Many users are space-constrained, meaning that they have limited space in which to operate an exercise device. By sharing a flywheel between modular exercise devices, the user may decrease the total footprint for exercise devices, compared to conventional exercise devices.

The base flywheel 1045 may be modularly modified or upgraded to include any feature desired. For example, the base flywheel 1045 may be modularly modified with a locking hub. In other examples, the base flywheel 1045 may be modularly modified with a different rotational mass. In still other examples, the base flywheel 1045 may be modularly modified to include different cosmetic features. In this manner, the user may modify or upgrade the base flywheel 1045 according to his needs and desires.

Figures 1, 11:
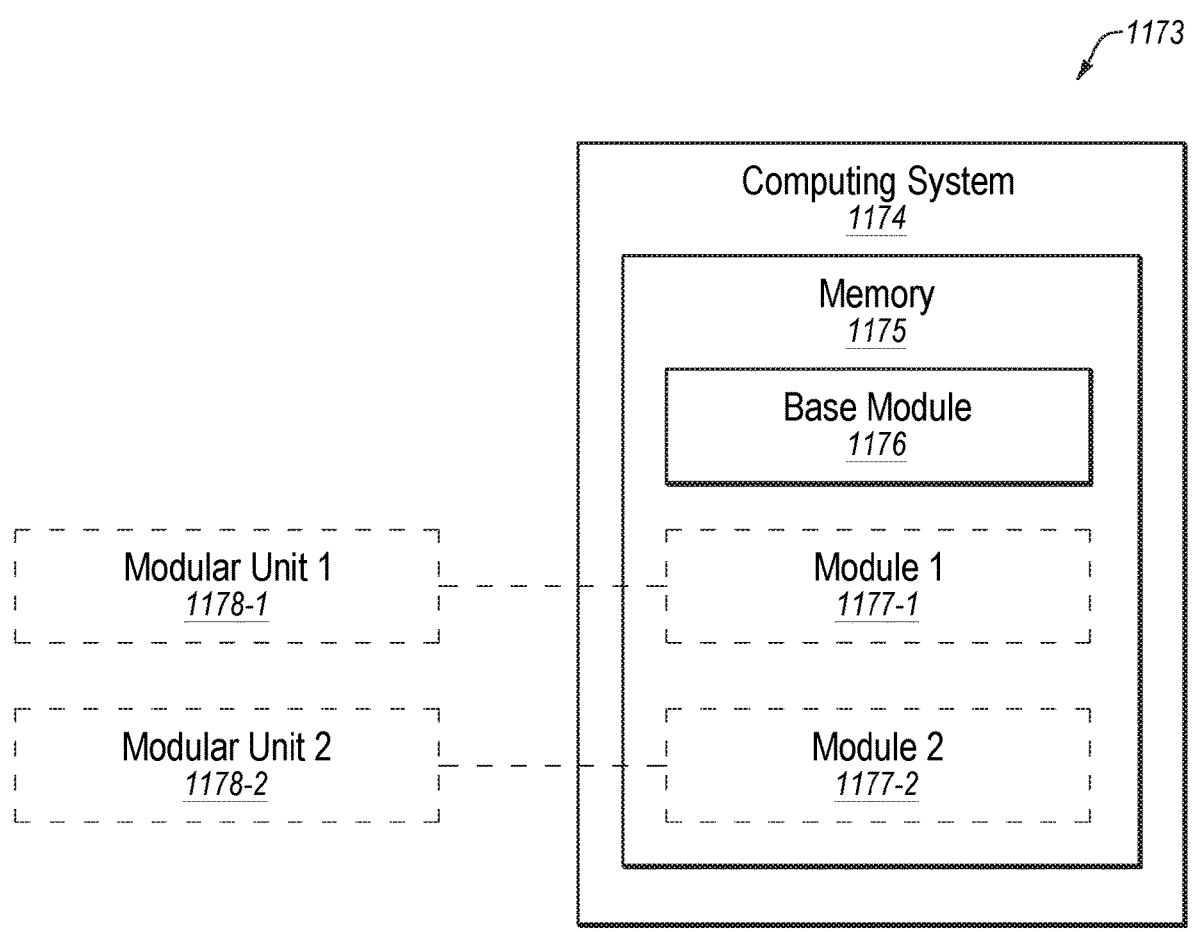
Figures 2, 11:
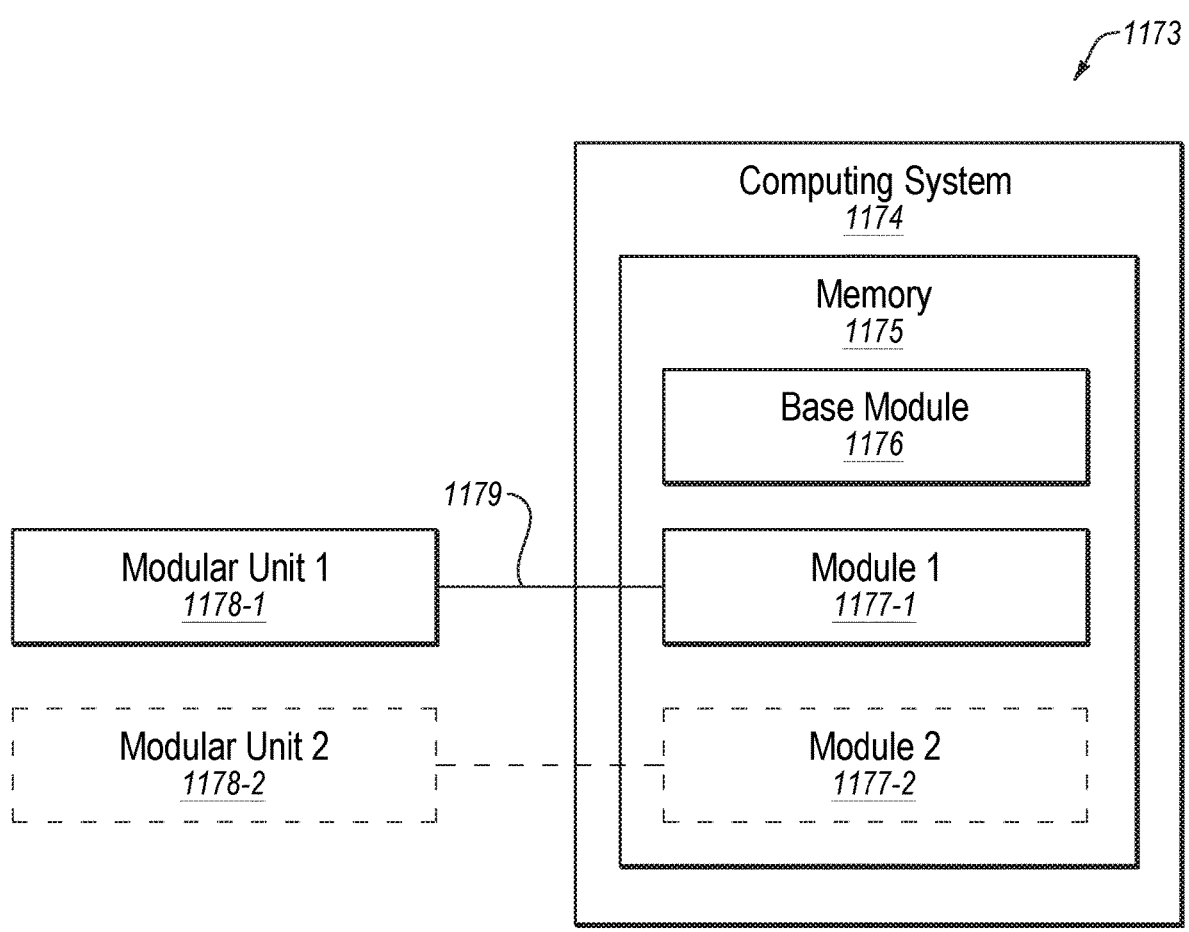

FIG. 11-1 is a representation of a modular exercise program 1173, according to at least one embodiment of the present disclosure. The modular exercise program 1173 includes a computing system 1174. The computing system 1174 may be any computing system. For example, the computing system 1174 may include a processor. In some embodiments, the computing system 1174 may be physically located on a modular exercise device, such as a modular treadmill, a modular stationary bicycle, a modular elliptical machine, or a modular rower. In some embodiments, the computing system 1174 may be located in a flywheel housing of a base flywheel. In other embodiments, the computing system 1174 may be remotely located, such as on a mobile device, a computer, a server, or other remote device.

The computing system 1174 includes a memory 1175. In some embodiments, the memory 1175 may be physically located on a modular exercise device, such as a modular treadmill, a modular stationary bicycle, a modular elliptical machine, or a modular rower. In some embodiments, the memory 1175 may be located in a housing of a base flywheel. In other embodiments, the memory 1175 may be remotely located, such as on a mobile device, a computer, a server, or other remote device. In some embodiments, the memory 1175 may be located at a same location as the computing system 1174. In other embodiments, the memory 1175 may be located in a different location as the computing system 1174.

The memory 1175 includes a plurality of instructions in the form of modules. The instructions, when accessed by a processor in the computing system 1174, may instruct or cause the computing system 1174 to perform an action. For example, the instructions may instruct the computing system 1174 to change an exercise feature of an exercise device, such as resistance level, incline, tread belt speed, or other exercise feature of the exercise device. In other examples, the instructions may cause the computing system 1174 to collect a measurement from a sensor, analyze a measurement from a sensor, analyze exercise data from the exercise features, or combinations of the foregoing.

Each module may be activated or deactivated. In some embodiments, an activated module may be accessed by the computing system 1174 to perform the action, and a deactivated module may be inaccessible by the computing system. In other embodiments, an activated module may instruct the computing system 1174 to perform an action, and a deactivated module may not provide any instructions to the computing system 1174, or may instruct the computing system 1174 not to perform an action.

A base module 1176 may be permanently activated. The base module 1176 may instruct the computing system 1174 to perform the basic functions of an exercise device. For example, the base module 1176 may instruct the computing system 1174 to change a speed of a tread belt.

The memory 1175 may include deactivated first module 1177-1 and deactivated second module 1177-2. The first module 1177-1 is associated with a first modular unit 1178-1. When the computing system 1174 receives an indication that the first modular unit 1178-1 is connected to the modular exercise system, the computing system 1174 may activate the first module 1177-1. For example, the computing system 1174 may sense that a circuit at a specific modular connection has been closed, and therefore know that the first modular unit 1178-1 is connected.

When the computing system 1174 receives the indication that the first modular unit 1178-1 is present, the computing system 1174 may then receive instructions from the first module 1177-1. For example, the first modular unit 1178-1 may be a sensor, and the computing system 1174 may receive instructions from the first module 1177-1 that instruct the computing system 1174 to take a measurement with the sensor. The first module 1177-1 may further instruct the computing system 1174 to process, analyze, display, perform other actions on the measurement, or combinations of the foregoing.

The first modular unit 1178-1 includes an exercise feature not included in the base exercise device. However, an exercise program used by the exercise device may change the excluded exercise feature. Therefore, the base module 1176 may change an alternate exercise feature that may approximate the change in the excluded exercise feature. For example, on a stationary bicycle, a change in incline may be approximated by a change in flywheel resistance. Thus, for a stationary bicycle that does not include an incline mechanism, an exercise program that includes changes in incline may approximate the change in incline by changing the flywheel resistance. When the first modular unit 1178-1 including an incline mechanism is installed on the base stationary bicycle, then first module 1177-1 may provide instructions to change the incline of the stationary bicycle, and stop changing the resistance of the flywheel in lieu of changing the incline. Thus, the exercise experience may be improved by providing additional exercise features for the user.

Similarly, when the computing system 1174 receives the indication that the second modular unit 1178-2 is connected to the modular exercise system, the computing system 1174 may activate the second module 1177-2. In some embodiments, the first module 1177-1 and the second module 1177-2 may be pre-programmed into the memory 1175. In other embodiments, one or both of the first module 1177-1 and the second module 1177-2 may be installed in the memory 1175 when the first modular unit 1178-1 and/or the second modular unit 1178-2 are plugged into the modular exercise device. For example, when the computing system 1174 receives an indication that the first modular unit 1178-1 has been plugged into the modular exercise device, the computing system 1174 may connect to the internet and download the first module 1177-1. In other examples, the first modular unit 1178-1 may include a processor. When the first modular unit 1178-1 is plugged into the modular exercise device, the processor may install the first module 1177 onto the memory 1175.

FIG. 11-2 is another representation of the modular exercise program 1173 of FIG. 11-1 with an activated module, according to at least one embodiment of the present disclosure. In the embodiment shown, the first modular unit 1178-1 has been physically connected to the modular exercise device with a modular connection 1179. Connecting the first modular unit 1178-1 to the modular exercise device has activated the first module 1177-1. In the embodiment shown, an activated module is indicated by a solid line, and a deactivated module is indicated by a broken line. It should be noted that both the first module 1177-1 and the second module 1177-2 may be connected to the modular exercise device.

By including activated and deactivated modules, the modular exercise program 1173 may be configured to smoothly and without much work by the user, initialize and begin using any modular unit plugged into the modular exercise device. In this manner, the user may begin using the newly installed modular unit immediately or shortly after installation. This may improve the quality of the exercise experience for the user, and may make it easier for her to install new modular units.

Figure 12:
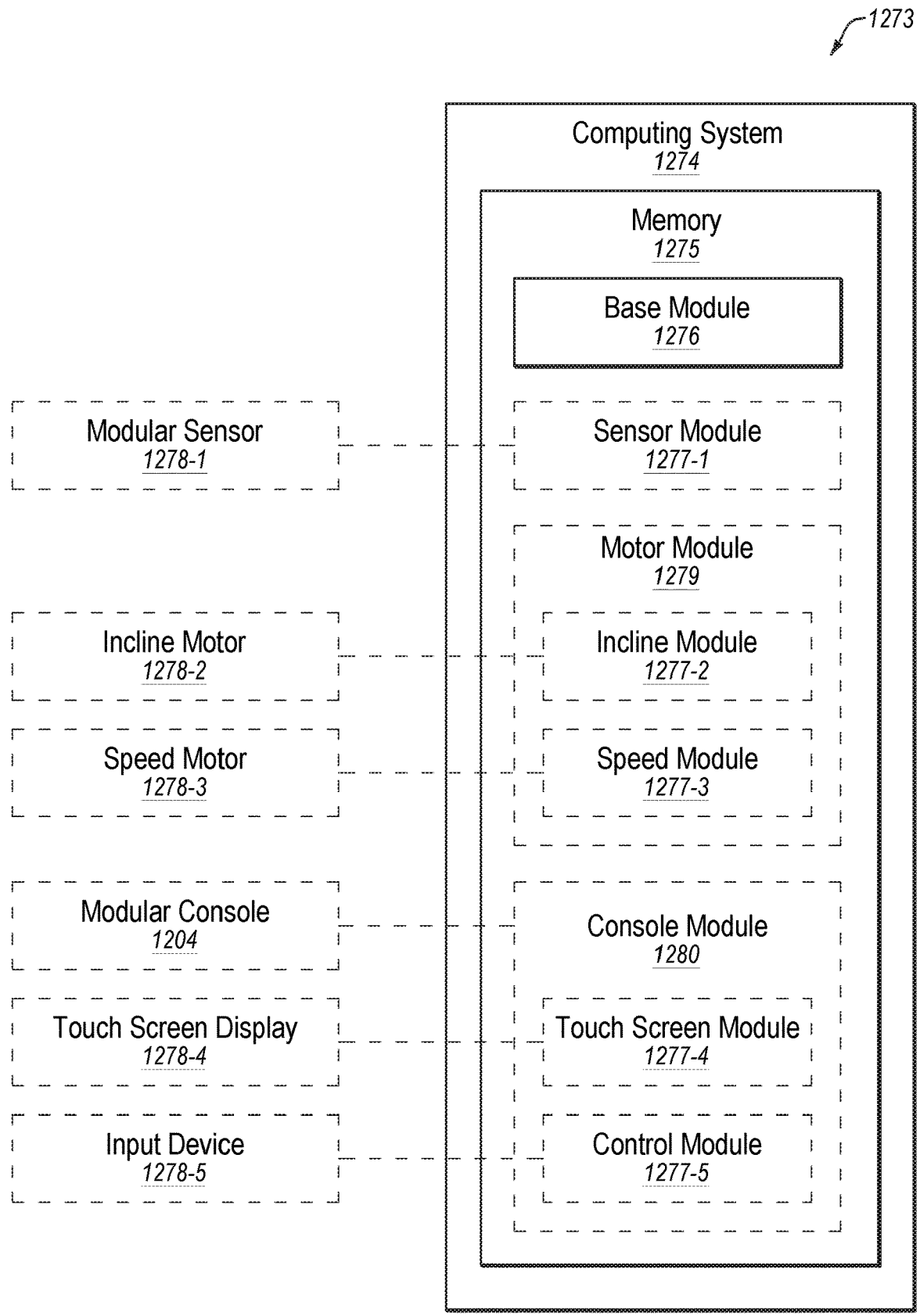
FIG. 12 is another representation of a modular exercise program, according to at least one embodiment of the present disclosure.

FIG. 12 is a representation of a modular exercise program 1273, according to at least one embodiment of the present disclosure. The modular exercise program 1273 includes a computing system 1274. The computing system 1274 includes a memory 1275. In the embodiment shown, the modular exercise program 1273 is installed on a modular treadmill (e.g., modular treadmill 300 of FIG. 3-1 through FIG. 3-6). Thus, the modular units and modular connections may be comparable to the modular units and modular connections discussed in reference to the modular treadmill 300 of FIG. 3-1. However, it should be understood that the modular exercise program 1273 may be used with different modules for different modular exercise systems and devices, such as modular elliptical machines, modular stationary bicycles, and modular rowers.

The memory 1275 includes a plurality of instructions in the form of modules. The instructions, when accessed by a processor in the computing system 1274, may instruct or cause the computing system 1274 to perform an action. For example, the instructions may instruct the computing system 1274 to change an exercise feature of an exercise device, such as resistance level, incline, tread belt speed, or other exercise feature of the exercise device. In other examples, the instructions may cause the computing system 1274 to collect a measurement from a sensor, analyze a measurement from a sensor, analyze exercise data from the exercise features, or combinations of the foregoing.

Each module may be activated or deactivated. In some embodiments, an activated module may be accessed by the computing system 1274 to perform the action, and a deactivated module may be inaccessible by the computing system. In other embodiments, an activated module may instruct the computing system 1274 to perform an action, and a deactivated module may not provide any instructions to the computing system 1274, or may instruct the computing system 1274 not to perform an action. In some embodiments, the memory 1275 may include every modular that may be used on the modular treadmill. In other embodiments, a triggering event may cause the computing system 1274 to retrieve or download the module from a remote device, server, or from the modular unit.

A base module 1276 may be permanently activated. The base module 1276 may instruct the computing system 1274 to perform the basic functions of a treadmill. For example, the base module 1276 may instruct the computing system 1274 to change a speed of a tread belt.

The memory 1275 may include a plurality of selectively activated modules (collectively 1277). The selectively activated modules 1277 may be selectively activated based on the connection of a modular unit (collectively 1278) to the modular treadmill. For example, a sensor module 1277-1 may be activated based on the connection of one or more modular sensors 1278-1.

In some embodiments, a selectively actuated module 1277 may include one or more sub-modules. For example, a motor module 1279 may include an incline module 1277-2 and a speed module 1277-3. The incline module 1277-2 is activated when an incline motor 1278-2 is connected to the modular treadmill and the speed module 1277-3 is activated when the speed motor 1278-3 is connected to the modular treadmill. Both the incline module 1277-2 and the speed module 1277-3 may be considered part of the motor module 1279 because both the incline motor 1278-2 and the speed motor 1278-3 are motors.

In some embodiments, a sub-module may not be activated until another module has been activated. For example, a console module 1280 is activated when a modular console 1204 is connected to the modular treadmill. A touch screen display 1278-4 may not be connected to the modular treadmill until the modular console 1204 is connected to the modular treadmill. Thus, the touch screen module 1277-4 may not be connected until the modular console 1204 and the touch screen display 1278-4 are connected to the modular treadmill. Similarly, an input device 1278-5 may not be connected until the modular console 1204 is connected, and the control module 1277-5 may not be activated until the console module 1270 is activated.

INDUSTRIAL APPLICABILITY

The present disclosure is directed to a modular exercise device. A modular exercise device breaks down an exercise device into modular components so that a user may select and install only those exercise features in which he or she is interested, or for which he or she can afford.

A base exercise device may include only those elements of an exercise device necessary for the base exercise. For example, a base treadmill may include a deck, a front pulley, a rear pulley, a tread belt, and a drive system. Similarly, a stationary bicycle may include a frame, a seat, a drivetrain including pedals, a crank, and a flywheel, and handles. An elliptical machine may include a frame, pedals, a flywheel, and handles. A rower may include a frame, a seat, a flywheel, and a handle.

A user may only have need of the base exercise device, or may initially only have need of the base exercise device, without any modular units connected to the base exercise device. The user may only have need of the base exercise device for many reasons, including a lack of knowledge about exercise or the specific type of exercise performed on the exercise device, unaffordability of a more expensive exercise device, a lack of room in a house or an apartment for a large exercise device, an inability to perform exercises with a specific aspect of an exercise device, any other reason, or combinations of the foregoing. Therefore, for the reasons discussed above or for other reasons, the user may purchase the base exercise device and exercise on the base exercise device for a period of time.

At some point in time, the user may desire an additional exercise feature that is not included in the base exercise device. In some embodiments, that point in time may be at the time of purchase. In the same or other embodiments, that point in time may come after purchase and after the user has used the base exercise device. At this time, the user may select a modular unit that includes the desired exercise feature. The user may then acquire (e.g., purchase) the modular unit.

The base exercise device is designed with one or more modular connections. The modular connections are included in the base exercise device at the time of purchase by the user. Thus, when the user acquires the modular unit, the modular unit is configured to connect to one or more of the modular connections included on the base exercise device. To connect the modular unit, the user may simply plug the modular unit into the modular connection. In this manner, the user may easily acquire and install modular units to add exercise features to the base exercise device. In at least one embodiment, this may allow the user to select the exercise features that appeal most to his interests and needs. For example, a user may desire to change the incline level of the base exercise device, but may not have a need for a console or a display. Thus, the user may acquire and install an incline adjustment unit, but may not purchase a console and a display. This may save the user money by not purchasing exercise features he will not use.

In some embodiments, the user may wish to replace a portion of the base exercise device with a different part. For example, the user may wish to replace a friction-based resistance element with a magnetic resistance element. The user may acquire a magnetic resistance element, and then replace the friction-based resistance element with the magnetic resistance element. Thus, a modular unit may replace an exercise feature with a different exercise feature. In this manner, the user may tailor the base characteristics of the base exercise device to match her interests and needs.

Exercise features not included on the base device may include: incline adjustment, motor speed adjustment, resistance level adjustment, noise reduction, cooling systems (e.g., ventilation), speakers, cushioning, device sensors (e.g., incline, resistance level), biometric sensors, environment sensors (e.g., proximity, temperature, humidity) strength training, device controls, display of exercise information, display of biometric information, display resolution, display interaction (e.g., touch-screen display), interactive exercise programs, synchronized exercise programs, display broadcast (e.g., projector, "casting," wireless communication), communication of information to remote devices, storage mechanisms, vibration generators, vibration isolators, handles, harnesses, rails, cosmetics (e.g., colors, tread patterns, graphics, lights), other exercise features, and combinations of the foregoing. Each of these features may be added to the base exercise device with the acquisition and connection of a modular unit. In some embodiments, a single modular unit may add more than one of these features. In some embodiments, multiple modular units may combine to add a single feature.

In some embodiments, the user may be able to purchase the base exercise device online, and it may weigh under 200 pounds so that it may ship via the United Postal Service (UPS). She may also purchase the modular upgrades and receive instructions on how to install them. In some embodiments, the installation instructions may be located online and available for download. In the same or other embodiments, the installation instructions may be delivered with the modular unit in a paper booklet, packet, or on a portable storage device, such as a CD, an SD card, a micro-SD card, a flash drive, a "thumb" drive, other portable storage device, and combinations of the foregoing.

Below are sections of the devices and methods of the present disclosure:

1. A kit for an exercise device, comprising:
   a base unit including a modular connection; and
   a modular unit physically connectable to the base unit at the modular connection,
      the modular unit including an exercise feature not included in the base unit.
2. The kit of section 1, the modular unit including a console, the exercise feature including a display on the console that displays an exercise parameter to a user.
3. The kit of section 2, wherein the display is a base display, and further comprising an upgraded display replaceable with the base display, wherein the upgraded display includes at least one of a larger screen, a higher resolution screen, and a touch screen display, compared to the base display.
4. The kit of section 3, wherein the console includes a console body, the console body including a display mount, and wherein both the base display and the upgraded display are sized to connect to the display mount.
5. The kit of section 3 or section 4, wherein the console includes a console body, the console body including a display mount, wherein the base display is sized to connect to the display mount, and wherein the upgraded display is sized to connect to an upgraded display mount, the display mount being replaceable with the upgraded display mount.
6. The kit of any of sections 3-5, wherein the console includes a plurality of base controls, and further comprising a plurality of upgraded controls replaceable with the base controls, the upgraded controls including additional control features not included in the base controls.
7. The kit of any of sections 2-6, wherein the modular unit is a first modular unit, and further comprising a second modular unit, the second modular unit including a console hinge, the console hinge being configured to change an orientation of the display.
8. The kit of section 7, the console including a sensor configured to identify a position of the user, the console automatically changing the orientation of the display based on the position of the user.
9. The kit of section 8, the sensor including a camera, the console including a processor and a memory, the memory including programmable instructions which, when accessed by the processor, cause the processor to analyze an image from the camera to determine a position of the user, wherein the position of the user determines the position of the user.
10. The kit of any of sections 2-9, wherein the console includes a desk and the display includes a computer monitor.
11. The kit of any of sections 1-10, the modular unit including a handle, the handle being used for a bodyweight exercise.
12. The kit of section 11, the handle being a base handle, and further comprising an upgraded handle, the upgraded handle including an input device, the upgraded handle being replaceable with the base handle, a user input device being in communication with the base unit when the upgraded handle is connected to the modular connection such that the user input device controls an exercise feature of the base unit.
13. The kit of any of sections 1-12, the modular unit including a projector configured to project a display on a surface.
14. The kit of section 13, the display being controlled by a mobile device.
15. The kit of any of sections 1-14, the modular unit including a remote display upgrade, the remote display upgrade being in communication with a remote display separate from the exercise device.
16. The kit of section 15, the remote display being a television connectable to the internet.
17. The kit of section 16, the television including an interface through which a user may control the exercise feature of the exercise device.
18. The kit of section 16 or section 17, the television displaying an exercise program coordinated with the exercise device.
19. The kit of section 18, the television displaying an exercise program coordinated with a plurality of exercise devices.
20. The kit of any of sections 1-20, the modular unit including a sound system.
21. The kit of section 20, the sound system being synchronized with audio from an exercise program.
22. The kit of section 21, the audio from the exercise program being a first audio, a second audio being played over the sound system, and wherein the first audio is played at the same time as the second audio.
23. The kit of any of sections 1-22, the modular unit including a ventilation system.
24. The kit of section 23, the ventilation system including a plurality of fans.

25. The kit of section 24, the plurality of fans being synchronized to an exercise program.
26. The kit of section 25, the plurality of fans being synchronized to a weather pattern in the exercise program.
27. The kit of section 25 or section 26, the plurality of fans being synchronized to an intensity of the exercise program.
28. The kit of any of sections 1-27, the modular connection including an interference fit connection, the modular unit including a complementary interference fit connection.
29. The kit of any of sections 1-28, the modular unit including a noise-canceling speaker located in a housing of the base unit, the noise-canceling speaker being configured to reduce a noise level of the base unit.
30. The kit of any of sections 1-29, the modular unit including a vibration isolator configured to isolate vibrations between two components.
31. The kit of any of sections 1-30, the modular unit including a cosmetic upgrade to at least one aspect of the base unit.
32. The kit of section 31, the cosmetic upgrade including at least one of a change in color, a light, a sticker, and a housing shape.
33. An exercise system, comprising:
    a base unit including:
        a deck;
        a front pulley at a front end of the deck;
        a back pulley at a back end of the deck;
        a tread belt strung between the front pulley and the back pulley and around the deck; and
        a modular connection; and
    a modular unit physically connected to the deck at the modular connection, the modular unit including an exercise feature not included in the base unit.
34. The exercise system of section 33, the base unit including an incline adjuster, wherein the incline adjuster is operable by hand.
35. The exercise system of section 34, wherein the incline adjuster includes the modular connection, the modular unit including an electric lift motor connectable to the incline adjuster such that the modular connection that the electric lift motor operates the incline adjuster.
36. The exercise system of section 35, the base unit including a base housing, wherein the electric lift motor is located in a lift motor housing separate from the base housing.
37. The exercise system of any of sections 34-36, the incline adjuster being located at a front of the base unit.
38. The exercise system of any of sections 34-37, the incline adjuster being located at a rear of the base unit.
39. The exercise system of any of sections 33-38, the modular unit including a handle configured to support a weight of a user.
40. The exercise system of section 39, the modular unit being a first modular unit, and further comprising a second modular unit, wherein the second modular unit includes a rail along a length of the base unit.
41. The exercise system of section 39 or section 40, the modular unit being a first modular unit, and further comprising a second modular unit, wherein the second modular unit includes a harness supported by the handle, and wherein the harness is configured to support the weight of the user while operating the base unit.
42. The exercise system of any of sections 33-41, at least one of the front pulley or the back pulley being rotated by a belt motor, the belt motor including a gear set, the gear set including the modular connection.
43. The exercise system of section 42, the modular unit including a modular motor, the modular motor meshing into the belt motor at the gear set.
44. The exercise system of section 43, the modular motor including a modular gear, wherein the modular gear is mechanically connected to the gear set when the modular motor is connected to the modular connection.
45. The exercise system of any of sections 33-44, the deck including the modular connection, the modular unit including a sensor connectable to the deck at the modular connection.
46. The exercise system of section 45, the sensor including a proximity sensor configured to detect an object within a range of the deck.
47. The exercise system of section 46, the proximity sensor being configured to slow down a rotation of the tread belt based on a location of the object.
48. The exercise system of any of sections 45-47, the sensor including a pressure sensor configured to detect a pressure applied to the deck through the tread belt.
49. The exercise system of section 48, the pressure sensor including a piezo-electric sensor.
50. The exercise system of section 48 or section 50, further comprising a processor and a memory, the memory including programmable instructions which, when accessed by the processor, cause the processor to analyze the pressure applied to the deck to determine a weight of a user.
51. The exercise system of any of sections 48-50, further comprising a processor and a memory, the memory including programmable instructions which, when accessed by the processor, cause the processor to analyze a weight distribution of a user.
52. The exercise system of section 51, wherein the programmable instructions cause the processor to determine an extent of pronation of the user.
53. The exercise system of section 51 or section 52, wherein the programmable instructions cause the processor to determine a cadence of the user.
54. The exercise system of any of sections 45-54, the sensor including a position sensor configured to sense a position of a body of a user.
55. The exercise system of any of sections 45-55, the position sensor including a camera.
56. The exercise system of section 55, further comprising a processor and a memory, the memory including programmable instructions which, when accessed by the processor, cause the processor to analyze images captured by the camera to determine at least one user parameter.
57. The exercise system of any of sections 33-57, the deck including the modular connection, the modular unit including a hinge connected to the deck at the modular connection, the deck being pivotable about the hinge from an operating position to a stored position.
58. The exercise system of section 57, the modular unit being a first modular unit and further comprising a second modular unit, the second modular unit including a pneumatic piston configured to reduce a force required to pivot the deck from the operating position to the stored position.

59. The exercise system of any of sections 33-58, the deck including the modular connection, the modular unit including a strength training system.
60. The exercise system of any of sections 33-59, the deck including the modular connection, the modular unit including a cushioned foot.
61. A cycling system, comprising:
    a base stationary bicycle including:
       a frame;
       handlebars supported by the frame;
       a drivetrain supported by the frame, the drivetrain including;
          a flywheel; and
          a pedal configured to transfer a torque to the flywheel;
    a modular connection; and
    a modular unit physically connected to the base stationary bicycle at the modular connection, the modular unit including an exercise feature not included in the base stationary bicycle.
62. The cycling system of section 61, the flywheel being a base flywheel, and the modular unit including a modular flywheel, the modular flywheel including a hub switchable between a locked configuration and a freewheel configuration.
63. The cycling system of section 62, wherein in the locked configuration, the pedal may be selectively disconnected from the flywheel.
64. The cycling system of section 62 or section 63, wherein the modular unit is a first modular unit, and further comprising a second modular unit, the second modular unit including a spool and a cable connected to the flywheel, the spool being configured to transfer a spool torque to the flywheel when the cable is unwound from the spool.
65. The cycling system of section 64, the cable being connected to a handle for use in a strength exercise.
66. The cycling system of any of sections 61-65, the frame including the modular connection, the modular unit including a lift motor, the lift motor being configured to change an incline angle of the frame.
67. The cycling system of any of sections 61-66, the frame including the modular connection, the modular unit including a laterally flexible connection.
68. The cycling system of any of sections 61-67, the frame including a seat, wherein the seat includes the modular connection, the modular unit including a ventilation system configured to direct a flow of air to the seat.
69. The cycling system of any of sections 61-68, the frame including the modular connection, the modular unit including a vibration generator.
70. The cycling system of section 69, the vibration generator being configured to generate vibrations against the frame synchronized with an exercise program.
71. An exercise system, comprising:
    a flywheel, the flywheel including a modular connection;
    a first modular unit physically connectable to the flywheel at the modular connection; and
    a second modular unit physically connectable to the flywheel at the modular connection, the second modular unit including an exercise feature not included in the first modular unit.
72. The exercise system of section 71, wherein the first modular unit includes a cycling drivetrain, the cycling drivetrain being configured to transfer a torque to the flywheel when a user performs a cycling exercise.
73. The exercise system of section 72, wherein the second modular unit includes an elliptical drivetrain, the elliptical drivetrain being configured to transfer torque to the flywheel when the user performs an elliptical exercise.
74. The exercise system of section 72 or section 73, wherein the second modular unit includes a rowing drivetrain, the rowing drivetrain being configured to transfer torque to the flywheel when the user performs a rowing exercise.
75. The exercise system of any of sections 72-74, wherein the second modular unit includes a spool connected to the flywheel, the spool including a coiled wire, wherein the spool is configured to transfer a spool torque to the flywheel when the coiled wire is uncoiled, the coiled wire including a handle.
76. The exercise system of any of sections 71-75, wherein the first modular unit and the second modular unit are connected to the flywheel at the same time.
77. The exercise system of any of sections 71-76, wherein the first modular unit includes a first frame and the second modular unit includes a second frame, the first frame being separate from the second frame.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A kit for an exercise device, comprising:
   a base unit, wherein the base unit is a deck assembly including a modular connection positioned on the deck assembly; and
   a modular unit physically connectable to the base unit at the modular connection, the modular unit including an exercise feature not included in the base unit, wherein the modular unit includes a console, the exercise feature including a base display; and
   an upgraded display replaceable with the base display, wherein the upgraded display includes at least one of a larger screen, a higher resolution screen, or a touch screen display, compared to the base display.

2. The kit of claim 1, wherein the modular unit is a first modular unit, and further comprising a second modular unit, the second modular unit including a console hinge, the console hinge being configured to change an orientation of the display.

3. The kit of claim 2, wherein the console includes a sensor configured to identify a position of the user, the console automatically changing the orientation of the display based on the position of the user.

4. The kit of claim 3, wherein the sensor includes a camera, the console including a processor and a memory, the memory including programmable instructions which, when accessed by the processor, cause the processor to analyze an image from the camera to determine a position of the user, wherein the position of the user determines the position of the user.

5. The kit of claim 1, wherein the modular unit is a first modular unit and further comprising a second modular unit including a ventilation system.

6. The kit of claim 5, the ventilation system including a plurality of fans.

7. The kit of claim 1, wherein the console includes a console body, the console body including a display mount, and wherein both the base display and the upgraded display are sized to connect to the display mount.

8. The kit of claim 1, wherein the console includes a console body, the console body including a display mount, wherein the base display is sized to connect to the display mount, and wherein the upgraded display is sized to connect to an upgraded display mount, the display mount being replaceable with the upgraded display mount.

9. The kit of claim 1, wherein the console includes a plurality of base controls, and further comprising a plurality of upgraded controls replaceable with the base controls, the upgraded controls including additional control features not included in the base controls.

10. The kit of claim 1, wherein the modular unit is a first modular unit and further comprising a second modular unit including a projector configured to project a display on a surface.

11. The kit of claim 1, wherein the modular unit is a first modular unit and further comprising a second modular unit including a sound system.

12. The kit of claim 1, wherein the modular unit is a first modular unit and further comprising a second modular unit including a noise-canceling speaker located in a housing of the base unit, the noise-canceling speaker being configured to reduce a noise level of the base unit.

13. An exercise system, comprising:
   a base unit including:
      a deck;
      a front pulley at a front end of the deck;
      a back pulley at a back end of the deck;
      a tread belt strung between the front pulley and the back pulley and around the deck; and
      a modular connection; and
   a modular unit physically connected to the deck at the modular connection, the modular unit including an exercise feature not included in the base unit, wherein the modular unit includes console, the console including a display; and
   an upgraded display replaceable with the base display, wherein the upgraded display includes at least one of a larger screen, a higher resolution screen, or a touch screen display compared to the display.

14. The exercise system of claim 13, wherein the base unit includes an incline adjuster.

15. The exercise system of claim 14, wherein the base unit includes a base housing, wherein an electric lift motor is located in a lift motor housing separate from the base housing.

16. The exercise system of claim 14, wherein the incline adjuster is located at a front of the base unit.

* * * * *